United States Patent [19]
Takada et al.

[11] Patent Number: 5,889,380
[45] Date of Patent: Mar. 30, 1999

[54] CURRENT COMMAND TYPE PWM INVERTER APPARATUS FOR DRIVING AND CONTROLLING THREE-PHASE MOTOR BASED ON PERIODICAL STATE UPDATING TIMINGS

[75] Inventors: Kazuyuki Takada, Hirakata; Yoshinori Isomura, Itami, both of Japan

[73] Assignee: Matsushita Electric Industrial Co., Ltd., Osaka, Japan

[21] Appl. No.: 944,054

[22] Filed: Sep. 25, 1997

[30] Foreign Application Priority Data

Sep. 27, 1996 [JP] Japan .................................. 8-256131

[51] Int. Cl.$^6$ ........................................ H02P 5/28
[52] U.S. Cl. ......................... 318/811; 318/254; 318/439
[58] Field of Search .................................. 318/254, 439, 318/138, 799–811

[56] References Cited

U.S. PATENT DOCUMENTS

| | | | |
|---|---|---|---|
| 5,287,051 | 2/1994 | Konrad et al. ........................ | 318/803 |
| 5,349,351 | 9/1994 | Obara et al. ......................... | 341/141 |
| 5,357,181 | 10/1994 | Mutoh et al. ........................ | 318/139 |
| 5,373,223 | 12/1994 | Akagi et al. ........................ | 318/722 |
| 5,481,168 | 1/1996 | Mutoh et al. ........................ | 318/432 |
| 5,486,748 | 1/1996 | Konrad et al. ....................... | 318/811 |

*Primary Examiner*—Brian Sircus
*Attorney, Agent, or Firm*—Wenderoth, Lind & Ponack, L.L.P.

[57] ABSTRACT

In a current command type PWM inverter apparatus including first to sixth main circuit switching power devices for supplying line currents to a three-phase motor, at a periodical state updating first timing, and at least one second timing when any one of first, second and third comparison signals between respective detected line currents and respective line current command signals change after the state updating first timing, a logic circuit generates and outputs first to sixth switching command signals to the main circuit switching power devices so as to minimize errors between respective line current command signals and respective detected line currents.

7 Claims, 19 Drawing Sheets

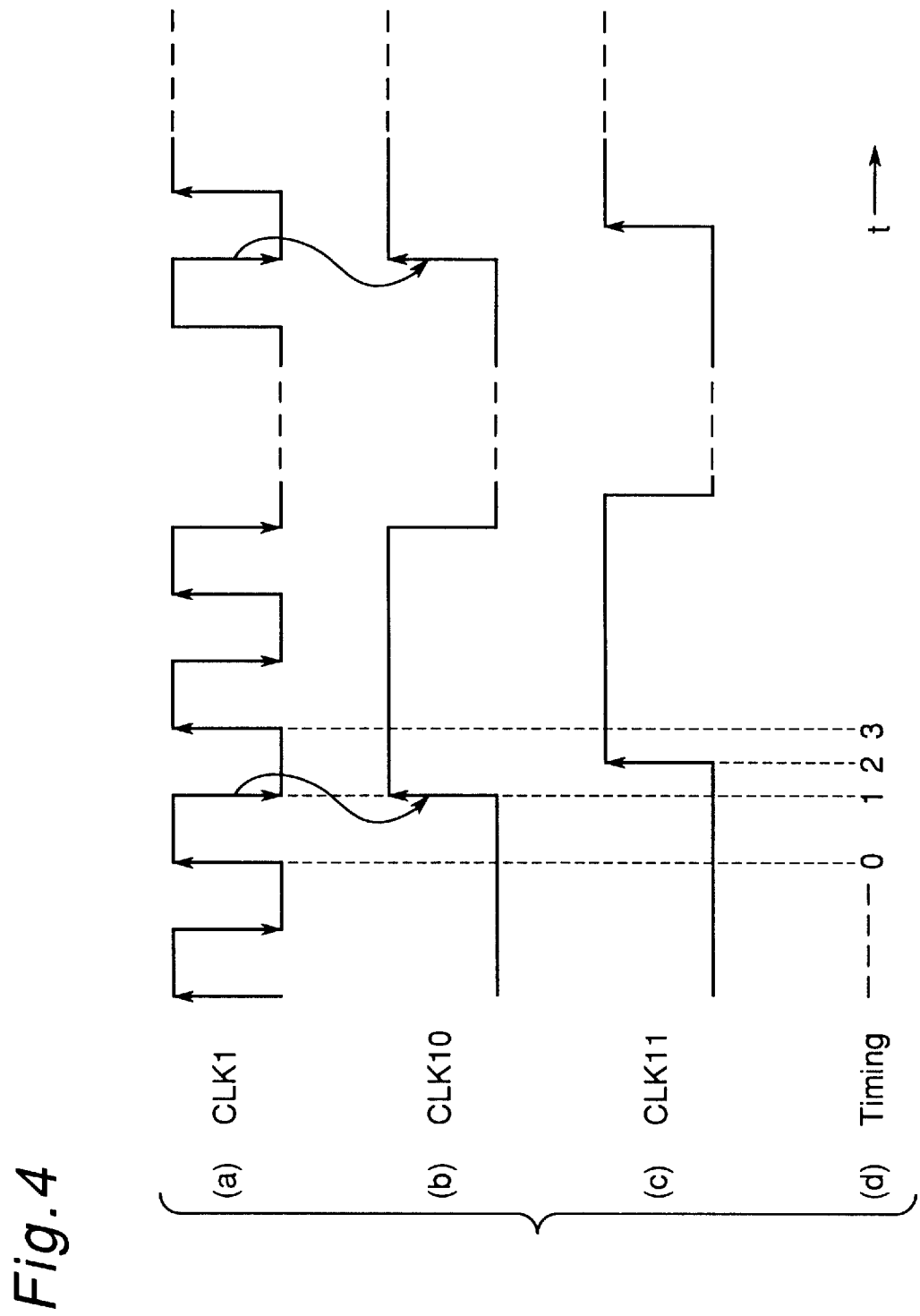

Fig.5A
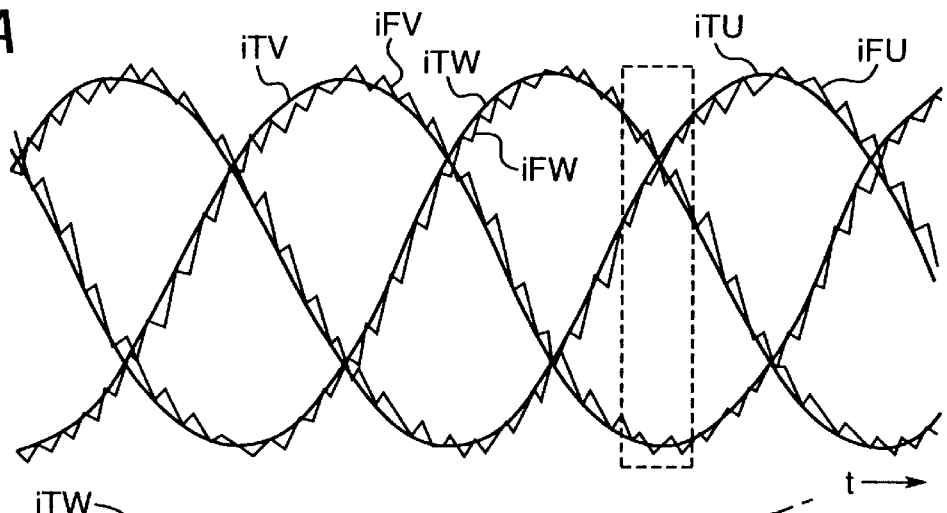
Fig.5B
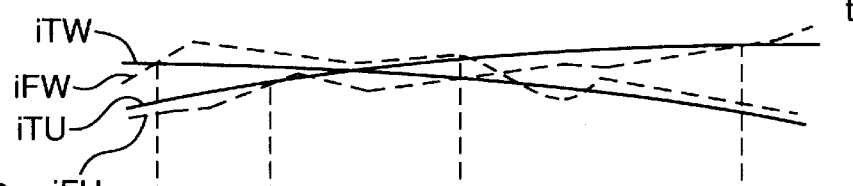
Fig.5C CLK10
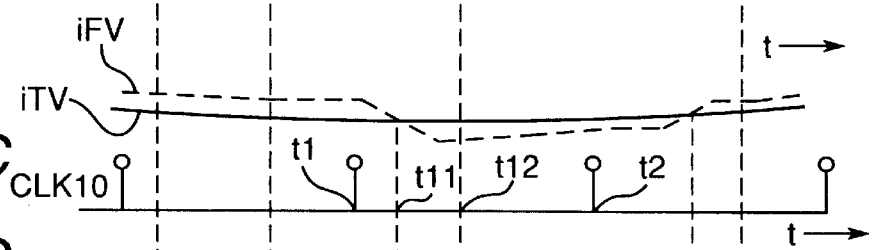
Fig.5D
| NO | EO0 | EY1 | EY2 | AO0 | AX1 | AX2 | FO0 | FY1 | FY2 |
|----|-----|-----|-----|-----|-----|-----|-----|-----|-----|
| HU | L | L | H | L | * | * | L | L | H |
| HV | H | * | * | H | L | L | L | H | H |
| HW | L | H | H | H | H | L | H | * | * |
| PU | H | H | L | H | H | H | H | H | L |
| PV | L | L | L | L | H | H | H | L | L |
| PW | H | L | L | L | L | H | L | L | L |
| Q1 | ○ | ○ | × | ○ | ○ | ○ | ○ | ○ | × |
| Q2 | × | × | × | × | ○ | ○ | ○ | × | × |
| Q3 | ○ | × | × | × | × | ○ | × | × | × |
| Q4 | × | × | ○ | × | × | × | × | × | ○ |
| Q5 | ○ | ○ | ○ | ○ | × | × | × | ○ | ○ |
| Q6 | × | ○ | ○ | ○ | ○ | × | ○ | ○ | ○ |
○ : ON   × : OFF
(Notes) The timings of the leading edge of clock signal CLK10 are represented by pulse signals.

With Reference to State No. J00 in Tables 1 and 2

With Reference to State No. P00→PX1 in Tables 1 and 2

With Reference to State No. 100-2 in Tables 4 and 5

Fig.17
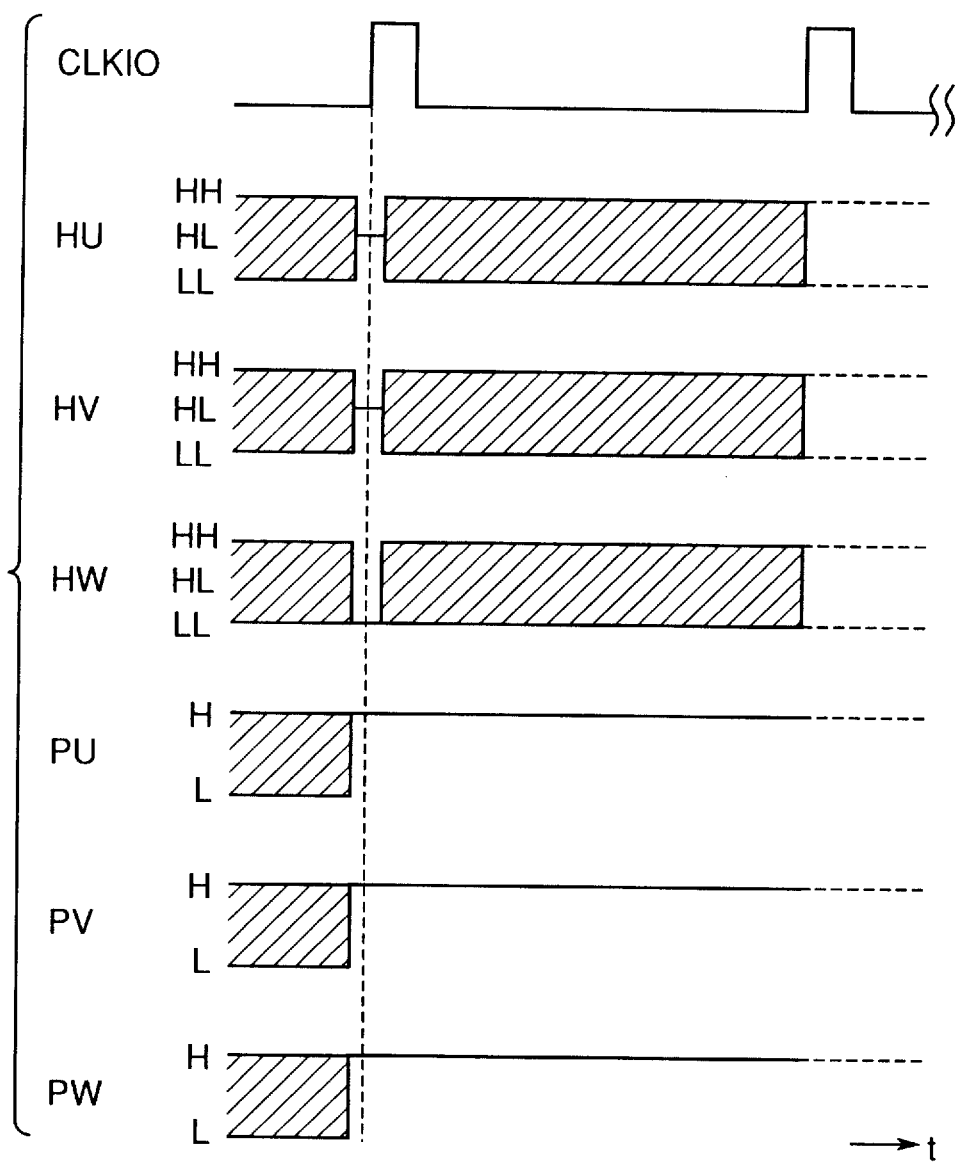
 : Don't care
With Reference to State No. J00—2 in Tables 4 and 5

: Don't care

With Reference to State No. J00→JX1 in Tables 7 and 8

Fig. 19
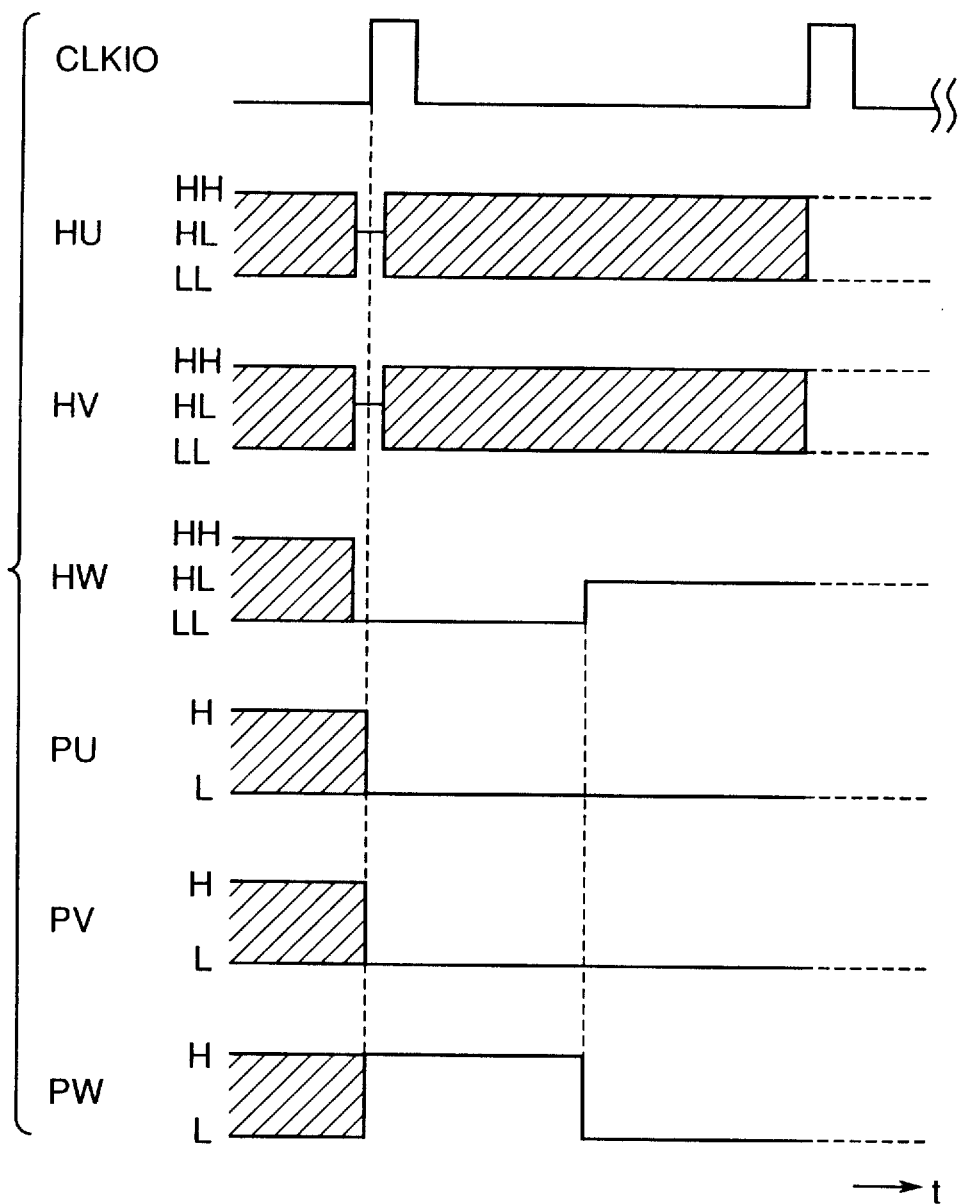
 : Don't care
With Reference to State No. J00→JX1 in Tables 10 and 11

CURRENT COMMAND TYPE PWM INVERTER APPARATUS FOR DRIVING AND CONTROLLING THREE-PHASE MOTOR BASED ON PERIODICAL STATE UPDATING TIMINGS

BACKGROUND OF THE INVENTION

1. Field of the Invention

The present invention relates to a current command type PWM (Pulse Width Modulation) inverter apparatus, in particular, to a current command type PWM inverter apparatus for driving and controlling a three-phase motor based on periodical state updating timings.

2. Description of the Prior Art

In recent years, current command type PWM inverters are extensively used in driving and controlling three-phase motors such as induction motors, synchronous motors, reluctance motors, or the like.

In comparison with a voltage command type PWM inverter which commands a voltage to be applied to a motor and applies the voltage conforming to the command, to the motor, the current command type PWM inverter, which commands a current to be flowed into a motor and compulsorily flows the current conforming to the command through the motor, is advantageous in responsibility and controllability. In particular, for controlling an AC servomotor and the like, the current command type PWM inverter is adopted in almost all the cases.

A construction of a generic current command type PWM inverter system will be described here with reference to FIG. 9.

Referring to FIG. 9, first of all, a fundamental frequency f and an effective current value ip of a three-phase AC (Alternating Current) current waveform to be supplied to a three-phase motor 1 are set in a current command generator circuit 7, and based on these information, the current command generator circuit 7 internally generates line current command signals to be flowed into the three-phase motor 1 as a first line current command signal iTU, a second line current command signal iTV and a third line current command signal iTW.

Then, a motor current detector circuit 9 detects two line currents of the three-phase motor 1, obtains the remaining one line current by obtaining the sum of the detected two line currents and inverting the sign of the sum value, and outputs the resulting detected currents as a first detected line current iFU, a second detected line current iFV and a third detected line current iFW. It is to be noted that the motor current detector circuit 9 may detect the three line currents of the three-phase motor 1, and then output the first detected line current iFU, the second detected line current iFV and the third detected line current iFW.

Then, a current controller 106 receives the first line current command signal iTU, the second line current command signal iTV, the third line current command signal iTW, the first detected line current iFU, the second detected line current iFV and the third detected line current iFW, and generates a first switching command signal PU, a second switching command signal PV and a third switching command signal PW so that the first line current command signal iTU, the second line current command signal iTV and the third line current command signal iTW are made to respectively coincide with the first detected line current iFU, the second detected line current iFV and the third detected line current iFW as far as possible.

Further, a main circuit power controller 8 comprises:

(a) a main circuit DC (Direct Current) power source 3; and
(b) a main circuit power device circuit 2 having a three-phase bridge connection, wherein the main circuit power device circuit 2 comprises:
 (b-1) a first main circuit switching power device Q1 which is connected to a positive electrode of the main circuit DC power source 3 and supplies a first line current IU to the three-phase motor 1;
 (b-2) a second main circuit switching power device Q2 which is connected to the positive electrode of the main circuit DC power source 3 and supplies a second line current IV to the three-phase motor 1;
 (b-3) a third main circuit switching power device Q3 which is connected to the positive electrode of the main circuit DC power source 3 and supplies a third line current IW to the three-phase motor 1;
 (b-4) a fourth main circuit switching power device Q4 which is connected to a negative electrode of the main circuit DC power source 3 and supplies the first line current IU to the three-phase motor 1;
 (b-5) a fifth main circuit switching power device Q5 which is connected to the negative electrode of the main circuit DC power source 3 and supplies the second line current IV to the three-phase motor 1;
 (b-6) a sixth main circuit switching power device Q6 which is connected to the negative electrode of the main circuit DC power source 3 and supplies the third line current IV to the three-phase motor 1; and
 (b-7) six reflux diodes each connected in parallel between the collector and the emitter of each of the main circuit switching power devices, and wherein the main circuit power device circuit 2 operates to turn on either the first main circuit switching power device Q1 or the fourth main circuit switching power device Q4 in accordance with the first switching command signal PU, turn on either the second main circuit switching power device Q2 or the fifth main circuit switching power device Q5 in accordance with the second switching command signal PV, and turn on either the third main circuit switching power device Q3 or the sixth main circuit switching power device Q6 in accordance with the third switching command signal PW.

In this case, when the first switching command signal PU becomes a High level (referred to as an H-level hereinafter), the first main circuit switching power device Q1 is turned on. On the other hand, when the first switching command signal PU becomes a Low level (referred to as an L-level hereinafter), the fourth main circuit switching power device Q4 is turned on. When the second switching command signal PV becomes the H-level, the second main circuit switching power device Q2 is turned on. On the other hand, when the second switching command signal PV becomes the L-level, the fifth main circuit switching power device Q5 is turned on. When the third switching command signal PW becomes the H-level, the third main circuit switching power device Q3 is turned on. On the other hand, when the third switching command signal PW becomes the L-level, the sixth main circuit switching power device Q6 is turned on.

As above is described the structure and operation of the generic current command type PWM inverter system.

A structure of a prior art current command type PWM inverter will be described below with reference to FIG. 10.

FIG. 10 shows a structure of the prior art current controller 106 of the current command type PWM inverter system shown in FIG. 9.

FIGS. 11A through 11E show an operation of the inverter system shown in FIG. 10.

First of all, the first, second and third line current command signals iTU, iTV and iTW and the first, second and third detected line currents iFU, iFV and iFW are subjected to a subtraction process respectively in subtracters 117, 118 and 119 to obtain the first, second and third line current error signals iEU, iEV and iEW. Then first, second and third current error amplifiers 120, 121 and 122 receive the first, second and third line current error signals iEU, iEV and iEW, respectively, and then, output amplified voltage command signals VU, VV and VW, respectively. Each of the current error amplifiers 120, 121 and 122 is generally implemented by a proportion and integration type amplifier as shown in FIG. 12, and a gain characteristic thereof can be represented by the Equation (1):

$$G=R2\times(R3\times C1\times S)/[R1\times\{(R2+R3)\times C1\times S+1\}] \quad (1).$$

The reference numeral 139 denotes a three-phase PWM signal generator comprised of first, second and third comparators 123, 124 and 125 and a triangular wave generator 126. The first, second and third comparators 123, 124 and 125 compare a triangular wave signal SC outputted from the triangular wave generator 126 with the respective voltage command signals VU, VV and VW, respectively, and then, output the first, second and third switching command signals PU, PV and PW, respectively.

In the present case, each of the first, second and third comparators 123, 124 and 125 outputs the H-level when each of the voltage command signals VU, VV and VW is greater than the triangular wave signal SC, while each of the first, second and third comparators 123, 124 and 125 outputs the L-level when each of the voltage command signals VU, W and VW is smaller than the triangular wave signal SC.

FIGS. 11A through 11E show an operation of the current controller 106 shown in FIG. 10, when the first, second and third line current command signals iTU, iTV and iTW are three-phase sine waves, respectively.

Considering the gains of the current error amplifiers 120, 121 and 122 shown in FIGS. 10 and 11A through 11E, it can be understood that each line current error can be reduced by increasing the gains of the current error amplifiers 120, 121 and 122 as a consequence of approach of the detected line currents to the respective line current command signals, and the responsibility of the detected line currents to the respective line current command signals is improved.

However, according to the structure of the above-mentioned prior art, owing to a phase delay due to an electric time constant of the three-phase motor, phase delays of the current error amplifiers, a waste time delay of the three-phase PWM signal generator and the like, an oscillation phenomenon will occur when the current error amplifier gain is made too great. Therefore, the gain of each of the current error amplifiers is generally set to a value which is as great as possible and falls within a range in which no oscillation occurs. The gain of each of the current error amplifiers is determined in the designing stage by examining a loop transfer function of the current control loop from the characteristics of the three-phase motor, the motor current detector circuit, the current controller and the main circuit power controller. In the present case, considering the manufacturing-dependent variation of the characteristics and temperature characteristics, it is required to reduce the gain to a level at which no oscillation phenomenon occurs at worst. The work for determining the gain requires much labor of the operators engaging in the designing, and even a current command type PWM inverter having the same structure requires gain adjustment depending on different motors to which the inverter is to be connected, incurring such a problem that much labor is required for the control of the manufacturing process.

Furthermore, when the specifications of the three-phase motor to be connected to the current command type PWM inverter have not yet determined in the designing stage (e.g., in the case of a general use inverter, a general use AC servo driver or the like), it is required to adjust the gain in accordance with the specifications of the three-phase motor upon determining and installing the three-phase motor to which the inverter is to be connected, and there is such a problem that this gain adjustment work is a bottleneck.

Furthermore, the offset and drift of the triangular wave generator and the current error amplifiers themselves deteriorate the current control error and narrow the dynamic ranges of the amplified error signals. Therefore, an operational amplifier having a small offset and drift is required as a component of them, and depending on the cases, offset adjusting work is required in the manufacturing stage, incurring the problem of cost increase.

FIG. 10 shows a prior art example of the current controller 106 implemented by an analog circuit, however, there exists a current controller implementing a similar structure by a digital circuit such as a microcomputer which subjects the first, second and third detected line currents iFU, iFV and iFW to an analog to digital conversion process by means of an A/D converter. In such a case, the gain of the current error amplifier is required to be determined by examining the loop transfer function of the current control loop from the characteristics of the three-phase motor, the motor current detector circuit, the current controller and the main circuit power controller, and their problems are the same as those of the current controller implemented by the analog circuit.

Furthermore, when the current error amplifier is implemented by a digital circuit such as a microcomputer or the like, the offset and drift of the current error amplifier itself can be eliminated because they are achieved by digital calculation. However, as the calculation processing time increases, the phase delay increases and the circuit tends to oscillate. This consequently means that the gain cannot be increased unless the processing time is reduced, and therefore, a microcomputer having a very high speed calculation processing capability or the like must be used, incurring the problem of cost increase.

Furthermore, the phase delay of the A/D converter for converting the first, second and third detected line currents iFU, iFV and iFW into digital data becomes greater as the time for conversion increases, and the circuit tends to oscillate. This consequently means that the gain cannot be increased unless the conversion time is reduced, and therefore, an A/D converter having a very high speed conversion capability must be used, incurring the problem of cost increase. Furthermore, the offset and drift of the A/D converter consequently deteriorate the current control error and narrow its dynamic range. Therefore, it is required to select an A/D converter having smaller offset and drift, incurring the problem of cost increase.

Furthermore, the three-phase PWM command signal generator implemented by a digital circuit has such problems that the three-phase PWM command signal generator has a complicated structure and costs much as shown in the digital three-phase PWM wave generating apparatus disclosed in the Japanese Patent Laid-Open Publication No. 4-312360.

SUMMARY OF THE INVENTION

An essential object of the present invention is therefore to provide a current command type PWM inverter apparatus which costs less and requires no gain adjustment and which is capable of exhibiting a more excellent responsibility of detected line currents for line current command signals.

According to the aspect of the present invention, there is provided a current command type PWM inverter apparatus comprising:

motor current detecting means for directly or indirectly detecting line currents flowing from respective lines of said PWM inverter apparatus into a three-phase motor and outputting a first detected line current, a second detected line current and a third detected line current;

current command generating means for generating and outputting a first line current command signal, a second line current command signal and a third line current command signal for commanding the line currents to be flowed from said respective lines into the three-phase motor;

first comparing means for comparing the first line current command signal with the first detected line current, outputting a first line current comparison signal having zero level when a difference between the first line current command signal and the first detected line current falls within an allowance range including zero, outputting the first line current command signal having a first level when the difference between the first line current command signal and the first detected line current falls outside the allowance range and when the first detected line current is equal to or greater than the first line current command signal, and outputting the first line current comparison signal having a second level when the difference between the first line current command signal and the first detected line current falls outside the allowance range and when the first detected line current is smaller than the first line current command signal;

second comparing means for comparing the second line current command signal with the second detected line current, outputting a second line current comparison signal having zero level when a difference between the second line current command signal and the second detected line current falls within an allowance range including zero, outputting the second line current comparison signal having a first level when the difference between the second line current command signal and the second detected line current falls outside the allowance range and when the second detected line current is equal to or greater than the second line current command signal, and outputting the second line current comparison signal having a second level when the difference between the second line current command signal and the second detected line current falls outside the allowance range and when the second detected line current is smaller than the second line current command signal;

third comparing means for comparing the third line current command signal with the third detected line current, outputting a third line current comparison signal having zero level when a difference between the third line current command signal and the third detected line current falls within an allowance range including zero, outputting the third line current comparison signal having a first level when the difference between the third line current command signal and the third detected line current falls outside the allowance range and when the third detected line current is equal to or greater than the third line current command signal, and outputting the third line current comparison signal having a second level when the difference between the third line current command signal and the third detected line current falls outside the allowance range and moreover the third detected line current is smaller than the third line current command signal;

a main circuit DC power source;

main circuit power device circuit having a three-phase bridge connection and comprising:

a first main circuit switching power device which is connected to a positive electrode of the main circuit DC power source and supplies a first line current to the three-phase motor;

a second main circuit switching power device which is connected to the positive electrode of the main circuit DC power source and supplies a second line current to the three-phase motor;

a third main circuit switching power device which is connected to the positive electrode of the main circuit DC power source and supplies a third line current to the three-phase motor;

a fourth main circuit switching power device which is connected to a negative electrode of the main circuit DC power source and supplies the first line current to the three-phase motor;

a fifth main circuit switching power device which is connected to the negative electrode of the main circuit DC power source and supplies the second line current to the three-phase motor;

a sixth main circuit switching power device which is connected to the negative electrode of the main circuit DC power source and supplies the third line current to the three-phase motor; and six reflux diodes respectively connected in parallel with said first, second, third, fourth, fifth and sixth main circuit switching power devices;

a logic circuit for receiving the first line current comparison signal, the second line current comparison signal and the third line current comparison signal, and generating first, second, third, fourth, fifth and sixth switching command signals for said first, second, third, fourth, fifth and sixth main circuit switching power devices; and timing generating means for giving a periodical state updating first timing to said logic circuit, wherein, when the first line current comparison signal has the second level, the second line current comparison signal has the first level and the third line current comparison signal has the first level at the state updating first timing, said logic circuit generates and outputs the second, third and fourth switching command signals for respectively turning off the second, third and fourth main circuit switching power devices, and further generates and outputs the first, fifth and sixth switching command signals for respectively turning on the first, fifth and sixth main circuit switching power devices, for a time interval from a second timing when the second line current comparison signal changes from the first level to the second level to the next state updating first timing, said logic circuit generates and outputs the fifth switching command signal for turning off the fifth main circuit switching power device and further generates and outputs the second switching command signal for turning on the second main circuit switching power device, and for a time interval from a second timing when the third line current comparison signal changes from the first level to the second level to the next state updating first timing, said logic circuit generates and outputs the sixth switching command signal for turning off the sixth main circuit switching power device and further generates and outputs the third switching command signal for turning on the third main circuit switching power device, wherein, when the first line current comparison signal has the first level, the second line current comparison signal has the second level and the third line current comparison signal has the first level at the state updating first timing, said logic circuit generates and outputs the first, third and fifth switching command signals for respectively turning off the first, third and fifth main circuit switching power devices, and further generates and outputs the second, fourth and sixth switching command signals for respectively turning on the second, fourth and sixth main circuit switching power devices, for a time interval from a second timing when the first line current comparison signal changes from the first level to the second level to the next state updating first timing, said logic circuit generates and outputs the fourth switching command signal for turning off the fourth main circuit switching power device and further generates and outputs the first switching command signal for turning on the first main circuit switching power device, and for a time interval from a second timing when the third line current comparison signal changes from the first level to the second level to the next state updating first timing, said logic circuit generates and outputs the sixth switching command signal for turning off the sixth main circuit switching power device and further generates and outputs the third switching command signal for turning on the third main circuit switching power device, wherein, when the first line current comparison signal has the first level, the second line current comparison signal has the first level and the third line current comparison signal has the second level at the state updating first timing, said logic circuit generates and outputs the first, second and sixth switching command signals for respectively turning off the first, second and sixth main circuit switching power devices, and further generates and outputs the third, fourth and fifth switching command signals for respectively turning on the third, fourth and fifth main circuit switching power devices, for a time interval from a second timing when the first line current comparison signal changes from the first level to the second level to the next state updating first timing, said logic circuit generates and outputs the fourth switching command signal for turning off the fourth main circuit switching power device and further generates and outputs the first switching command signal for turning on the first main circuit switching power device, and for a time interval from a second timing when the second line current comparison signal changes from the first level to the second level to the next state updating first timing, said logic circuit generates and outputs the fifth switching command signal for turning off the fifth main circuit switching power device and further generates and outputs the second switching command signal for turning on the second main circuit switching power device, wherein, when the first line current comparison signal has the first level, the second line current comparison signal has the second level and the third line current comparison signal has the second level at the state updating first timing, said logic circuit generates and outputs the first, fifth and sixth switching command signals for respectively turning off the first, fifth and sixth main circuit switching power devices, and further generates and outputs the second, third and fourth switching command signals for respectively turning on the second, third and fourth main circuit switching power devices, for a time interval from a second timing when the second line current comparison signal changes from the second level to the first level to the next state updating first timing, said logic circuit generates and outputs the second switching command signal for turning off the second main circuit switching power device and further generates and outputs the fifth switching command signal for turning on the fifth main circuit switching power device, and for a time interval from a second timing when the third line current comparison signal changes from the second level to the first level to the next state updating first timing, said logic circuit generates and outputs the third switching command signal for turning off the third main circuit switching power device and further generates and outputs the sixth switching command signal for turning on the sixth main circuit switching power device, wherein, when the first line current comparison signal has the second level, the second line current comparison signal has the first level and the third line current comparison signal has the second level at the state updating first timing, said logic circuit generates and outputs the second, fourth and sixth switching command signals for respectively turning off the second, fourth and sixth main circuit switching power devices, and further generates and outputs the first, third and fifth switching command signals for respectively turning on the first, third and fifth main circuit switching power devices, for a time interval from a second timing when the first line current comparison signal changes from the second level to the first level to the next state updating first timing, said logic circuit generates and outputs the first switching command signal for turning off the first main circuit switching power device and further generates and outputs the fourth switching command signal for turning on the fourth main circuit switching power device, and for a time interval from a second timing when the third line current comparison signal changes from the second level to the first level to the next state updating first timing, said logic circuit generates and outputs the third switching command signal for turning off the third main circuit switching power device and further generates and outputs the sixth switching command signal for turning on the sixth main circuit switching power device, and wherein, when the first line current comparison signal has the second level, the second line current comparison signal has the second level and the third line current comparison signal has the first level at the state updating first timing, said logic circuit generates and outputs the third, fourth and fifth switching command signals for respectively turning off the third, fourth and fifth main circuit switching power devices, and further generates and outputs the first, second and sixth switching command signals for respectively turning on the first, second and sixth main circuit switching power devices, and for a time interval from a second timing when the first line current comparison signal changes from the second level to the first level to the next state updating first timing, said logic circuit generates and outputs the first switching command signal for turning off the first main circuit switching power device and further generates and outputs the fourth switching command signal for turning on the fourth main circuit switching power device, and for a time interval from a second timing when the second line current comparison signal changes from the second level to the first level to the next state updating first timing, said logic circuit generates and outputs the second switching command signal for turning off the second main circuit switching power device and further generates and outputs the fifth switching command signal for turning on the fifth main circuit switching power device.

In the above-mentioned current command type PWM inverter apparatus, preferably, wherein, when two or more line current comparison signals among the first, second and third line current comparison signals have the zero level at the state updating first timing, until the next state updating first timing, said logic circuit generates and outputs either one group of the first, second and third switching command signals or the fourth, fifth and sixth switching command signals for respectively turning off the first, second and third main circuit switching power devices or the fourth, fifth and sixth main circuit switching power devices, and further generates and outputs the remaining group of the switching command signals for respectively turning on the remaining group of the main circuit switching power devices.

In the above-mentioned current command type PWM inverter apparatus, preferably, wherein, when two or more line current comparison signals among the first, second and third line current comparison signals have the zero level at the state updating first timing, said logic circuit maintains the on-state or off-state of the main circuit switching power devices obtained just before the state updating first timing, until the next state updating first timing.

In the above-mentioned current command type PWM inverter apparatus, preferably, wherein, when the first line current comparison signal has the first level, the second line current comparison signal has the second level and the third line current comparison signal has the second level at the state updating first timing, said logic circuit generates and outputs the second, third and fourth switching command signals for respectively turning off the second, third and fourth main circuit switching power devices, and further generates and outputs the first, fifth and sixth switching command signals for respectively turning on the first, fifth and sixth main circuit switching power devices, and for a time interval from a second timing when the first line current comparison signal changes from the first level to the second level to the next state updating first timing, said logic circuit generates and outputs the first switching command signal for turning off the first main circuit switching power device and further generates and outputs the fourth switching command signal for turning on the fourth main circuit switching power device, wherein, when the first line current comparison signal has the second level, the second line current comparison signal has the first level and the third line current comparison signal has the second level at the state updating first timing, said logic circuit generates and outputs the first, third and fifth switching command signals for respectively turning off the first, third and fifth main circuit switching power devices, and further generates and outputs the second, fourth and sixth switching command signals for respectively turning on the second, fourth and sixth main circuit switching power devices, and for a time interval from a second timing when the first line current comparison signal changes from the second level to the first level to the next state updating first timing, said logic circuit generates and outputs the second switching command signal for turning off the second main circuit switching power device and further generates and outputs the fifth switching command signal for turning on the fifth main circuit switching power device, wherein, when the first line current comparison signal has the second level, the second line current comparison signal has the second level and the third line current comparison signal has the first level at the state updating first timing, said logic circuit generates and outputs the first, second and sixth switching command signals for respectively turning off the first, second and sixth main circuit switching power devices, and further generates and outputs the third, fourth and fifth switching command signals for respectively turning on the third, fourth and fifth main circuit switching power devices, and for a time interval from a second timing when the third line current comparison signal changes from the second level to the first level to the next state updating first timing, said logic circuit generates and outputs the third switching command signal for turning off the third main circuit switching power device and further generates and outputs the sixth switching command signal for turning on the sixth main circuit switching power device, wherein, when the first line current comparison signal has the second level, the second line current comparison signal has the first level and the third line current comparison signal has the first level at the state updating first timing, said logic circuit generates and outputs the first, fifth and sixth switching command signals for respectively turning off the first, fifth and sixth main circuit switching power devices, and further generates and outputs the second, third and fourth switching command signals for respectively turning on the second, third and fourth main circuit switching power devices, and for a time interval from a second timing when the first line current comparison signal changes from the first level to the second level to the next state updating first timing, said logic circuit generates and outputs the fourth switching command signal for turning off the fourth main circuit switching power device and further generates and outputs the first switching command signal for turning on the first main circuit switching power device, wherein, when the first line current comparison signal has the first level, the second line current comparison signal has the second level and the third line current comparison signal has the first level at the state updating first timing, said logic circuit generates and outputs the second, fourth and sixth switching command signals for respectively turning off the second, fourth and sixth main circuit switching power devices, and further generates and outputs the first, third and fifth switching command signals for respectively turning on the first, third and fifth main circuit switching power devices, and for a time interval from a second timing when the second line current comparison signal changes from the first level to the second level to the next state updating first timing, said logic circuit generates and outputs the fifth switching command signal for turning off the fifth main circuit switching power device and further generates and outputs the second switching command signal for turning on the second main circuit switching power device, and wherein, when the first line current comparison signal has the first level, the second line current comparison signal has the first level and the third line current comparison signal has the second level at the state updating first timing, said logic circuit generates and outputs the third, fourth and fifth switching command signals for respectively turning off the third, fourth and fifth main circuit switching power devices, and further generates and outputs the first, second and sixth switching command signals for respectively turning on the first, second and sixth main circuit switching power devices, and for a time interval from a second timing when the third line current comparison signal changes from the first level to the second level to the next state updating first timing, said logic circuit generates and outputs the sixth switching command signal for turning off the sixth main circuit switching power device and further generates and outputs the third switching command signal for turning on the third main circuit switching power device.

In the above-mentioned current command type PWM inverter apparatus, preferably, wherein, when the first line current comparison signal has the second level, the second line current comparison signal has the zero level and the third line current comparison signal has the zero level at the state updating first timing, said logic circuit generates and outputs the second, third and fourth switching command signals for respectively turning off the second, third and fourth main circuit switching power devices, and further generates and outputs the first, fifth and sixth switching command signals for respectively turning on the first, fifth and sixth main circuit switching power devices, and for a time interval from a second timing when the first line current comparison signal changes to the zero level to the next state updating first timing, said logic circuit generates and outputs the first switching command signal for turning off the first main circuit switching power device and further generates and outputs the fourth switching command signal for turning on the fourth main circuit switching power device, wherein, when the first line current comparison signal has the zero level, the second line current comparison signal has the second level and the third line current comparison signal has the zero level at the state updating first timing, said logic circuit generates and outputs the first, third and fifth switching command signals for respectively turning off the first, third and fifth main circuit switching power devices, and further generates and outputs the second, fourth and sixth switching command signals for respectively turning on the second, fourth and sixth main circuit switching power devices, and for a time interval from a second timing when the second line current comparison signal changes to the zero level to the next state updating first timing, said logic circuit generates and outputs the second switching command signal for turning off the second main circuit switching power device and further generates and outputs the fifth switching command signal for turning on the fifth main circuit switching power device, wherein, when the first line current comparison signal has the zero level, the second line current comparison signal has the zero level and the third line current comparison signal has the second level at the state updating first timing, said logic circuit generates and outputs the first, second and sixth switching command signals for respectively turning off the first, second and sixth main circuit switching power devices, and further generates and outputs the third, fourth and fifth switching command signals for respectively turning on the third, fourth and fifth main circuit switching power devices, and for a time interval from a second timing when the third line current comparison signal changes to the zero level to the next state updating first timing, said logic circuit generates and outputs the third switching command signal for turning off the third main circuit switching power device and further generates and outputs the sixth switching command signal for turning on the sixth main circuit switching power device, wherein, when the first line current comparison signal has the first level, the second line current comparison signal has the zero level and the third line current comparison signal has the zero level at the state updating first timing, said logic circuit generates and outputs the first, fifth and sixth switching command signals for respectively turning off the first, fifth and sixth main circuit switching power devices, and further generates and outputs the second, third and fourth switching command signals for respectively turning on the second, third and fourth main circuit switching power devices, and for a time interval from a second timing when the first line current comparison signal changes to the zero level to the next state updating first timing, said logic circuit generates and outputs the fourth switching command signal for turning off the fourth main circuit switching power device and further generates and outputs the first switching command signal for turning on the first main circuit switching power device, wherein, when the first line current comparison signal has the zero level, the second line current comparison signal has the first level and the third line current comparison signal has the zero level at the state updating first timing, said logic circuit generates and outputs the second, fourth and sixth switching command signals for respectively turning off the second, fourth and sixth main circuit switching power devices, and further generates and outputs the first, third and fifth switching command signals for respectively turning on the first, third and fifth main circuit switching power devices, and for a time interval from a second timing when the second line current comparison signal changes to the zero level to the next state updating first timing, said logic circuit generates and outputs the fifth switching command signal for turning off the fifth main circuit switching power device and further generates and outputs the second switching command signal for turning on the second main circuit switching power device, and wherein, when the first line current comparison signal has the zero level, the second line current comparison signal has the zero level and the third line current comparison signal has the first level at the state updating first timing, said logic circuit generates and outputs the third, fourth and fifth switching command signals for respectively turning off the third, fourth and fifth main circuit switching power devices, and further generates and outputs the first, second and sixth switching command signals for respectively turning on the first, second and sixth main circuit switching power devices, and for a time interval from a second timing when the third line current comparison signal changes to the zero level to the next state updating first timing, said logic circuit generates and outputs the sixth switching command signal for turning off the sixth main circuit switching power device and further generates and outputs the third switching command signal for turning on the third main circuit switching power device.

In the above-mentioned current command type PWM inverter apparatus, preferably, wherein, when the first line current comparison signal has the first level, the second line current comparison signal has the second level and the third line current comparison signal has the zero level at the state updating first timing, said logic circuit generates and outputs the first and fifth switching command signals for respectively turning off the first and fifth main circuit switching power devices, generates and outputs the second and fourth switching command signals for respectively turning on the second and fourth main circuit switching power devices, generates and outputs either one of the third or sixth switching command signal for turning off the third or sixth main circuit switching power device, and generates and outputs the remaining one switching command signal for turning on the remaining one main circuit switching power device, when said logic circuit has generated and outputted the third switching command signal for turning off the third main circuit switching power device and the sixth switching command signal for turning on the sixth main circuit switching power device, said logic circuit generates and outputs the second switching command signal for turning off the second main circuit switching power device and the fifth switching command signal for turning on the fifth main circuit switching power device, for a time interval from a second timing when the second line current comparison signal changes to the first level to the next state updating first timing, and when said logic circuit has generated and outputted the sixth switching command signal for turning off the sixth main circuit switching power device and the third switching command signal for turning on the third main circuit switching power device, said logic circuit generates and outputs the fourth switching command signal for turning off the fourth main circuit switching power device and the first switching command signal for turning on the first main circuit switching power device, for a time interval from a second timing when the first line current comparison signal changes to the second level to the next state updating first timing, wherein, when the first line current comparison signal has the zero level, the second line current comparison signal has the first level and the third line current comparison signal has the second level at the state updating first timing, said logic circuit generates and outputs the second and sixth switching command signals for respectively turning off the second and sixth main circuit switching power devices, generates and outputs the third and fifth switching command signals for respectively turning on the third and fifth main circuit switching power devices, generates and outputs either one of the first or fourth switching command signal for turning off the first or fourth main circuit switching power device, and generates and outputs the remaining one switching command signal for turning on the remaining one main circuit switching power device, when said logic circuit has generated and outputted the first switching command signal for turning off the first main circuit switching power device and the fourth switching command signal for turning on the fourth main circuit switching power device, said logic circuit generates and outputs the fifth switching command signal for turning off the fifth main circuit switching power device and the second switching command signal for turning on the second main circuit switching power device, for a time interval from a second timing when the third line current comparison signal changes to the first level to the next state updating first timing, and when said logic circuit has generated and outputted the fourth switching command signal for turning off the fourth main circuit switching power device and the first switching command signal for turning on the first main circuit switching power device, said logic circuit generates and outputs the first switching command signal for turning off the first main circuit switching power device and the fourth switching command signal for turning on the fourth main circuit switching power device, for a time interval from a second timing when the second line current comparison signal changes to the second level to the next state updating first timing, wherein, when the first line current comparison signal has the second level, the second line current comparison signal has the zero level and the third line current comparison signal has the first level at the state updating first timing, said logic circuit generates and outputs the third and fourth switching command signals for respectively turning off the third and fourth main circuit switching power devices, generates and outputs the first and sixth switching command signals for respectively turning on the first and sixth main circuit switching power devices, generates and outputs either one of the second or fifth switching command signal for turning off the second or fifth main circuit switching power device, and generates and outputs the remaining one switching command signal for turning on the remaining one main circuit switching power device, when said logic circuit has generated and outputted the second switching command signal for turning off the second main circuit switching power device and the fifth switching command signal for turning on the fifth main circuit switching power device, said logic circuit generates and outputs the first switching command signal for turning off the first main circuit switching power device and the fourth switching command signal for turning on the fourth main circuit switching power device, for a time interval from a second timing when the first line current comparison signal changes to the first level to the next state updating first timing, and when said logic circuit has generated and outputted the fifth switching command signal for turning off the fifth main circuit switching power device and the second switching command signal for turning on the second main circuit switching power device, said logic circuit generates and outputs the sixth switching command signal for turning off the sixth main circuit switching power device and the third switching command signal for turning on the third main circuit switching power device, for a time interval from a second timing when the third line current comparison signal changes to the second level to the next state updating first timing, wherein, when the first line current comparison signal has the second level, the second line current comparison signal has the first level and the third line current comparison signal has the zero level at the state updating first timing, said logic circuit generates and outputs the second and fourth switching command signals for respectively turning off the second and fourth main circuit switching power devices, generates and outputs the first and fifth switching command signals for respectively turning on the first and fifth main circuit switching power devices, generates and outputs either one of the third or sixth switching command signal for turning off the third or sixth main circuit switching power device, and generates and outputs the remaining one switching command signal for turning on the remaining one main circuit switching power device, when said logic circuit has generated and outputted the third switching command signal for turning off the third main circuit switching power device and the sixth switching command signal for turning on the sixth main circuit switching power device, said logic circuit generates and outputs the first switching command signal for turning off the first main circuit switching power device and the fourth switching command signal for turning on the fourth main circuit switching power device, for a time interval from a second timing when the first line current comparison signal changes to the first level to the next state updating first timing, and when said logic circuit has generated and outputted the sixth switching command signal for turning off the sixth main circuit switching power device and the third switching command signal for turning on the third main circuit switching power device, said logic circuit generates and outputs the fifth switching command signal for turning off the fifth main circuit switching power device and the second switching command signal for turning on the second main circuit switching power device, for a time interval from a second timing when the second line current comparison signal changes to the second level to the next state updating first timing, wherein, when the first line current comparison signal has the zero level, the second line current comparison signal has the second level and the third line current comparison signal has the first level at the state updating first timing, said logic circuit generates and outputs the third and fifth switching command signals for respectively turning off the third and fifth main circuit switching power devices, generates and outputs the second and sixth switching command signals for respectively turning on the second and sixth main circuit switching power devices, generates and outputs either one of the first or fourth switching command signal for turning off the first or fourth main circuit switching power device, and generates and outputs the remaining one switching command signal for turning on the remaining one main circuit switching power device, when said logic circuit has generated and outputted the first switching command signal for turning off the first main circuit switching power device and the fourth switching command signal for turning on the fourth main circuit switching power device, said logic circuit generates and outputs the fifth switching command signal for turning off the fifth main circuit switching power device and the second switching command signal for turning on the second main circuit switching power device, for a time interval from a second timing when the second line current comparison signal changes to the first level to the next state updating first timing, and when said logic circuit has generated and outputted the fourth switching command signal for turning off the fourth main circuit switching power device and the first switching command signal for turning on the first main circuit switching power device, said logic circuit generates and outputs the third switching command signal for turning off the third main circuit switching power device and the sixth switching command signal for turning on the sixth main circuit switching power device, for a time interval from a second timing when the third line current comparison signal changes to the second level to the next state updating first timing, and wherein, when the first line current comparison signal has the first level, the second line current comparison signal has the zero level and the third line current comparison signal has the second level at the state updating first timing, said logic circuit generates and outputs the first and sixth switching command signals for respectively turning off the first and sixth main circuit switching power devices, generates and outputs the third and fourth switching command signals for respectively turning on the third and fourth main circuit switching power devices, generates and outputs either one of the second or fifth switching command signal for turning off the second or fifth main circuit switching power device, and generates and outputs the remaining one switching command signal for turning on the remaining one main circuit switching power device, when said logic circuit has generated and outputted the second switching command signal for turning off the second main circuit switching power device and the fifth switching command signal for turning on the fifth main circuit switching power device, said logic circuit generates and outputs the third switching command signal for turning off the third main circuit switching power device and the sixth switching command signal for turning on the sixth main circuit switching power device, for a time interval from a second timing when the third line current comparison signal changes to the first level to the next state updating first timing, and when said logic circuit has generated and outputted the fifth switching command signal for turning off the fifth main circuit switching power device and the second switching command signal for turning on the second main circuit switching power device, said logic circuit generates and outputs the fourth switching command signal for turning off the fourth main circuit switching power device and the first switching command signal for turning on the first main circuit switching power device, for a time interval from a second timing when the first line current comparison signal changes to the second level to the next state updating first timing.

In the above-mentioned current command type PWM inverter apparatus, preferably, wherein, when the first line current comparison signal has the first level, the second line current comparison signal has the second level and the third line current comparison signal has the zero level at the state updating first timing, said logic circuit generates and outputs the first and fifth switching command signals for respectively turning off the first and fifth main circuit switching power devices, and further generates and outputs the second and fourth switching command signals for respectively turning on the second and fourth main circuit switching power devices, when said logic circuit has generated and outputted the third switching command signal for turning off the third main circuit switching power device and the sixth switching command signal for turning on the sixth main circuit switching power device just before the state updating first timing, said logic circuit generates and outputs the third switching command signal for turning off the third main circuit switching power device and the sixth switching command signal for turning on the sixth main circuit switching power device, and further generates and outputs the second switching command signal for turning off the second main circuit switching power device and the fifth switching command signal for turning on the fifth main circuit switching power device for a time interval from a second timing when the second line current comparison signal changes to the first level to the next state updating first timing, and when said logic circuit has generated and outputted the sixth switching command signal for turning off the sixth main circuit switching power device and the third switching command signal for turning on the third main circuit switching power device just before the state updating first timing, said logic circuit generates and outputs the sixth switching command signal for turning off the sixth main circuit switching power device and the third switching command signal for turning on the third main circuit switching power device, and further generates and outputs the fourth switching command signal for turning off the fourth main circuit switching power device and the first switching command signal for turning on the first main circuit switching power device for a time interval from a second timing when the first line current comparison signal changes to the second level to the next state updating first timing, wherein, when the first line current comparison signal has the zero level, the second line current comparison signal has the first level and the third line current comparison signal has the second level at the state updating first timing, said logic circuit generates and outputs the second and sixth switching command signals for respectively turning off the second and sixth main circuit switching power devices, and further generates and outputs the third and fifth switching command signals for respectively turning on the third and fifth main circuit switching power devices, when said logic circuit has generated and outputted the first switching command signal for turning off the first main circuit switching power device and the fourth switching command signal for turning on the fourth main circuit switching power device just before the state updating first timing, said logic circuit generates and outputs the first switching command signal for turning off the first main circuit switching power device and the fourth switching command signal for turning on the fourth main circuit switching power device, and further generates and outputs the fifth switching command signal for turning off the fifth main circuit switching power device and the second switching command signal for turning on the second main circuit switching power device, for a time interval from a second timing when the third line current comparison signal changes to the first level to the next state updating first timing, and when said logic circuit has generated and outputted the fourth switching command signal for turning off the fourth main circuit switching power device and the first switching command signal for turning on the first main circuit switching power device just before the state updating first timing, said logic circuit generates and outputs the fourth switching command signal for turning off the fourth main circuit switching power device and the first switching command signal for turning on the first main circuit switching power device, and further generates and outputs the first switching command signal for turning off the first main circuit switching power device and the fourth switching command signal for turning on the fourth main circuit switching power device, for a time interval from a second timing when the second line current comparison signal changes to the second level to the next state updating first timing, wherein, when the first line current comparison signal has the second level, the second line current comparison signal has the zero level and the third line current comparison signal has the first level at the state updating first timing, said logic circuit generates and outputs the third and fourth switching command signals for respectively turning off the third and fourth main circuit switching power devices, and further generates and outputs the first and sixth switching command signals for respectively turning on the first and sixth main circuit switching power devices, when said logic circuit has generated and outputted the second switching command signal for turning off the second main circuit switching power device and the fifth switching command signal for turning on the fifth main circuit switching power device just before the state updating first timing, said logic circuit generates and outputs the second switching command signal for turning off the second main circuit switching power device and the fifth switching command signal for turning on the fifth main circuit switching power device, and further generates and outputs the first switching command signal for turning off the first main circuit switching power device and the fourth switching command signal for turning on the fourth main circuit switching power device, for a time interval from a second timing when the first line current comparison signal changes to the first level to the next state updating first timing, and when said logic circuit has generated and outputted the fifth switching command signal for turning off the fifth main circuit switching power device and the second switching command signal for turning on the second main circuit switching power device just before the state updating first timing, said logic circuit generates and outputs the fifth switching command signal for turning off the fifth main circuit switching power device and the second switching command signal for turning on the second main circuit switching power device, and further generates and outputs the sixth switching command signal for turning off the sixth main circuit switching power device and the third switching command signal for turning on the third main circuit switching power device, for a time interval from a second timing when the third line current comparison signal changes to the second level to the next state updating first timing, wherein, when the first line current comparison signal has the second level, the second line current comparison signal has the first level and the third line current comparison signal has the zero level at the state updating first timing, said logic circuit generates and outputs the second and fourth switching command signals for respectively turning off the second and fourth main circuit switching power devices, and further generates and outputs the first and fifth switching command signals for respectively turning on the first and fifth main circuit switching power devices, when said logic circuit has generated and outputted the third switching command signal for turning off the third main circuit switching power device and the sixth switching command signal for turning on the sixth main circuit switching power device just before the state updating first timing, said logic circuit generates and outputs the third switching command signal for turning off the third main circuit switching power device and the sixth switching command signal for turning on the sixth main circuit switching power device, and further generates and outputs the first switching command signal for turning off the first main circuit switching power device and the fourth switching command signal for turning on the fourth main circuit switching power device, for a time interval from a second timing when the first line current comparison signal changes to the first level to the next state updating first timing, and when said logic circuit has generated and outputted the sixth switching command signal for turning off the sixth main circuit switching power device and the third switching command signal for turning on the third main circuit switching power device just before the state updating first timing, said logic circuit generates and outputs the sixth switching command signal for turning off the sixth main circuit switching power device and the third switching command signal for turning on the third main circuit switching power device and further generates and outputs the fifth switching command signal for turning off the fifth main circuit switching power device and the second switching command signal for turning on the second main circuit switching power device, for a time interval from a second timing when the second line current comparison signal changes to the second level to the next state updating first timing, wherein, when the first line current comparison signal has the zero level, the second line current comparison signal has the second level and the third line current comparison signal has the first level at the state updating first timing, said logic circuit generates and outputs the third and fifth switching command signals for respectively turning off the third and fifth main circuit switching power devices, and further generates and outputs the second and sixth switching command signals for respectively turning on the second and sixth main circuit switching power devices, when said logic circuit has generated and outputted the first switching command signal for turning off the first main circuit switching power device and the fourth switching command signal for turning on the fourth main circuit switching power device just before the state updating first timing, said logic circuit generates and outputs the first switching command signal for turning off the first main circuit switching power device and the fourth switching command signal for turning on the fourth main circuit switching power device, and further generates and outputs the fifth switching command signal for turning off the fifth main circuit switching power device and the second switching command signal for turning on the second main circuit switching power device, for a time interval from a second timing when the second line current comparison signal changes to the first level to the next state updating first timing, and when said logic circuit has generated and outputted the fourth switching command signal for turning off the fourth main circuit switching power device and the first switching command signal for turning on the first main circuit switching power device just before the state updating first timing, said logic circuit generates and outputs the fourth switching command signal for turning off the fourth main circuit switching power device and the first switching command signal for turning on the first main circuit switching power device, and further generates and outputs the third switching command signal for turning off the third main circuit switching power device and the sixth switching command signal for turning on the sixth main circuit switching power device, for a time interval from a second timing when the third line current comparison signal changes to the second level to the next state updating first timing, and wherein, when the first line current comparison signal has the first level, the second line current comparison signal has the zero level and the third line current comparison signal has the second level at the state updating first timing, said logic circuit generates and outputs the first and sixth switching command signals for respectively turning off the first and sixth main circuit switching power devices, and further generates and outputs the third and fourth switching command signals for respectively turning on the third and fourth main circuit switching power devices, when said logic circuit has generated and outputted the second switching command signal for turning off the second main circuit switching power device and the fifth switching command signal for turning on the fifth main circuit switching power device just before the state updating first timing, said logic circuit generates and outputs the second switching command signal for turning off the second main circuit switching power device and the fifth switching command signal for turning on the fifth main circuit switching power device, and further generates and outputs the third switching command signal for turning off the third main circuit switching power device and the sixth switching command signal for turning on the sixth main circuit switching power device, for a time interval from a second timing when the third line current comparison signal changes to the first level to the next state updating first timing, and when said logic circuit has generated and outputted the fifth switching command signal for turning off the fifth main circuit switching power device and the second switching command signal for turning on the second main circuit switching power device just before the state updating first timing, said logic circuit generates and outputs the fifth switching command signal for turning off the fifth main circuit switching power device and the second switching command signal for turning on the second main circuit switching power device, and further generates and outputs the fourth switching command signal for turning off the fourth main circuit switching power device and the first switching command signal for turning on the first main circuit switching power device, for a time interval from a second timing when the first line current comparison signal changes to the second level to the next state updating first timing.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which:

FIG. 4 is a timing chart of respective clock signals generated by a timing signal generator 11 shown in FIG. 1;

FIGS. 5A, 5B, 5C and 5D are operation explanatory timing charts showing an operation of the PWM inverter apparatus of the preferred embodiment, wherein FIG. 5A is a timing chart of signals iTU, iTV and iTW and signals iFU, iFV and iFW, FIG. 5B is a timing chart of the signals iTU, iTV and iTW and the signals iFU, iFV and iFW, FIG. 5C is a timing chart of a clock signal CLK10, and FIG. 5D is a table showing an operation of respective timings;

FIGS. 11A, 11B, 11C, 11D and 11E are timing charts showing an operation of the prior art current controller 106 shown in FIG. 10, wherein FIG. 11A is a timing chart of signals iTU, iTV and iTW and signals iFU, iFV and iFW, FIG. 11B is a timing chart of signals VW, VV, VW and SC, FIG. 11C is a timing chart of a signal PU, FIG. 11D is a timing chart of a signal PV, and FIG. 11E is a timing chart of a signal PW;

FIG. 17 is a timing chart showing an operation of respective signals before and after a state No. J00-2 in Tables 4 and 5;

FIG. 19 is a timing chart showing an operation of respective signals at a transition from a state No. J00 to a state No. JX1 in Tables 10 and 11.

DETAILED DESCRIPTION OF THE PREFERRED EMBODIMENTS

Preferred embodiments according to the present invention will be described below with reference to FIGS. 1 through 8.

FIRST PREFERRED EMBODIMENT

Figure 8:
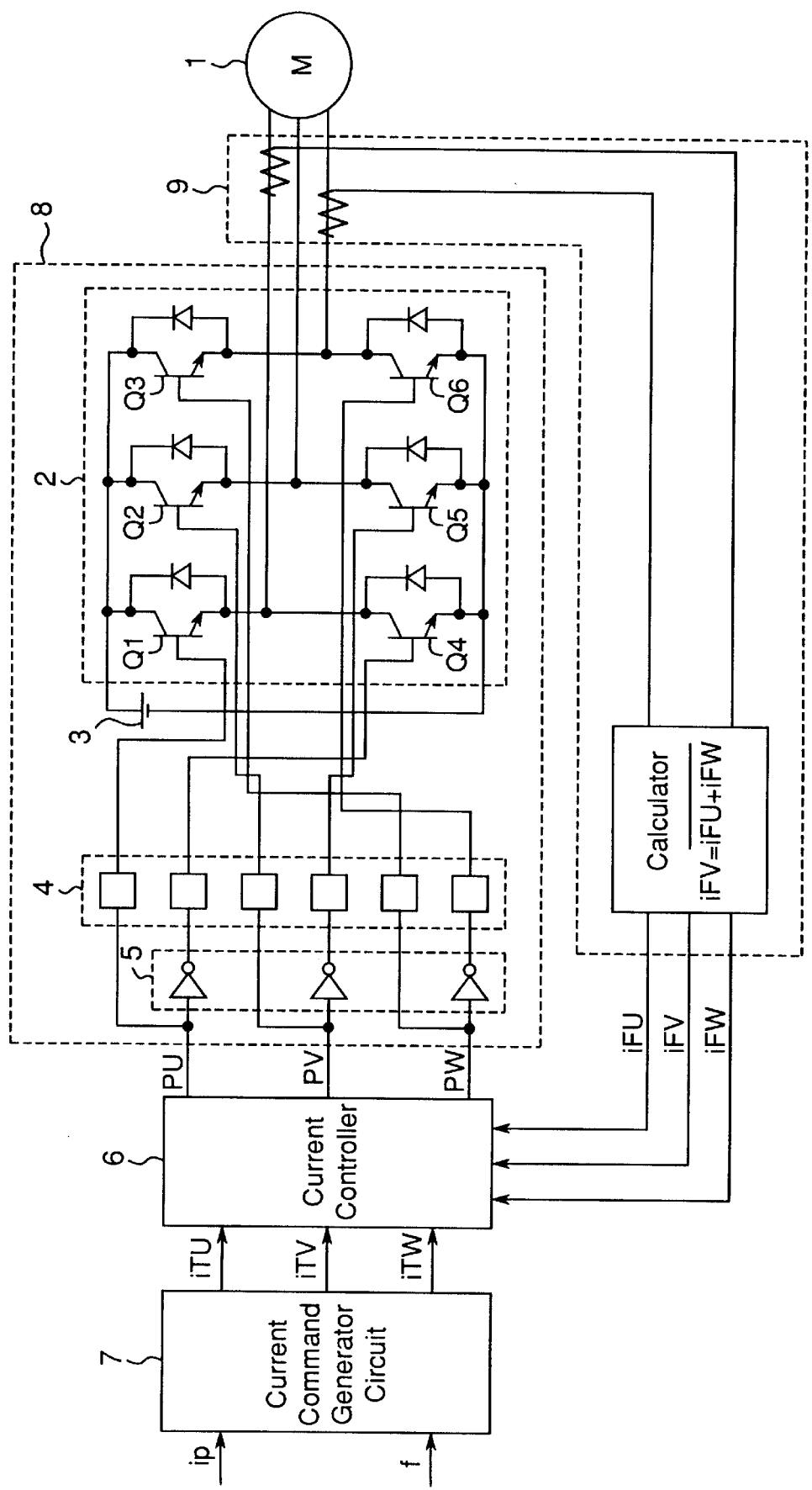
FIG. 8 is a block diagram of a current command type PWM inverter system of a preferred embodiment according to the present invention.
Figure 9:
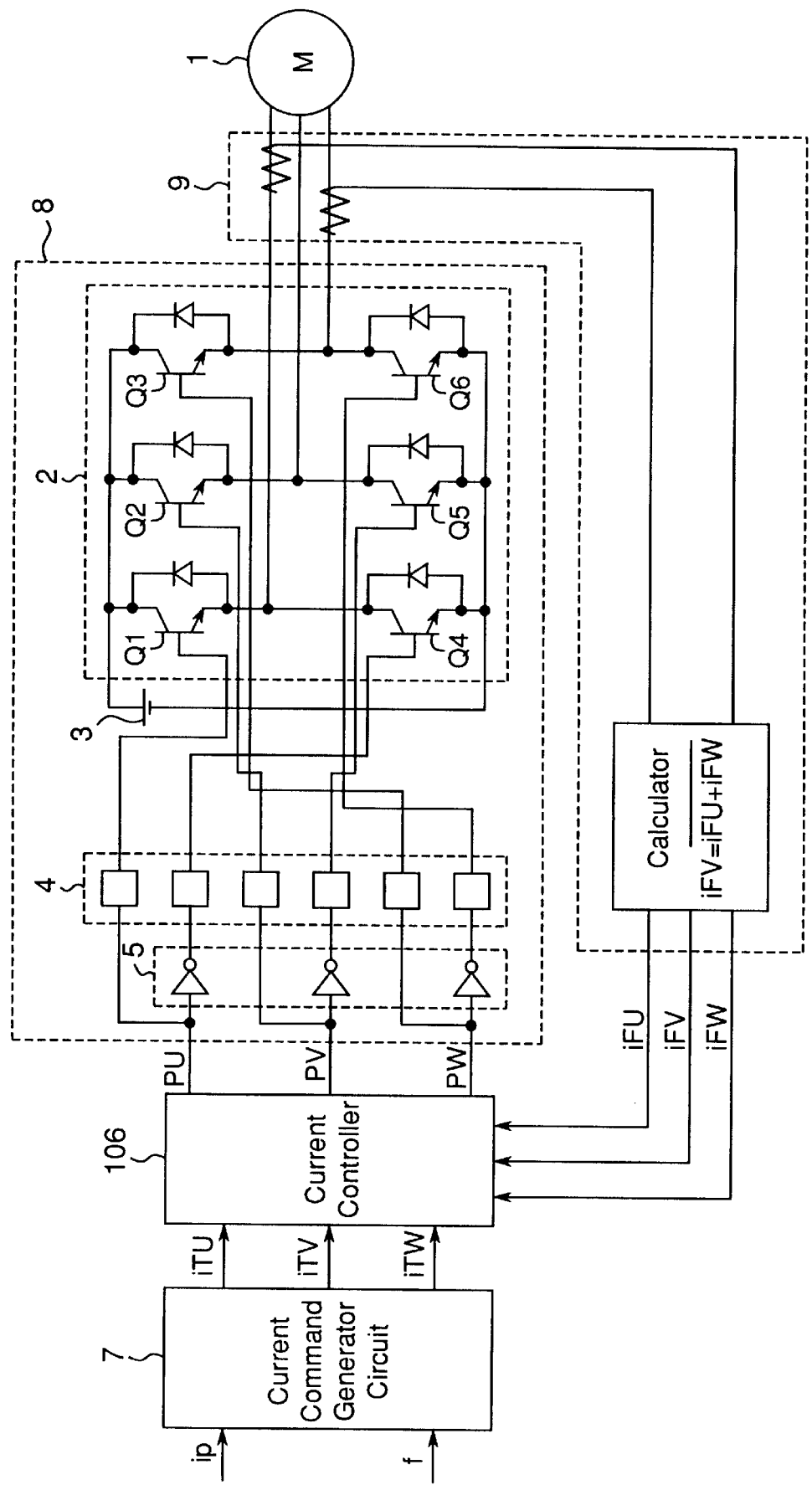
FIG. 9 is a block diagram of a generic prior art current command type PWM inverter system.
Figure 10:
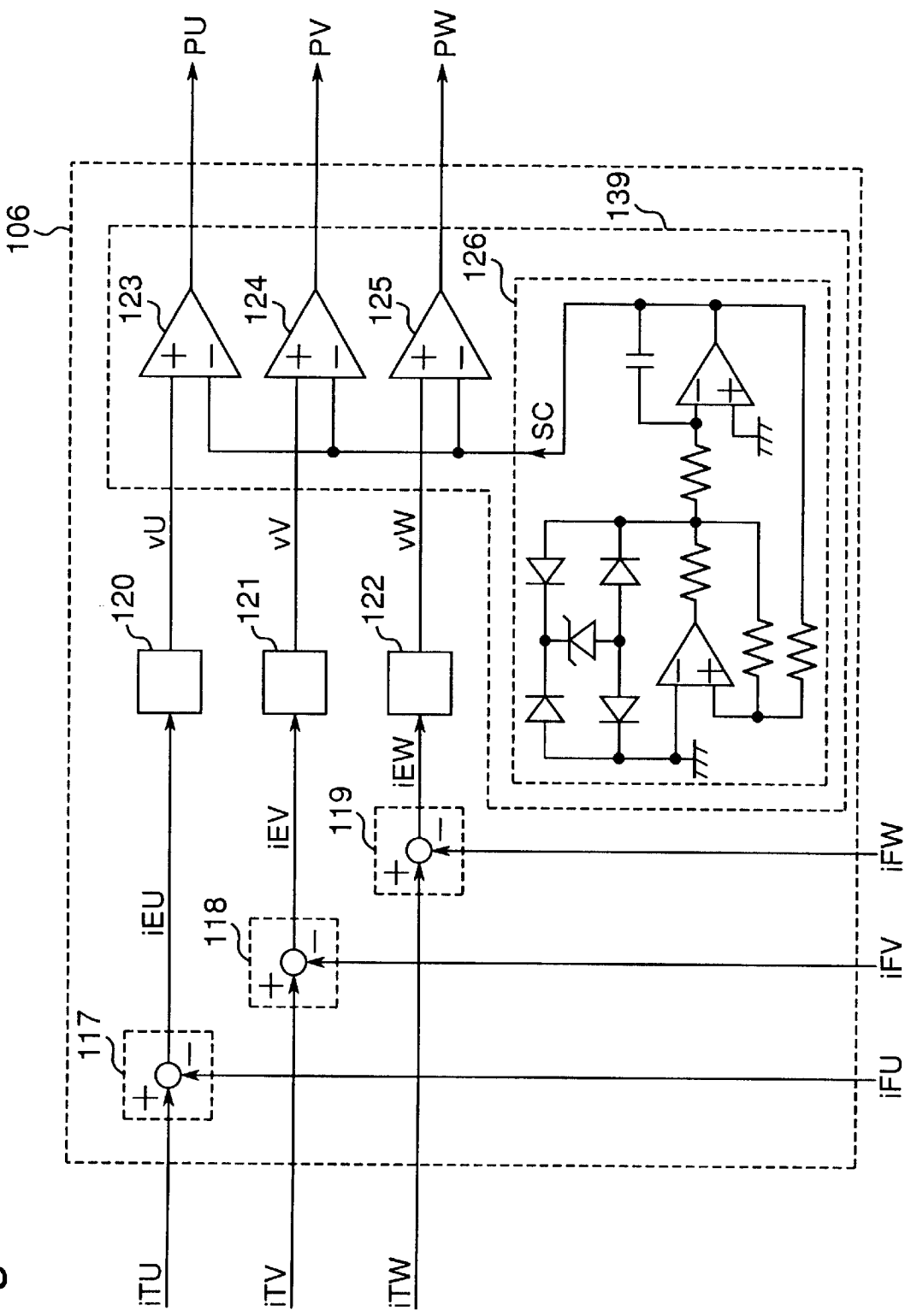
FIG. 10 is a block diagram of a prior art current controller 106 shown in FIG. 9.
Figure 11A:
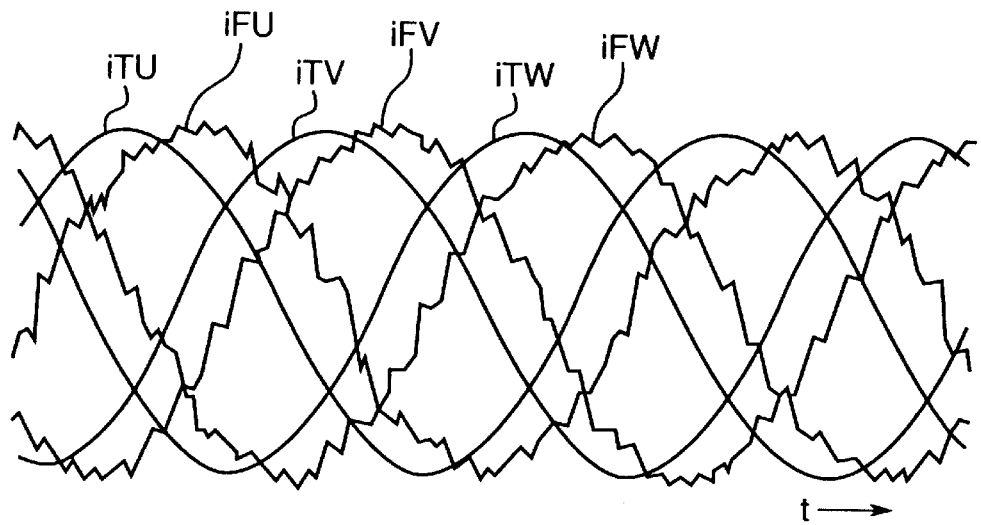
Figure 11B:
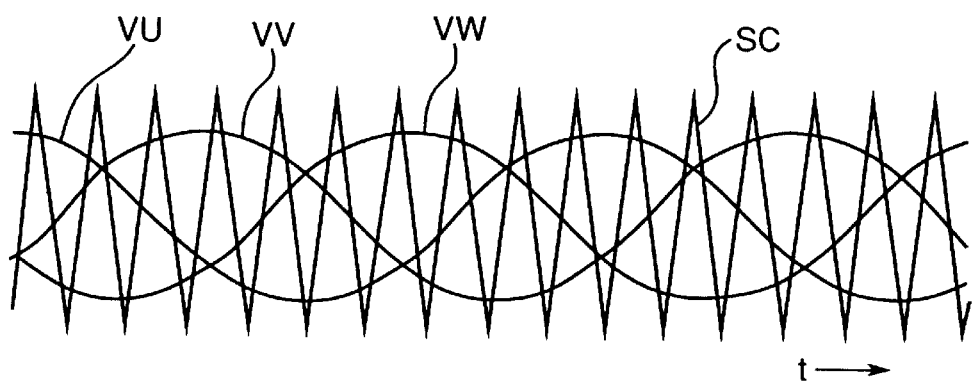
Figure 11C:
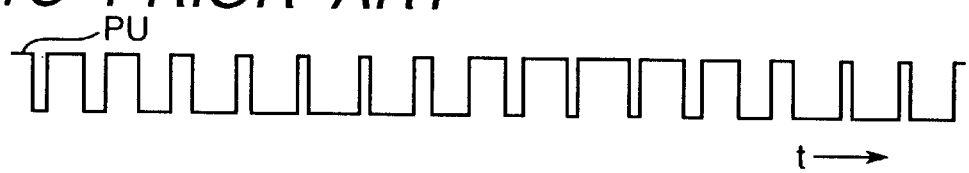
Figure 11D:
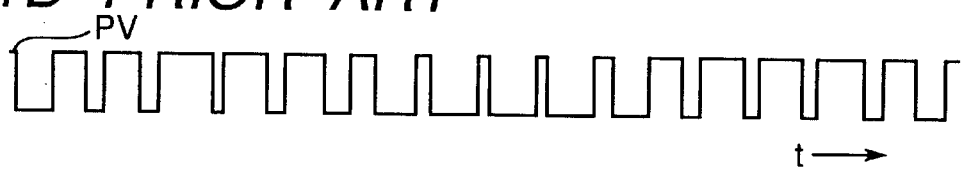
Figure 11E:
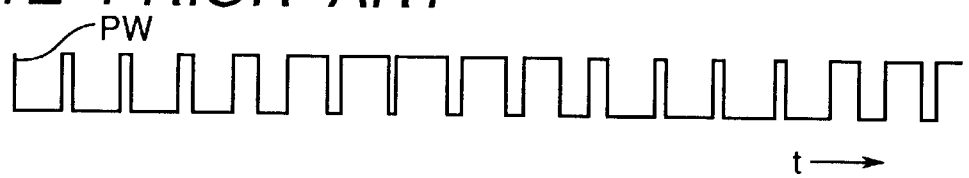
Figure 12:
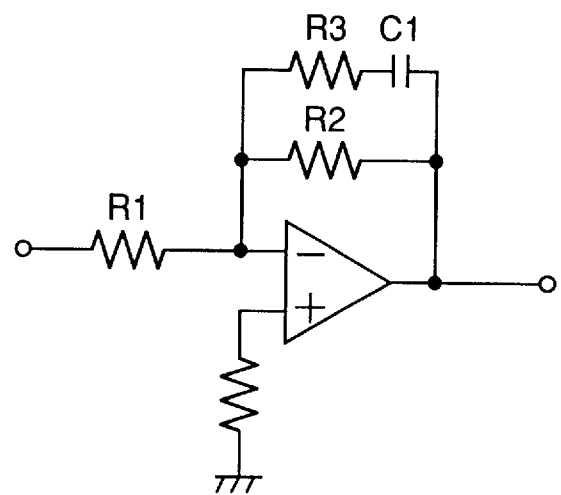
FIG. 12 is a circuit diagram of each of prior art current error amplifiers 117, 118 and 119.

FIG. 8 shows a structure of a current command type PWM inverter system of a first preferred embodiment according to the present invention.

Referring to FIG. 8, first of all, a fundamental frequency f and an effective current value ip of a three-phase AC current waveform to be supplied to a three-phase motor 1 are set in a current command generator 7, and based on the information, the current command generator 7 internally generates current command signals to be flowed into the three-phase motor 1, and then outputs a first line current command signal iTU, a second line current command signal iTV and a third line current command signal iTW.

Then, a motor current detector circuit 9 detects two line currents of the three-phase motor 1, obtains the remaining one line current by obtaining the sum of the detected two line currents and inverting the sign of the sum value, and outputs the resulting three line currents as a first detected line current iFU, a second detected line current iFV and a third detected line current iFW. It is to be noted that the motor current detector circuit 9 may detect the three line currents of the three-phase motor 1 and then output the first detected line current iFU, the second detected line current iFV and the third detected line current iFW.

Then, a current controller 6 receives the first line current command signal iTU, the second line current command signal iTV, the third line current command signal iTW, the first detected line current iFU, the second detected line current iFV and the third detected line current iFW, and then, generates a first switching command signal PU, a second switching command signal PV and a third switching command signal PW.

An operation of the current controller 6 will be described in detail later.

Further, a main circuit power controller 8 comprises: a main circuit DC power source 3, and a main circuit power device circuit 2 having a three-phase bridge connection. The main circuit power device circuit 2 comprises:

(a) a first main circuit switching power device Q1 which is connected to a positive electrode of the main circuit DC power source 3 and supplies a first line current IU to the three-phase motor 1;

(b) a second main circuit switching power device Q2 which is connected to the positive electrode of the main circuit DC power source 3 and supplies a second line current IV to the three-phase motor 1;

(c) a third main circuit switching power device Q3 which is connected to the positive electrode of the main circuit DC power source 3 and supplies a third line current IW to the three-phase motor 1;

(d) a fourth main circuit switching power device Q4 which is connected to a negative electrode of the main circuit DC power source 3 and supplies the first line current IU to the three-phase motor 1;

(e) a fifth main circuit switching power device Q5 which is connected to the negative electrode of the main circuit DC power source 3 and supplies the second line current IV to the three-phase motor 1;

(f) a sixth main circuit switching power device Q6 which is connected to the negative electrode of the main circuit DC power source 3 and supplies the third line current IW to the three-phase motor 1; and (g) six reflux diodes each connected in parallel between the collector and the emitter of each of the main circuit switching power devices.

The circuit comprised of the logic inverter circuit 5 and the base driving circuit 4 operates to turn on either the first main circuit switching power device Q1 or the fourth main circuit switching power device Q4 in accordance with the first switching command signal PU, to turn on either the second main circuit switching power device Q2 or the fifth main circuit switching power device Q5 in accordance with the second switching command signal PV, and to turn on either the third main circuit switching power device Q3 or the sixth main circuit switching power device Q6 in accordance with the third switching command signal PW.

In the preferred embodiment, when the first switching command signal PU becomes the H-level, the first main circuit switching power device Q1 is turned on. On the other hand, when the first switching command signal PU becomes the L-level, the fourth main circuit switching power device Q4 is turned on. When the second switching command signal PV becomes the H-level, the second main circuit switching power device Q2 is turned on. On the other hand, when the second switching command signal PV becomes the becomes the L-level, the fifth main circuit switching power device Q5 is turned on. When the third switching command signal PW becomes the H-level, the third main circuit switching power device Q3 is turned on. On the other hand, when the third switching command signal PW becomes the L-level, the sixth main circuit switching power device Q6 is turned on.

As above is described the structure of the current command type PWM inverter system of the first preferred embodiment according to the present invention.

Figure 1:
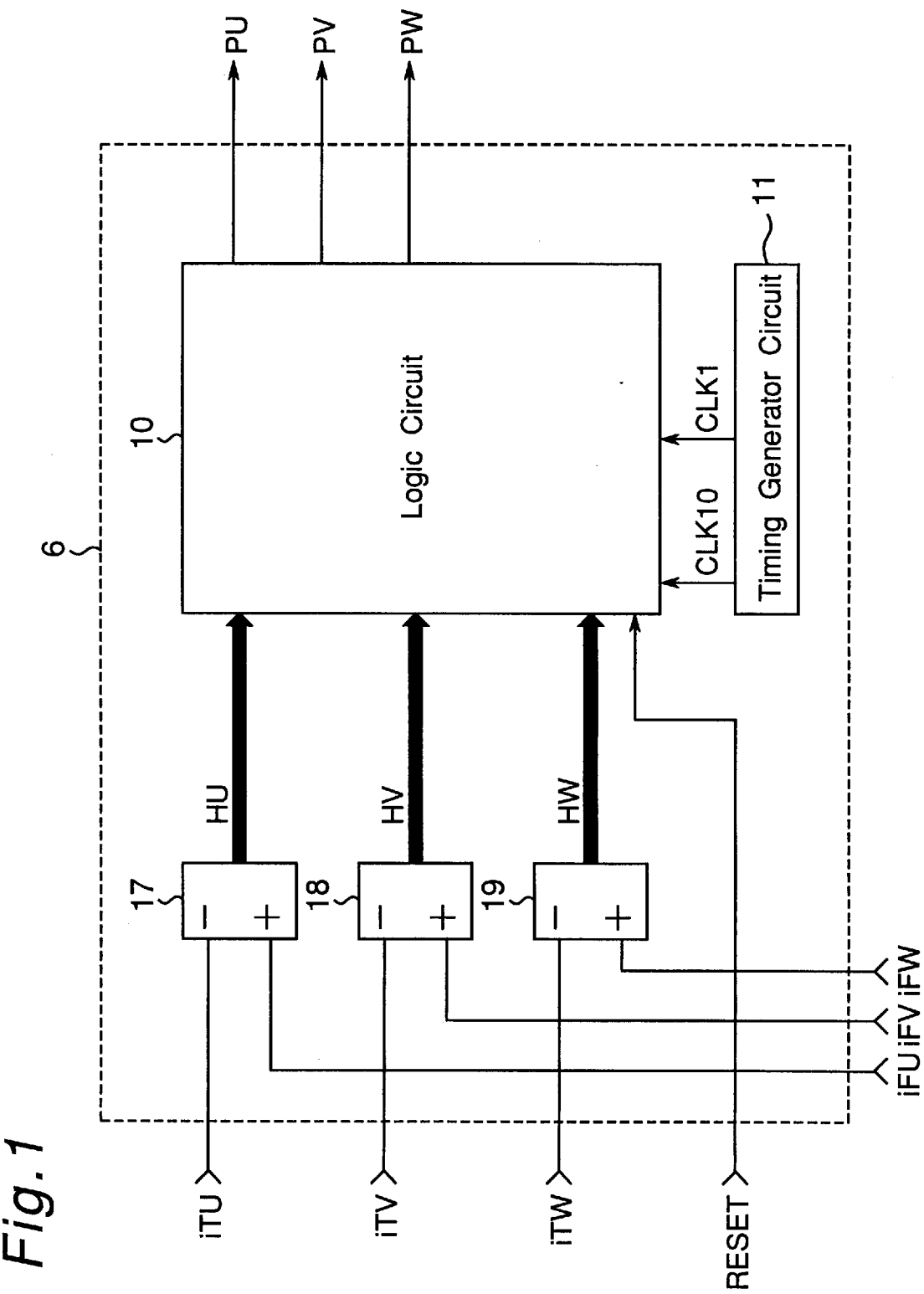
FIG. 1 is a block diagram of a current controller 6 for a current command type PWM inverter apparatus of a first preferred embodiment according to the present invention.

The current controller 6 of the current command type PWM inverter system of the first preferred embodiment according to the present invention shown in FIG. 8 has a construction as shown in FIG. 1.

Referring to FIG. 1, first, second and third comparators 17, 18 and 19 receive the command signals iTU, iTV and iTW at their respective inverted input terminals, respectively, and receive the first, second and third detected line currents iFU, iFV and iFW at their respective non-inverted input terminals, respectively. Then, the comparators 17, 18 and 19 output first, second and third line current comparison signals or comparison result signals HU, HV and HW, respectively. For the sake of convenience of the following explanation, in the preferred embodiments, each of the comparison signals HU, HV and HW is such that: if the difference between the line current command signal and the detected line current falls within an allowance range including zero (±V1) (where the allowance range is preferably a range smaller than 1%, more preferably a range smaller than 0.1%, and further more preferably a range smaller than 0.01%, then (upper bit, lower bit)=(H, L) (referred to as a level HL hereinafter); if the difference between the line current command signal and the detected line current falls outside the allowance range including zero and if the detected line current is greater than the value of the line current command signal, then (upper bit, lower bit)=(H, H) (referred to as a level HH hereinafter); and if the difference between the line current command signal and the detected line current falls outside the allowance range including zero and if the detected line current is smaller than the value of the line current command signal, then (upper bit, lower bit)=(L, L) (referred to as a level LL hereinafter). The concrete structure of these comparators can be implemented, for example, by a circuit as shown in FIG. 2.

Figure 2:
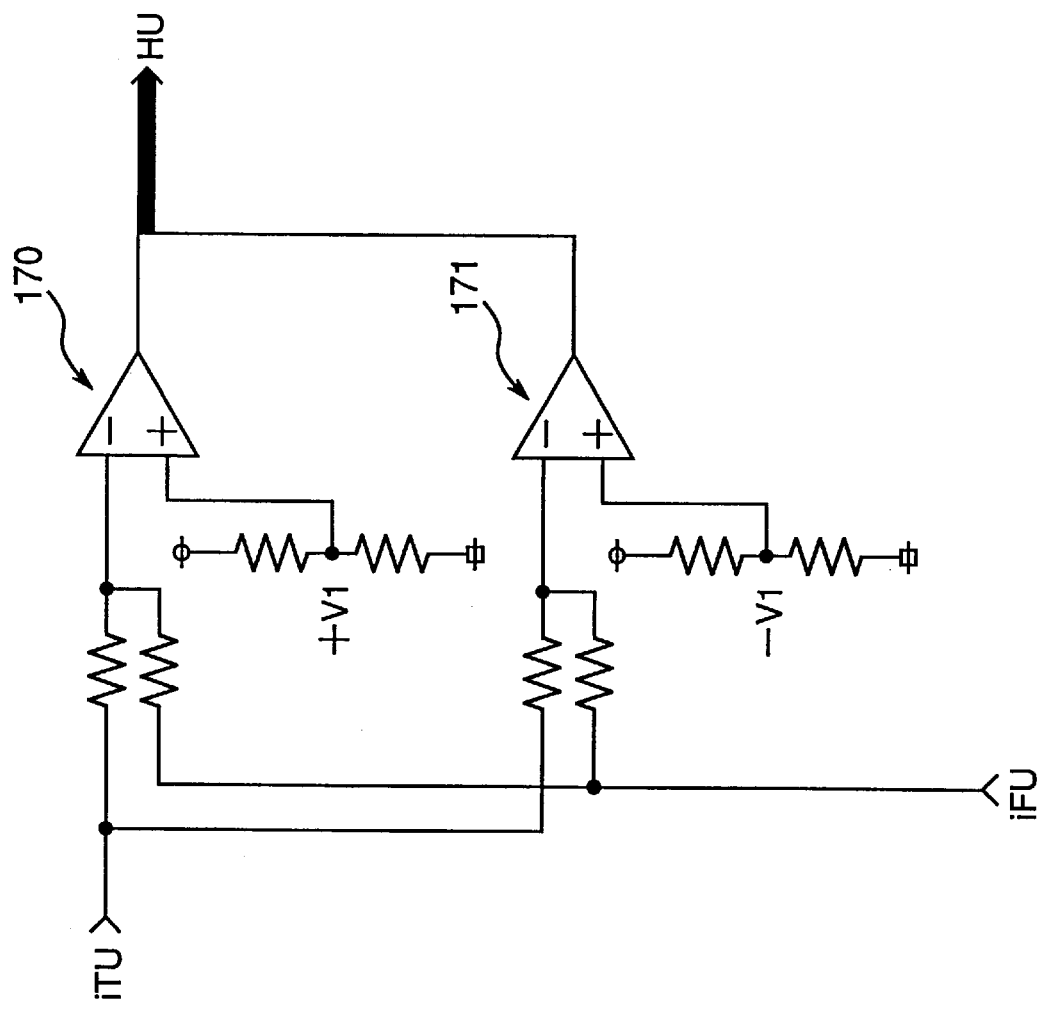
FIG. 2 is a block diagram of each of comparators 17, 18 and 19 shown in FIG. 1.

As shown in FIG. 2, the first line current command signal iTU and the first detected line current iFU are synthesized via resistors, and inputted to the (−) terminal side of each of the comparators 170, 171. The (+) side terminals of the comparators 170 and 171 are connected to reference voltages +V1 and −V1, respectively. Each of the comparators 170, 171 compares the synthesized value on the (+) terminal side with the reference voltage on the (−) terminal side. If the voltage on the (−) terminal side is greater than the other, the comparator outputs an L-level, while if the voltage on the (+) terminal side is greater than the other, the comparator outputs an H-level, as the comparison signal HU.

Then, a logic circuit 10 receives the first, second and third line current comparison signals HU, HV and HW as well as a state updating timing signal CLK10 from a timing generator 11, and then, outputs first, second and third switching command signals PU, PV and PW for commanding the turning-on and turning-off of the main circuit switching power devices Q1, Q2, Q3, Q4, Q5 and Q6.

First of all, the logic circuit 10 effects state switching based on the signal levels of the first, second and third line current comparison signals HU, HV and HW in accordance with the timing of the leading edge of the state updating timing signal CLK10, outputs the first, second and third switching command signals PU, PV and PW, and then updates the first, second and third switching command signals PU, PV and PW based on the switching of the signal levels of the first, second and third line current comparison signals HU, HV and HW.

The truth table of the logic circuit 10 is shown here in Tables 1 and 2. Table 1 and 2 constitute one continuing truth table.

TABLE 1

| State No. | Reset Signal RESET | Timing Signal CLK10 | Line Current Comparison Signal | | | Switching Command Signal | | | | | |
|---|---|---|---|---|---|---|---|---|---|---|---|
| | | | HU | KV | HW | Before Leading Edge of CLK10 | | | After Leading Edge of CLK10 | | |
| | | | | | | PU | PV | PW | PU | PV | PW |
| A00 | L | ↑ | LL | HH | HH | * | * | * | H | L | L |
| AX1 | L | ♦ | * | LL | HH | * | * | * | H | H | L |
| AX2 | L | ♦ | * | LL | LL | * | * | * | H | H | H |
| A00 | L | ↑ | LL | HH | HH | * | * | * | H | L | L |
| AY1 | L | ♦ | * | HH | LL | * | * | * | H | L | H |
| AY2 | L | ♦ | * | LL | LL | * | * | * | H | H | H |
| B00 | L | ↑ | HH | LL | HH | * | * | * | L | H | L |
| BX1 | L | ♦ | LL | * | HH | * | * | * | H | H | L |
| BX2 | L | ♦ | LL | * | LL | * | * | * | H | H | H |
| B00 | L | ↑ | HH | LL | HH | * | * | * | L | H | L |
| BY1 | L | ♦ | HH | * | LL | * | * | * | L | H | H |
| BY2 | L | ♦ | LL | * | LL | * | * | * | H | H | H |
| C00 | L | ↑ | HH | HH | LL | * | * | * | L | L | H |
| CX1 | L | ♦ | LL | HH | * | * | * | * | H | L | H |
| CX2 | L | ♦ | LL | LL | * | * | * | * | H | H | H |
| C00 | L | ↑ | HH | HH | LL | * | * | * | L | L | H |
| CY1 | L | ♦ | HH | LL | * | * | * | * | L | H | H |
| CY2 | L | ♦ | LL | LL | * | * | * | * | H | H | H |
| D00 | L | ↑ | HH | LL | LL | * | * | * | L | H | H |
| DX1 | L | ♦ | * | HH | LL | * | * | * | L | L | H |
| DX2 | L | ♦ | * | HH | HH | * | * | * | L | L | L |
| D00 | L | ↑ | HH | LL | LL | * | * | * | L | H | H |
| DY1 | L | ♦ | * | LL | HH | * | * | * | L | H | L |
| DY2 | L | ♦ | * | HH | HH | * | * | * | L | L | L |
| E00 | L | ↑ | LL | HH | LL | * | * | * | H | L | H |
| EX1 | L | ♦ | HH | * | LL | * | * | * | L | L | H |
| EX2 | L | ♦ | HH | * | HH | * | * | * | L | L | L |
| E00 | L | ↑ | LL | HH | LL | * | * | * | H | L | H |
| EY1 | L | ♦ | LL | * | HH | * | * | * | H | L | L |
| EY2 | L | ♦ | HH | * | HH | * | * | * | L | L | L |
| F00 | L | ↑ | LL | LL | HH | * | * | * | H | H | L |
| FX1 | L | ♦ | HH | LL | * | * | * | * | L | H | L |
| FX2 | L | ♦ | HH | *HH | * | * | * | * | L | L | L |
| F00 | L | ↑ | LL | LL | HH | * | * | * | H | H | L |
| FY1 | L | ♦ | LL | HH | * | * | * | * | H | L | L |
| FY2 | L | ♦ | HH | HH | * | * | * | * | L | L | L |

TABLE 2

| State No. | Reset Signal RESET | Timing Signal CLK10 | Line Current Comparison Signal | | | Switching Command Signal | | | | | | |
|---|---|---|---|---|---|---|---|---|---|---|---|---|
| | | | HU | KV | HW | Before Leading Edge of CLK10 | | | After Leading Edge of CLK10 | | | |
| | | | | | | PU | PV | PW | PU | PV | PW | |
| G00 | L | ♦ | HH | HH | HH | * | * | * | L | L | L | |
| H00 | L | ♦ | LL | LL | LL | * | * | * | H | H | H | |
| I00 | L | ↑ | HL | HL | HL | * | * | * | L | L | L | Note 1 |
| | | | | | | | | | H | H | H | |
| J00 | L | ↑ | HL | HL | LL | * | * | * | L | L | L | Note 1 |
| | | | | | | | | | H | H | H | |
| K00 | L | ↑ | LL | HL | HL | * | * | * | L | L | L | Note 1 |
| | | | | | | | | | H | H | H | |
| L00 | L | ↑ | HL | LL | HL | * | * | * | L | L | L | Note 1 |
| | | | | | | | | | H | H | H | |
| M00 | L | ↑ | HL | HL | HH | * | * | * | L | L | L | Note 1 |
| | | | | | | | | | H | H | H | |
| N00 | L | ↑ | HH | HL | HL | * | * | * | L | L | L | Note 1 |
| | | | | | | | | | H | H | H | |
| O00 | L | ↑ | HL | HH | HL | * | * | * | L | L | L | Note 1 |
| | | | | | | | | | H | H | H | |
| P00 | L | ↑ | HH | LL | HL | * | * | H | L | H | H | |
| PX1 | L | ♦ | * | * | LL | * | * | H | H | H | H | |
| P00 | L | ↑ | HH | LL | HL | * | * | L | L | H | L | |
| PY1 | L | ♦ | * | * | HH | * | * | L | L | L | L | |
| Q00 | L | ↑ | HL | HH | LL | H | * | * | H | L | H | |
| QX1 | L | ♦ | LL | * | * | H | * | * | H | H | H | |
| Q00 | L | ↑ | HL | HH | LL | L | * | * | L | L | H | |
| QY1 | L | ♦ | HH | * | * | L | * | * | L | L | L | |
| R00 | L | ↑ | LL | HL | HH | * | H | * | H | H | L | |

TABLE 2-continued

| State No. | Reset Signal RESET | Timing Signal CLK10 | Line Current Comparison Signal | | | Switching Command Signal | | | | | |
|---|---|---|---|---|---|---|---|---|---|---|---|
| | | | | | | Before Leading Edge of CLK10 | | | After Leading Edge of CLK10 | | |
| | | | HU | KV | HW | PU | PV | PW | PU | PV | PW |
| RX1 | L | ♦ | * | LL | * | * | H | * | H | H | H |
| R00 | L | ↑ | LL | HL | HH | * | L | * | H | L | L |
| RY1 | L | ♦ | * | HH | * | * | L | * | L | L | L |
| S00 | L | ↑ | LL | HH | HL | * | * | H | H | L | H |
| SX1 | L | ♦ | * | * | LL | * | * | H | H | H | H |
| S00 | L | ↑ | LL | HH | HL | * | * | L | H | L | L |
| SY1 | L | ♦ | * | * | HH | * | * | L | L | L | L |
| T00 | L | ↑ | HL | LL | HH | H | * | * | H | H | L |
| TX1 | L | ♦ | LL | * | * | H | * | * | H | H | H |
| T00 | L | ↑ | HL | LL | HH | L | * | * | L | H | L |
| TY1 | L | ♦ | HH | * | * | L | * | * | L | L | L |
| U00 | L | ↑ | HH | HL | LL | * | H | * | L | H | H |
| UX1 | L | ♦ | * | LL | * | * | H | * | H | H | H |
| U00 | L | ↑ | HH | HL | LL | * | L | * | L | L | H |
| UY1 | L | ♦ | * | HH | * | * | L | * | L | L | L |
| CLR | H | ♦ | * | * | * | * | * | * | L | L | L |

Note 1: (PU, PV, PW) is an armature-shortcircuited state: it may be either (H, H, H) or (L, L, L).

How to read Tables 1 and 2 is as follows.

In Tables 1 and 2, the state No. (I00, AX1, AX2, A00, AY1, AY2, B00, BX1, etc.) represents the input and output state of the logic circuit 10, the symbol ↑ of the state updating timing signal represents the leading edge of the state updating timing signal CLK10, and the symbol ♦ represents the stable state of the H-level or the L-level.

Furthermore, the symbol * of the line current comparison signal represents "DON'T CARE", i.e., the operation does not depend on whether the state is at the H-level or the L-level.

Regarding the others, H represents the H-level, and L represents the L-level.

A reset signal RESET is an input signal for initializing the logic circuit 10, and the reset signal RESET normally has the L-level. The logic circuit 10 is immediately initialized when the reset signal becomes the H-level.

An operation of the logic circuit 10 will be described below according to Tables 1 and 2. First of all, when the state updating timing signal CLK10 rises (when its leading edge is inputted), the system state shifts to any one of twenty-one state Nos. A00, B00, C00, D00, E00, F00, G00, H00, I00, J00, K00, L00, M00, N00 O00, P00, Q00, R00, S00, T00 and U00 in accordance with the levels of the first, second and third line current comparison signals HU, HV and HW at the timing.

Figure 13:
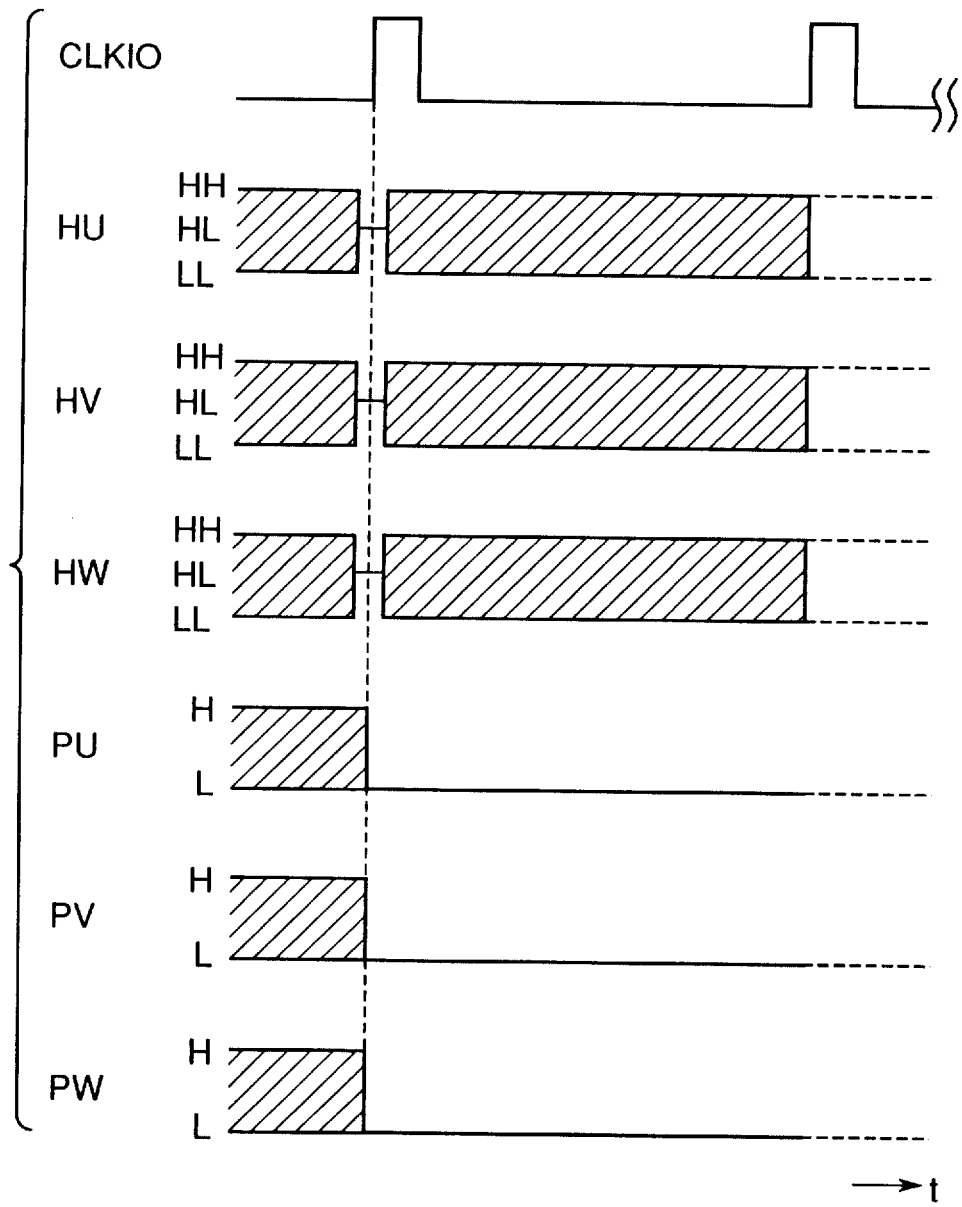
FIG. 13 is a timing chart showing an operation of respective signals before and after a state No. I00 in Tables 1 and 2.
Figure 14:
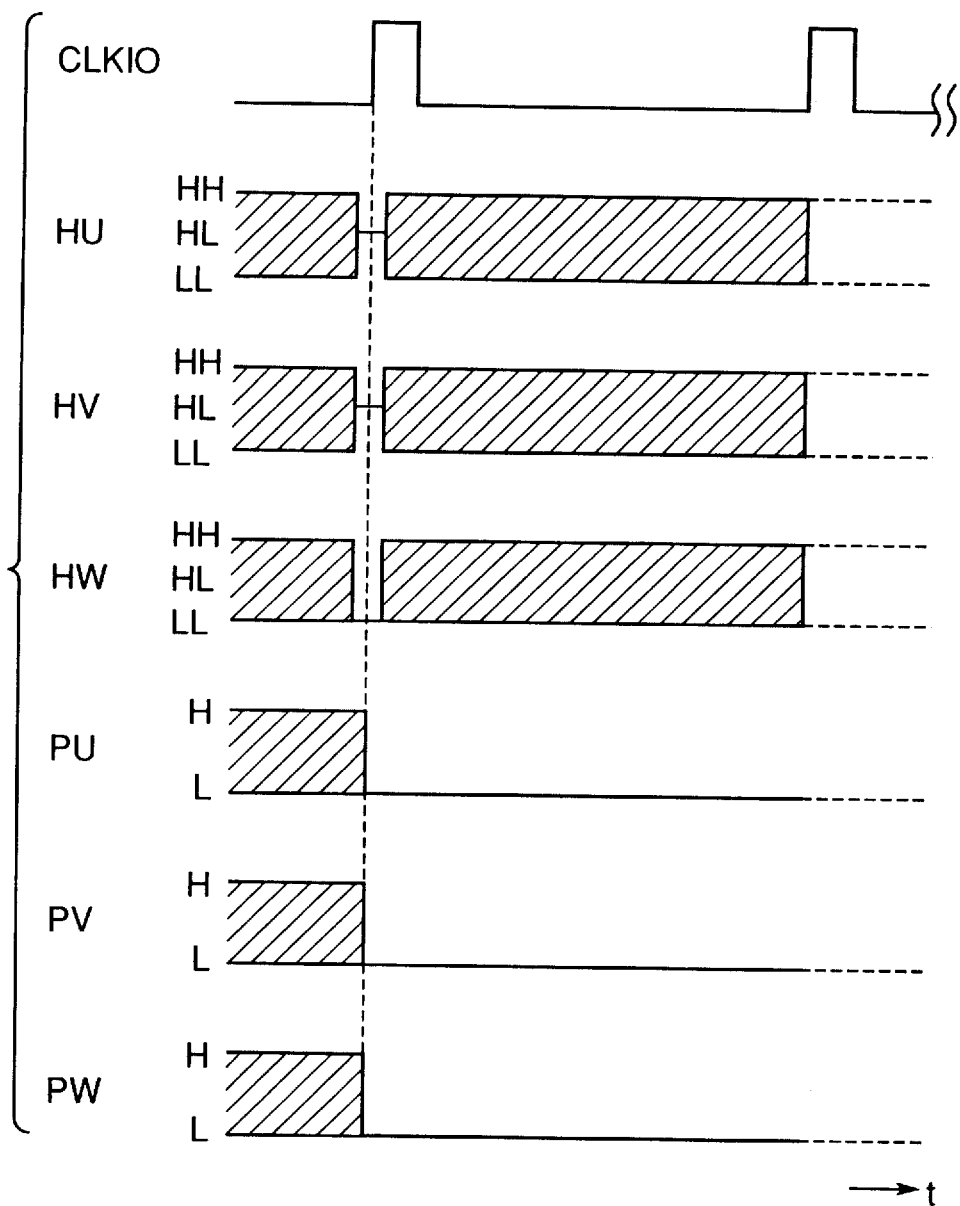
FIG. 14 is a timing chart showing an operation of respective signals before and after a state No. J00 in Tables 1 and 2.
Figure 15:
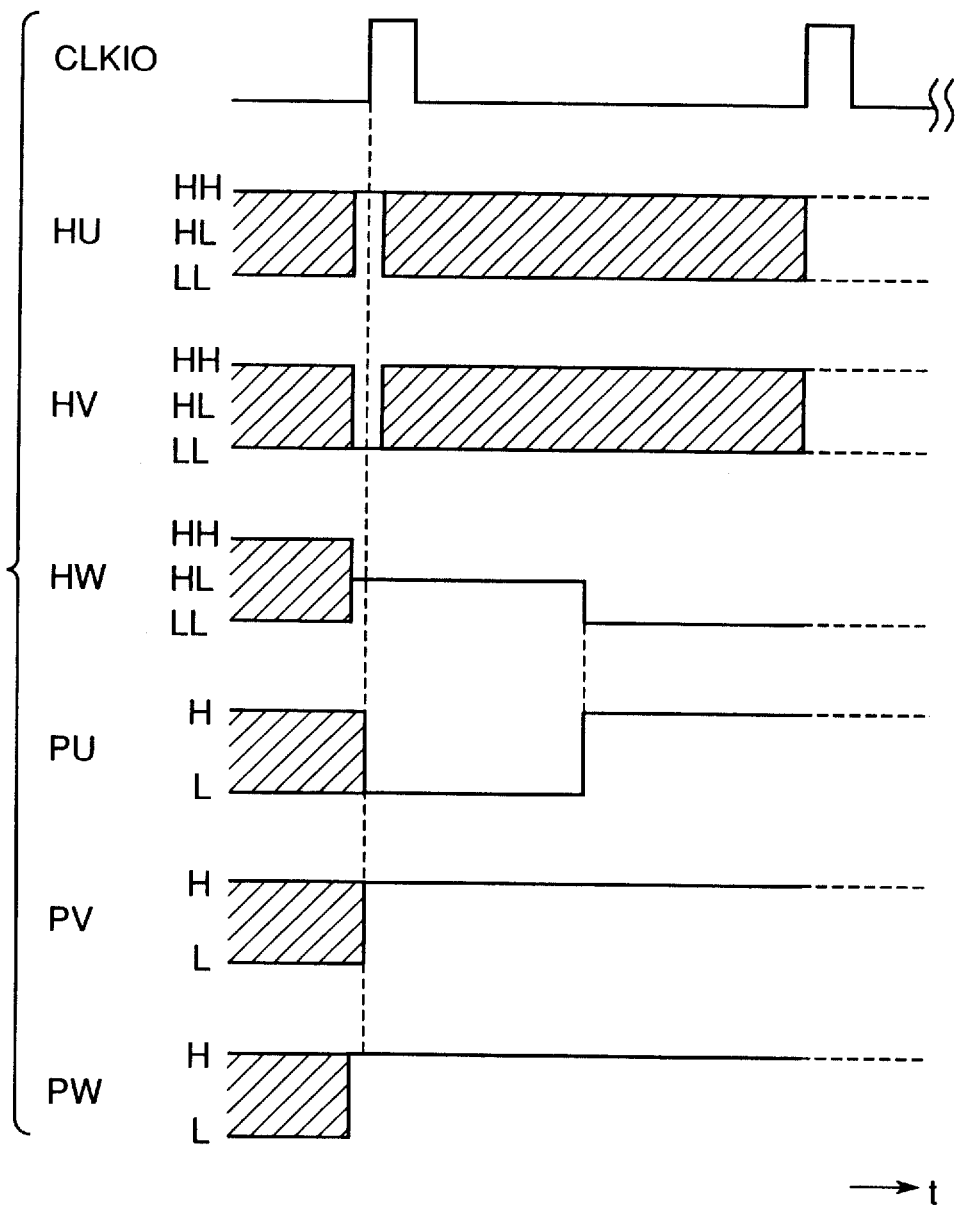
FIG. 15 is a timing chart showing an operation of respective signals at a transition from a state No. P00 to a state No. PX1 in Tables 1 and 2.

FIG. 13 is a timing chart showing an operation of respective signals before and after a state No. I00 in Tables 1 and 2, FIG. 14 is a timing chart showing an operation of respective signals before and after a state No. J00 in Tables 1 and 2, and FIG. 15 is a timing chart showing an operation of respective signals at a transition from a state No. P00 to a state No. PX1 in Tables 1 and 2.

In this case, paying attention to the first character of the state numbers, a state is branched into twenty-one states of A through U. For the sake of convenience of explanation, it is assumed that the three-figure alphabetical and numerical symbols of each state No. are referred to as the first figure, the second figure and the third figure, sequentially from the left hand end figure thereof.

First of all, explanation will be made to a case where the system state shifts to any one of the state Nos. A00, B00, C00, D00, E00 and F00.

When the system state shifts to any one of these states, attention is paid to two signals having an identical signal level among the first, second and third line current comparison signals HU, HV and HW at the timing of the leading edge of the state updating timing signal CLK10. Depending on which of the two signals switches first, the subsequent operation will be different. Paying attention to the second figure of each state No., a state is branched into two of X and Y.

For example, in the case of the state No. A00, the system state shifts to the state No. AX1 when the second line current comparison signal HV changes first or shifts to the state No. AY1 when the third line current comparison signal HW changes first.

Subsequently, between the two signals having an identical signal level out of the first, second and third line current comparison signals HU, HV and HW at the timing of the leading edge of the state updating timing signal CLK10, when the signal other than the signal that has changed first switches, the state shifts so that the third figure of each state No. having the same first and second figures becomes two.

For example, in the case of No. AX1, the state shifts from No. AX1 to No. AX2. In the case of No. AY1, the state shifts from No. AY1 to No. AY2.

Subsequently, the state is maintained until the timing of the next leading edge of the state updating timing signal CLK10.

Next, explanation will be made to a case where the system state shifts to the state No. G00 or H00 at the timing of the leading edge of the state updating timing signal CLK10. In any one of these cases, the state is maintained until the next leading edge of the state updating timing signal CLK10 is inputted. Therefore, the first, second and third switching command signals PU, PV and PW are maintained so as to output the levels thereof.

Next, explanation will be made to a case where the system state shifts to the state No. I00, J00, K00, L00, M00, N00, or O00 at the timing of the leading edge of the state updating timing signal CLK10. In any one of these cases, the first, second and third switching command signals PU, PV and PW are maintained in the state of (H, H, H) or (L, L, L) until the next leading edge of the state updating timing signal CLK10 is inputted.

Finally, explanation will be made to a case where the system state shifts to the state No. P00, Q00, R00, S00, T00, or U00 at the timing of the leading edge of the state updating timing signal CLK10. In any one of these cases, depending on the level of the first, second and third switching command signals PU, PV and PW just before the timing of the leading edge of the state updating timing signal CLK10, the subsequent operation will be different. Paying attention to the second figure of each state No., a state is branched into two of X and Y.

For example, in the case of the state No. P00, if PW is at the L-level, then the state shifts to PY1.

Subsequently, the state is maintained until the timing of the next leading edge of the state updating timing signal CLK10.

The above explanation is how to read Tables 1 and 2. An operation of the logic circuit 10 will be described below based on the truth table of Tables 1 and 2.

The operation of the logic circuit 10 is determined depending on the signal levels of the first, second and third line current comparison signals HU, HV and HW at the timing of the leading edge of the state updating timing signal CLK10.

In the present case, paying attention to the signal levels of the three comparison signals HU, HV and HW, explanation will be made below separately in the following four cases.

First of all, explanation is made on the following three cases where the comparison signals HU, HV, HW at the timing of the leading edge of the state updating timing signal CLK10 are (HU, HV, HW) = (LL, HH, HH)
or = (HH, LL, HH)
or = (HH, HH, LL)
or = (HH, LL, LL)
or = (LL, HH, LL)
or = (LL, LL, HH).

First of all, described is an operation at the timing of the leading edge of the state updating timing signal CLK10.

The logic circuit 10 reads the signal levels of the first, second and third line current comparison signals HU, HV and HW at the timing of the leading edge of the state updating timing signal CLK10, and the signal levels of the output signals PU, PV and PW of the logic circuit 10 are determined so that changes are made in a direction in which the first, second and third detected line currents iFU, iFV and iFW at the timing are made to approach the first, second and third line current command signals iTU, iTV and iTW, i.e., the detected line currents iFU, iFV and iFW are made to correspond to the respective line current command signals. Consequently, the output signals PU, PV and PW become signal levels obtained by inverting those of the comparison signals HU, HV and HW, respectively. For example, when the comparison signal HU is the HH-level, the output signal PU is determined to have the L-level. When the comparison signal HU has the LL-level, the output signal PU is determined to have the H-level. The output signals PV and PW are determined in a manner similar to the above-mentioned manner.

Next, explanation will be made to the operation of the logic circuit 10 for a time interval from the timing of a leading edge of the state updating timing signal CLK10 to the timing of the next leading edge of the state updating timing signal CLK10.

In regard to the line currents of the three-phase motor 1, it is axiomatic that a value obtained by inverting the polarity of the sum of two line currents out of three line currents is the remaining line current. Therefore, in the logic circuit 10 of the first preferred embodiment according to the present invention, paying attention to two signals having an identical level out of the three comparison signals HU, HV and HW at the timing of the leading edge of the state updating timing signal CLK10, the levels of the switching command signals PU, PV and PW are determined so as to control the turning-on and turning-off of the main circuit switching power devices which supply the line currents relevant to the two signals.

That is, first of all, with regard to the turning-on and turning-off of the main circuit switching power device which supplies the line current relevant to the signal whose level is inverted first of all out of the two signals having the identical level, the level of the corresponding switching command signal is inverted in such a manner that, in the case of the on-state it is switched from the on-state to off-state, while in the case of off-state it is switched from off-state to the on-state. Subsequently, when the level of the remaining one signal out of the two signals having the identical level is inverted, the level of the corresponding switching command signal is inverted so that the main circuit switching power device which supplies the line current relevant to the signal whose level is inverted is switched between the on-state and off-state in a similar manner.

In this timing, the three signals of the first, second and third switching command signals PU, PV and PW outputted from the logic circuit 10 have an identical level, so that the signal levels coincide with the level of the signal having the level different from the others of the three comparison signals HU, HV and HW at the timing of the leading edge of the state updating timing signal CLK10. Until the timing of the next leading edge of the state updating timing signal CLK10, the output signals PU, PV and PW are maintained to have their levels, respectively. After the timing of the next leading edge of the state updating timing signal CLK10, a similar operation will be repetitively executed.

Next, when the comparison signals HU, HV, HW at the timing of the leading edge of the state updating timing signal CLK10 are (HU, HV, HW) = (HH, HH, HH)
or = (LL, LL, LL)
or = (HL, HL, HL)
or = (HL, HL, LL)
or = (LL, HL, HL)
or = (HL, LL, HL)
or = (HL, HL, HH)
or = (HH, HL, HL)
or = (HL, HH, HL).

the output signals PU, PV and PW are maintained to have their levels determined at the timing of the leading edge of the state updating timing signal CLK10, respectively, until the timing of the next leading edge of the state updating timing signal CLK10.

Finally, explanation will be made on a case where the comparison signals HU, HV, HW at the timing of the leading edge of the state updating timing signal CLK10 are (HU, HV, HW) = (HH, LL, HL)
or = (LL, HH, HL)
or = (HL, HH, LL)
or = (HL, LL, HL)
or = (HH, HL, LL)
or = (LL, HL, HH).

The logic circuit 10 operates in such a manner that the signal levels of the output signals PU, PV and PW when the signal levels of the first, second and third line current comparison signals HU, HV and HW are the HH-level or LL-level are made to have signal levels obtained by inverting those of the comparison signals HU, HV and HW, respectively. For example, when the comparison signal HU is the HH-level, the output signal PU is determined to have the L-level. When the comparison signal HU has the LL-level, the output signal PU is determined to have the H-level. The output signals PV and PW are determined in a manner similar to the above-mentioned manner. In this timing, the remaining one of PU or PV or PW that has the HL-level yields an output of the corresponding signal level of the PU, PV, PW just before the timing of the leading edge of the state updating timing signal CLK10 and maintains as it is until the timing of the next leading edge of the state updating timing signal CLK10.

As above is described the explanation of the structure of the current controller 6 of the current command type PWM inverter system of the first preferred embodiment according to the present invention. The structure of the logic circuit 10 of the current controller 6 of the current command type PWM inverter in the first preferred embodiment according to the present invention will be described below in more detail.

The inner structure of the logic circuit 10 will be described with reference to FIG. 3.

Figure 3:
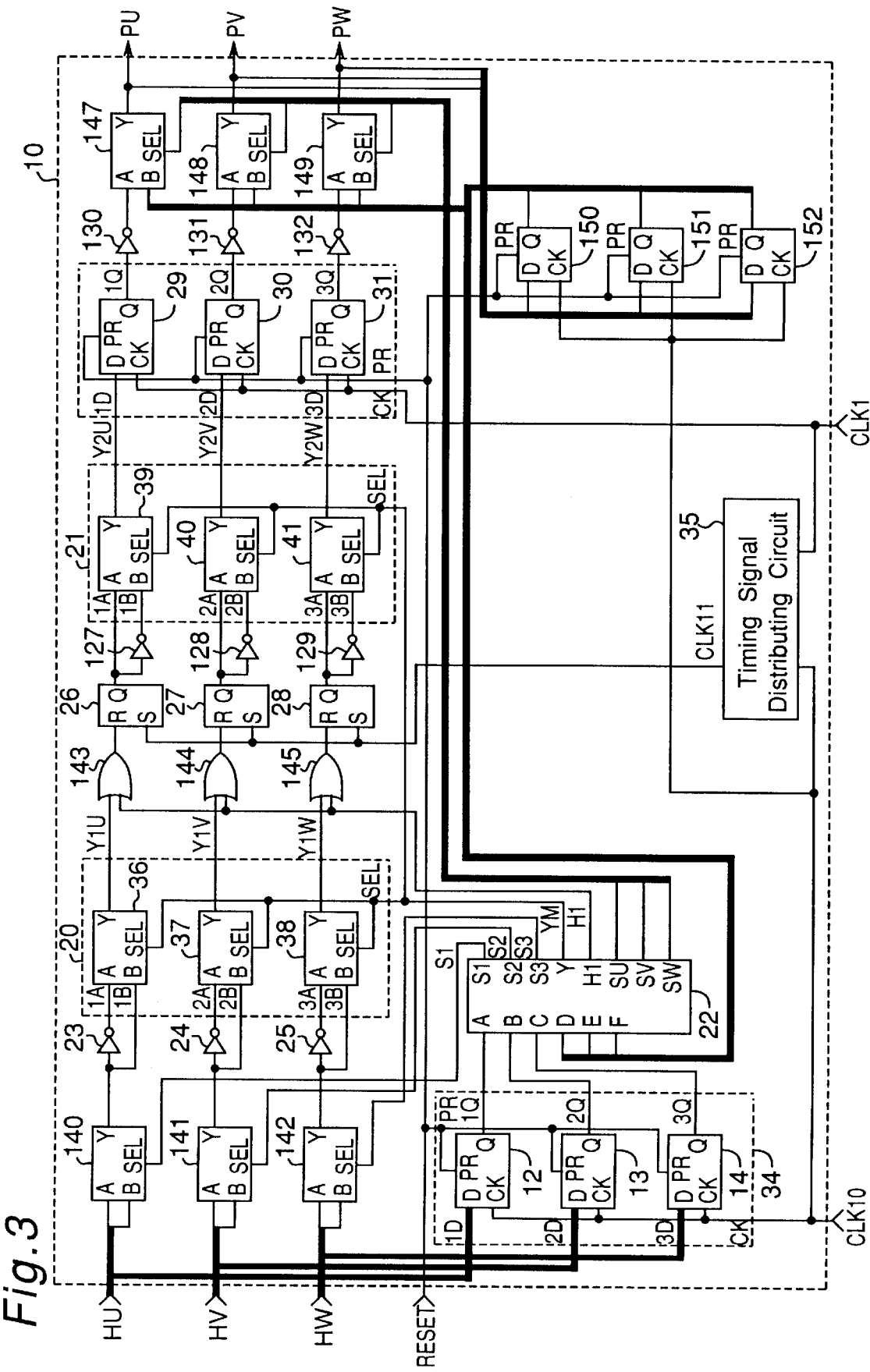
FIG. 3 is a block diagram of a logic circuit 10 shown in FIG. 1.

Referring to FIG. 3, first of all, an operation of the constituent components thereof will be described.

First of all, each of first, second, third, fourth, fifth, sixth, seventh, eighth, ninth, tenth, eleventh and twelfth data selectors 36, 37, 38, 39, 40, 41, 140, 141, 142, 147, 148 and 149 operates to output the level of an input terminal B at an output terminal Y when an input terminal SEL is at the H-level, and output the level of an input terminal A at the output terminal Y when the input terminal SEL is at the L-level.

The reference numerals 26, 27 and 28 respectively denote first, second and third reset-preferential RS flip-flops, each of which is reset when an input terminal R is at the H-level and an input terminal S is at the L-level so that the level at an output terminal Q is changed to the L-level, each of which is set when the input terminal R is at the L-level and the input terminal S is at the H-level so that the level at the output terminal Q is changed to the H-level, and each of which is reset when the input terminal R is at the H-level and the input terminal S is at the H-level with the priority given to the reset so that the level at the output terminal Q is switched to the L-level.

The reference numerals 29, 30, 31, 12, 13, 14, 150, 151 and 152 respectively denote first, second, third, fourth, fifth, sixth, seventh, eighth and ninth delay type latches (referred to as D-latches hereinafter), each of which latches the level of an input terminal D at the timing of the leading edge of the signal inputted to an input terminal CK, and then outputs the latched level to an output terminal Q. It is to be noted that an input terminal PR is a terminal for receiving a preset signal, and each of the D-latches is preset with the most priority when the H-level is inputted thereto, and then outputs the H-level at the output terminal Q.

The reference numerals 23, 24, 25, 127, 128, 129, 130, 131 and 132 respectively denote first, second, third, fourth, fifth, sixth, seventh, eighth and ninth inverter gates, each of which operates to output the L-level at its output terminal when the H-level is inputted to its input terminal, and operates to output the H-level at its output terminal when the L-level is inputted to the input terminal.

The reference numerals 143, 144 and 145 denote each of which operates to output the L-level only when the L-levels have been inputted to two input terminals, and operates to output the H-level otherwise.

The reference numeral 22 denotes a data decoder having input terminals A, B, C, D, E and F and output terminals Y, H1, S1, S2, S3, SU, SV and SW and the truth table thereof is shown in Table 3.

It is to be noted that the truth table of Table 3 can be easily implemented by AND gates, OR gates and inverter gates.

TABLE 3

| Input Signal | | | | | | Mode Signal | | | | | | | |
|---|---|---|---|---|---|---|---|---|---|---|---|---|---|
| A | B | C | D | E | F | YM | H1 | S1 | S2 | S3 | SU | SV | SW |
| LL | HH | HH | * | * | * | L | L | L | L | L | L | L | L |
| HH | LL | HH | * | * | * | L | L | L | L | L | L | L | L |
| HH | HH | LL | * | * | * | L | L | L | L | L | L | L | L |
| HH | LL | LL | * | * | * | H | L | L | L | L | L | L | L |
| LL | HH | LL | * | * | * | H | L | L | L | L | L | L | L |
| LL | LL | HH | * | * | * | H | L | L | L | L | L | L | L |
| HH | HH | HH | * | * | * | H | H | L | L | L | L | L | L |
| LL | LL | LL | * | * | * | L | H | L | L | L | L | L | L |
| HL | HL | LL | * | * | * | L(H) | H | L | L | L | L | L | L |
| HL | HL | LL | * | * | * | L(H) | H | L | L | L | L | L | L |
| HL | HL | HL | ■ | ■ | ■ | L(H) | H | L | L | L | L | L | L |
| HL | HL | HL | H | H | H | L(H) | H | L | L | L | H | H | H |
| HL | HL | HL | L | L | L | L(H) | H | L | L | L | H | H | H |
| HL | HL | LL | ■ | ■ | ■ | L(H) | H | L | L | L | L | L | L |
| HL | HL | LL | H | H | H | L(H) | H | L | L | L | H | H | H |
| HL | HL | LL | L | L | L | L(H) | H | L | L | L | H | H | H |
| LL | HL | HL | ■ | ■ | ■ | L(H) | H | L | L | L | L | L | L |
| LL | HL | HL | H | H | H | L(H) | H | L | L | L | H | H | H |
| LL | HL | HL | L | L | L | L(H) | H | L | L | L | H | H | H |
| HL | LL | HL | ■ | ■ | ■ | L(H) | H | L | L | L | L | L | L |
| HL | LL | HL | H | H | H | L(H) | H | L | L | L | H | H | H |
| HL | LL | HL | L | L | L | L(H) | H | L | L | L | H | H | H |
| HL | HL | LL | ■ | ■ | ■ | L(H) | H | L | L | L | L | L | L |
| HL | HL | LL | H | H | H | L(H) | H | L | L | L | H | H | H |
| HL | HL | LL | L | L | L | L(H) | H | L | L | L | H | H | H |
| HH | HL | HL | ■ | ■ | ■ | L(H) | H | L | L | L | L | L | L |

TABLE 3-continued

| Input Signal | | | | | | Mode Signal | | | | | | | |
|---|---|---|---|---|---|---|---|---|---|---|---|---|---|
| A | B | C | D | E | F | YM | H1 | S1 | S2 | S3 | SU | SV | SW |
| HH | HL | HL | H | H | H | L(H) | H | L | L | L | H | H | H |
| HH | HL | HL | L | L | L | L(H) | H | L | L | L | H | H | H |
| HL | HH | HL | ■ | ■ | ■ | L(H) | H | L | L | L | L | L | L |
| HL | HH | HL | H | H | H | L(H) | H | L | L | L | H | H | H |
| HL | HH | HL | L | L | L | L(H) | H | L | L | L | H | H | H |
| HH | LL | HL | * | * | H | H | L | L | L | L | L | L | H |
| HH | LL | HL | * | * | L | L | H | L | L | L | L | L | H |
| HL | HH | LL | H | * | * | H | L | L | L | L | H | L | L |
| HL | HH | LL | L | * | * | L | H | L | L | L | H | L | L |
| LL | HL | HH | * | H | * | H | L | L | L | L | L | H | L |
| LL | HL | HH | * | L | * | L | H | L | L | L | L | H | L |
| LL | HH | HL | * | * | H | H | L | L | L | L | L | L | H |
| LL | HH | HL | * | * | L | L | H | L | L | L | L | L | H |
| HL | LL | HH | H | * | * | H | L | L | L | L | H | L | L |
| HL | LL | HH | L | * | * | L | H | L | L | L | H | L | L |
| HH | HL | LL | * | H | * | H | L | L | L | L | L | H | L |
| HH | HL | LL | * | L | * | L | H | L | L | L | L | H | L |

In the above table, the symbol * may be either the H-level or the L-level, the symbol ■ means a case where (D, E, F) is neither (H, H, H) nor (L, L, L).

A timing signal distributing circuit 35 receives a system clock CLK1 and the state updating timing signal CLK10, and then, outputs a state updating timing delay signal CLK11.

The explanation of relationships among the clock signals CLK1, CLK10 and CLK11 is provided here with reference to FIG. 4.

First of all, it is assumed that the cycle of the state updating timing signal CLK10 is sufficiently greater than the cycle of the system clock CLK1, and the state updating timing signal CLK10 changes in synchronization with a trailing edge of the system clock CLK1. It is further assumed that the state updating timing delay signal CLK11 is a signal obtained by delaying the state updating timing signal CLK10 by about half the time interval between the leading edge and the trailing edge of the system clock CLK1.

As above is described the explanation of the operations of the constituent components. Explanation will be then made to the operation of the logic circuit 10 according to the flow of signals.

In the present case, for the sake of simplicity of explanation, the first, second and third data selectors 36, 37 and 38 are collectively referred to as a first data selector circuit 20, while the fourth, fifth and sixth data selectors 39, 40 and 41 are collectively referred to as a second data selector 21. Further, the first, second and third D-latches 12, 13 and 14 are collectively referred to as a first data latch circuit 34, while the fourth, fifth and sixth D-latches 29, 30 and 31 are collectively referred to as a second data latch circuit 15.

The input terminals A of the first, second and third data selectors 36, 37 and 38 are made to serve respectively as input terminals 1A, 2A and 3A of the first data selector circuit 20, and their input terminals B are made to serve respectively as input terminals 1B, 2B and 3B of the first data selector circuit 20. Their input terminals SEL are commonly connected with each other to serve as an input terminal SEL of the first data selector circuit 20. The input terminals A of the fourth, fifth and sixth data selectors 39, 40 and 41 are made to serve respectively as input terminals 1A, 2A and 3A of the second data selector circuit 21, and their input terminals B are made to serve respectively as input terminals 1B, 2B and 3B of the second data selector circuit 21. Their input terminals SEL are commonly connected with each other to serve as an input terminal SEL of the second data selector circuit 21. The input terminals D of the first, second and third D-latches 12, 13 and 14 are made to serve as input terminals 1D, 2D and 3D of the first data latch circuit 34, and their input terminals CK are commonly connected with each other to serve as an input terminal CK of the first data latch circuit 34. Their input terminals PR are commonly connected with each other to serve as an input terminal PR of the first data latch circuit 34, and their output terminals Q are made to serve respectively as output terminals 1Q, 2Q and 3Q of the first data latch circuit 34. The input terminals D of the fourth, fifth and sixth D-latches 29, 30 and 31 are made to serve as input terminals 1D, 2D and 3D of the second data latch circuit 15, and their input terminals CK are commonly connected with each other to serve as an input terminal CK of the second data latch circuit 15. Their input terminals PR are commonly connected with each other to serve as an input terminal PR of the first data latch circuit 15, and their output terminals Q are made to serve respectively as output terminals 1Q, 2Q and 3Q of the first data latch circuit 34.

Furthermore, the output signals of the first data selector circuit 20 are referred to as first selection output signals Y1U, Y1V and Y1W, while the output signals of the second data selector circuit 21 are referred to as second selection output signals Y2U, Y2V and Y2W.

First of all, the first, second and third line current comparison signals HU, HV and HW are inputted to the input terminals 1D, 2D and 3D of the first data latch circuit 34, and their respective upper bits are inputted to the input terminals A of the seventh, eighth and ninth D-latches 140, 141 and 142 while their lower bits are inputted to the input terminals B of the seventh, eighth and ninth D-latches 140, 141 and 142.

Reference is made here to a state in which the stat e updating timing signal CLK10 changes from the L-level to the H-level, i.e., just after its leading edge is inputted, namely, a Timing 1 shown in FIG. 4.

First of all, the switching command signals HU, HV, HW are inputted to and latched by the input terminals D of the seventh, eighth and ninth D-latches 140, 141 and 142, respectively. Also, the input levels of the input terminals 1D, 2D and 3D are latched to be held by the first data latch circuit 34, and then, are outputted to the output terminals 1Q, 2Q and 3Q. This state of the first data latch circuit 34 does not change until the next leading edge of the state updating timing signal CLK10 is inputted. Then, the output signals outputted from the output terminals Q of the seventh, eighth and ninth D-latches 140, 141 and 142 as well as the output signals outputted from the output terminals 1Q, 2Q, 3Q of the first data latch circuit 34 are inputted to the data decoder 22, so that the output terminals Y, H1, S1, S2, S3, SU, SV and SW are made to have the H-level or the L-level according to the truth table shown in Table 3. The signals outputted from the output terminals Y, H1, S1, S2, S3, SU, SV and SW are referred to as mode signals YM, H1, S1, S2, S3, SU, SV and SW. In the present case, the mode signals S1, S2 and S3 are inputted to the input terminals SEL of the seventh, eighth and ninth data selectors 36, 37 and 38, and their output signals are inputted to the input terminals 1B, 2B and 31 of the first data selector circuit 20 and also inputted to the input terminals 1A, 2A and 3A via the first, second and third inverter gates 23, 24 and 25.

While the input terminal SEL of the first data selector circuit 20 receives the mode signal YM, the first data selector circuit 20 outputs the first selection output signals Y1U, Y1V and Y1W in accordance with the mode signal YM.

Then, the state updating timing delay signal CLK11 changes from the L-level to the H-level, i.e., its leading edge is inputted. A state just after the above-mentioned Timing 2 shown in FIG. 4 will be described.

First of all, the state updating timing delay signal CLK11 is inputted to the input terminals S of the first, second and third RS flip-flops 26, 27 and 28, and the flip-flops are set when the signal CLK11 is at the H-level. However, as described hereinbefore, each of the first, second and third RS flip-flops 26, 27 and 28 is a reset-preferential RS flip-flop, and therefore, the priority is given to the reset when the input terminal R is at the H-level. Therefore, among the first, second and third RS flip-flops 26, 27 and 28, any RS flip-flop having the L-level at the input terminal R is only set consequently when the state updating timing delay signal CLK11 is at the H-level.

The output signals of the first, second and third RS flip-flops 26, 27 and 28 are inputted to the input terminals 1A, 2A and 3A of the second data selector circuit 21, and are inputted to their input terminals 1B, 2B and 3B via the fourth, fifth and sixth inverter gates 127, 128 and 129. To the input terminals SEL of the second data selector circuit 21 is inputted the mode signal YM. Therefore, in accordance with the mode signal YM, the second data selector circuit 21 outputs the second selection output signals Y2U, Y2V and Y2W.

Then, the system clock CLK1 changes from the L-level to the H-level, i.e., its leading edge is inputted. A state just after the above-mentioned Timing 3 as shown in FIG. 4 will be described.

First of all, when the leading edge of the system clock CLK1 is inputted to the input terminals CK of the second data latch circuit 15, the second data latch circuit 15 receives the second selection output signals Y2U, Y2V and Y2W from its input terminals 1D, 2D and 3D and latches the same. The second data latch circuit 15 outputs at its output terminals 1Q, 2Q and 3Q the latched input signals obtained from the input terminals 1D, 2D and 3D. Each of the output signals is maintained until the timing of the next leading edge of the state updating timing signal CLK10. The output signals outputted from the output terminals 1Q, 2Q and 3Q of the second data latch circuit 15 are made to serve as the first, second and third switching command signals PU, PV and PW via the seventh, eighth and ninth inverter gates 130, 131 and 132 and besides the tenth, eleventh and twelfth tenth, eleventh and twelfth data selectors 147, 148 and 149.

In the present case, the first, second and third switching command signals PU, PV and PW are updated in accordance with the timing at which the leading edge of the system clock CLK1 is inputted to the input terminals CK of the second data latch circuit 15. Therefore, the first, second and third switching command signals PU, PV and PW do not change at the Timing 1 and the Timing 2.

As above is described the explanation of the operations (a) at the timing (Timing 1) at which the state updating timing signal CLK10 changes from the L-level to the H-level, (b) at the timing (Timing 2) at which the state updating timing delay signal CLK11 switches from the L-level to the H-level, and (c) at the timing (Timing 3) at which the system clock CLK1 switches from the L-level to the H-level.

As above is described the explanation of the operations at which the state updating timing signal CLK10 rises (its leading edge is inputted), describing the state shift to the twenty-one state Nos. A00, B00, C00, D00, E00, F00, G00, H00, I00, J00, K00, L00, M00, N00, O00, P00, Q00, R00, S00, T00 and U00 in Tables 1 and 2.

Next, explanation will be made to the subsequent operation, i.e., the operation for a time interval until the timing at which the next leading edge of the state updating timing signal CLK10 is inputted.

Here, first of all, explanation will be made to a case where the system state shifts to any one of the state Nos. A00, B00, C00, D00, E00 and F00 in Tables 1 and 2.

The explanation will be provided here taking the state No. A00 in Tables 1 and 2 as an example.

In the state of the state No. A00, the line current comparison signal HU is at the LL-level, the line current signal HV is at the HH-level, the line current signal HW is at the HH-level, the mode signals YM, H1, S1, S2, S3, SU, SV and SW are at the L-level, the output signals Y1U, Y1V and Y1W from the first data selector circuit 20 are respectively at the H-level, the L-level and the L-level, the first RS flip-flop 26 is in reset state, the second RS flip-flop 27 is in set state, and the third RS flip-flop 28 is in set state.

Further, the output signals Y2U, Y2V and Y2W from the second data selector circuit 21 are respectively at the L-level, the H-level and the H-level.

Here, we first of all consider an operation in the case where the second line current comparison signal HV changes from the HH-level to the LL-level, i.e., an operation of the state shift from the state No. A00 to the state No. AX1 in Tables 1 and 2.

When the second line current comparison signal HV changes from the HH-level to the LL-level, the level of the first selection output signal Y1V changes from the L-level to the H-level, thereby resetting the second RS flip-flop 27. Therefore, the second selection output signal Y2V is changed from the H-level to the L-level.

Therefore, the switching command signals PU, PV and PW become (PU, PV, PW)=(H, H, L)

at the timing of the next leading edge of the system clock CLK1. In accordance with the first, second and third switching command signals PU, PV and PW, the main circuit power controller 8 at the next stage operates.

Next, we consider an operation when the third line current comparison signal HW subsequently changes from the HH-level to the LL-level, i.e., an operation of the state shift from the state No. AX1 to the state No. AX2 in Tables 1 and 2.

When the third line current comparison signal HW changes from the HH-level to the LL-level, the level of the first selection output signal Y1W changes from the L-level to the H-level, thereby resetting the third RS flip-flop 28. Therefore, the second selection output signal Y2W is changed from the H-level to the L-level.

Therefore, the switching command signals PU, PV and PW become (PU, PV, PW)=(H, H, H)

at the timing of the next leading edge of the system clock CLK1. In accordance with the first, second and third switching command signals PU, PV and PW, the main circuit power controller 8 at the next stage operates.

This state, i.e., (PU, PV, PW)=(H, H, H)

is maintained until the timing of the leading edge of the system clock CLK1 subsequent to the timing of the next leading edge of the state updating timing signal CLK10.

As above is described the explanation of the operations in the case where the system state shifts to any one of the state Nos. A00, B00, C00, D00, E00 and F00 at the timing of the leading edge of the state updating timing signal CLK10. Next, explanation will be made to a case where the system state shifts to either one of the state Nos. G00 and H00 in Tables 1 and 2.

The explanation will be provided here taking the state No. G00 in Tables 1 and 2 as an example.

In the state of the state No. G00, the line current comparison signal HU is at the HH-level, the line current comparison signal HV is at the HH-level, the line current comparison signal HW is at the HH-level, the mode signals YM and H1 are at the H-level, the mode signals S1, S2, S3, SU, SV and SW are at the L-level, the output signals Y1U, Y1V and Y1W from the first data selector circuit 20 are respectively at the H-level, the H-level and the H-level, and all the first, second and third RS flip-flops 26, 27 and 28 are in the reset state.

Consequently, the output signals Y2U, Y2V and Y2W from the second data selector circuit 21 are respectively at the H-level, the H-level and the H-level. Therefore, the switching command signals PU, PV and PW become the L-level, the L-level and the L-level, respectively, at the timing of the next leading edge of the system clock CLK1. In accordance with these switching command signals PU, PV and PW, the main circuit power controller 8 at the next stage operates.

This state, i.e., (PU, PV, PW)=(L, L, L)

is maintained until the timing of the leading edge of the system clock CLK1 subsequent to the timing of the next leading edge of the state updating timing signal CLK10.

Next, explanation will be made to a case where the system state shifts to any one of the state Nos. I00, J00, K00, L00, M00, N00 and O00 at the timing of the leading edge of the state updating timing signal CLK10.

The explanation will be provided here taking the state No. I00 in Tables 1 and 2 as an example.

In the state of the state No. I00, the mode signal H1 is at the H-level, the mode signal YM is at the H-level (or the mode signal YM is at the L-level), and therefore, all the first, second and third RS flip-flops 26, 27 and 28 are in the reset state.

Consequently, the output signals Y2U, Y2V and Y2W from the second data selector circuit 21 are all at the L-level (when the mode signal YM is at the L-level, the output signals Y2U, Y2V and Y2W are all at the H-level). Therefore, the switching command signals PU, PV and PW all become the H-level at the timing of the next leading edge of the system clock CLK1. In accordance with these switching command signals PU, PV and PW, the main circuit power controller 8 at the next stage operates.

This state, i.e., (PU, PV, PW)=(H, H, H) (or=(L, L, L) when the mode signal YM is at the L-level)

is maintained until the timing of the leading edge of the system clock CLK1 subsequent to the timing of the next leading edge of the state updating timing signal CLK10. As above is described the explanation of the operations in the case where the system state shifts to the state No. I00 in Tables 1 and 2.

Next, explanation will be made to the operations in the case where the system state shifts to any one of the state Nos. P00, O00, Q00, R00, S00, T00 and U00 at the timing of the leading edge of the state updating timing signal CLK10.

The explanation will be provided here taking the state No. P00 in Tables 1 and 2 as an example.

In the state of the state No. P00, the mode signals YM and SW are at the H-level, the mode signals H1, S1, S2, S3, SU and SV are at the L-level, and the output signal from the ninth D-latch 152 is at the H-level. Therefore, the second and third RS flip-flops 27 and 28 are in the reset state.

Consequently, the output signals Y2U, Y2V and Y2W from the second data selector circuit 21 are at the H-level, the L-level and the L-level, respectively.

Therefore, the switching command signals PU, PV and PW become the L-level, the H-level and the H-level, respectively, at the timing of the next leading edge of the system clock CLK1. In accordance with these switching command signals PU, PV and PW, the main circuit power controller 8 at the next stage operates.

Next, we consider an operation when the first line current comparison signal HU changes from the HH-level to the LL-level, i.e., an operation of the state shift to the state No. PX1 in Tables 1 and 2.

When the first line current comparison signal HU changes from the HH-level to the LL-level, the level of the first selection output signal Y1U changes from the L-level to the H-level, thereby resetting the first RS flip-flop 26. Therefore, the second selection output signal Y2U is changed from the H-level to the L-level.

Therefore, the switching command signals PU, PV and PW become (PU, PV, PW)=(H, H, H)

at the timing of the next leading edge of the system clock CLK1. In accordance with the first, second and third switching command signals PU, PV and PW, the main circuit power controller 8 at the next stage operates.

This state, i.e., (PU, PV, PW)=(H, H, H)

is maintained until the timing of the leading edge of the system clock CLK1 subsequent to the timing of the next leading edge of the state updating timing signal CLK10.

As above is described the explanation of the operations in the case where the system state shifts from the state No. A00 to the state No. AX1 and then further from the state No. AX1 to the state No. AX2 in Tables 1 and 2 and the operations in the cases where the system state shifts to the state No. G00 at the timing of the leading edge of the state updating timing signal CLK10, where the system state shifts to the state No. I00 at the timing of the leading edge of the state updating timing signal CLK10, and where the system state shifts to the state No. P00 and then further to the state No. PX1 at the timing of the leading edge of the state updating timing signal CLK10. From the explanation provided above, the other state shift cases in Tables 1 and 2 can be considered similarly, and therefore, no explanation is provided therefor.

As above is described the concrete explanation of the operation of the logic circuit 10 in the current controller 6 of the current command type PWM inverter system of the first preferred embodiment according to the present invention. Explanation will be then made to line current control of the three-phase motor 1 by means of the current command type PWM inverter system of the first preferred embodiment according to the present invention with reference to FIGS. 5A through 5D.

Referring to FIGS. 5A through 5D, FIG. 5A is a timing chart of the first, second and third line current command signals iTU, iTV and iTW and the first, second and third detected line currents iFU, iFV and iFW. FIG. 5B is an enlarged timing chart showing the operation of the logic circuit 10 in the region enclosed by dotted lines of FIG. 5A. FIG. 5C is a timing chart showing the turning-on and turning-off operations of the first, second, third, fourth, fifth and sixth main circuit switching power devices Q1, Q2, Q3, Q4, Q5 and Q6 based on the output levels of the first, second and third switching command signals PU, PV and PW outputted from the logic circuit 10.

First of all, explanation will be made to a timing at which a timing t=t1, i.e., the timing of the leading edge of the state updating timing signal CLK10.

At the timing t=t1 when the signals iTU, iTV and iTW and iFU, iFV and iFW at the timing of the leading edge of the state updating timing signal CLK10 have the following magnitude relationships:

$$iTU-V1>iFU,$$

$$iTV+V1<iFV,$$

and $$iTW+V1<iFW,$$

then the first, second and third line current comparison signals HU, HV and HW become the following states:
(HU, HV, HW)=(LL, HH, HH).

The above-mentioned states correspond to the state No. A00 in the truth table of Tables 1 and 2, and the switching command signals PU, PV and PW outputted from the logic circuit 10 become the following states:
(PU, PV, PW)=(H, L, L)
and then, the switching command signals PU, PV and PW are transmitted to the main circuit power controller 8.

Then, the main circuit switching power devices Q1, Q2, Q3, Q4, Q5 and Q6 are respectively turned on, off, off, off, on and on, so that the detected line currents iFU, iFV and iFW approach the line current command signals iTU, iTV and iTW according to the electric time constant of the three-phase motor 1.

As above is described the explanation of the operations of the current command type PWM inverter at the timing of the leading edge of the state updating timing signal CLK10 at the timing t=t1.

Next, explanation will be made to the operation in the case where iTV−V1>iFV and a state shift takes place at the timing (timing t=t11) from
(HU, HV, HW)=(LL, HH, HH) to
(HU, HV, HW)=(*, LL, HH).
Since the level of the comparison signal HU is ignored, it is assumed that the comparison signal HU=* means DON'T CARE for the convenience of explanation, and the symbol "*" means DON'T CARE hereinafter.

The logic circuit 10 receives the first, second and third line current comparison signals HU, HV and HW, switches the first, second and third switching command signals PU, PV and PW from
(PU, PV, PW)=(H, L, L) to
(PU, PV, PW)=(H, H, L)
and then turns the main circuit switching power devices Q2 and Q5 on and off, respectively. Then the state shifts to the state No. AX1.

As above is described the explanation of the operation at timing t=t11.

Next, explanation will be made to the operation in the case where iTW−V1>iFW and a state shift takes place at the timing (timing t=t12) from
(HU, HV, HW)=(*, LL, HH) to
(HU, HV, HW)=(*, HH, HH).

The logic circuit 10 receives the first, second and third line current comparison signals HU, HV and HW, switches the first, second and third switching command signals PU, PV and PW from
(PU, PV, PW)=(H, H, L) to
(PU, PV, PW)=(H, H, H)
and turns the main circuit switching power devices Q3 and Q6 on and off, respectively. Then the state shifts to the state No. AX2.

As above is described the explanation of the operation at timing t=t12.

Then, the state of
(PU, PV, PW)=(H, H, H)
is maintained until the timing of the next leading edge of the state updating timing signal CLK10.

Further, by executing a similar operation after the timing of the next leading edge of the state updating timing signal CLK10 based on Tables 1 and 2, the line currents of the three-phase motor 1 are controlled so that the line currents thereof conform to the first, second and third line current command signals iTU, iTV and iTW.

Furthermore, when the system state is any of the state Nos. I00, J00, K00, L00, M00, N00 and O00 at the timing of the leading edge of the state updating timing signal CLK10, the detected line current and the line current command signal are generally coincident with each other in two phases among the three phases (where the line current comparison signal is at the HL-level). Therefore, by providing a state of (PU, PV, PW) = (L, L, L)
or = (H, H, H), and by providing a state in which the armatures are short-circuited (each line voltage is made zero), the detected line current and the line current command signal can be made generally coincident with each other.

Furthermore, when the system state is any of the state Nos. P00, Q00, R00, S00, T00 and U00 at the timing of the leading edge of the state updating timing signal CLK10, the detected line currents of the three phases are at the HH-level, the LL-level, and the HL-level. Therefore, a control operation is performed in such a way that when the line current comparison signal is at the HH-level, the corresponding switching command signal is made to have the L-level, while when the line current comparison signal is at the LL-level, the corresponding switching command signal is made to have the H-level, by which the detected line currents and the line current command signals of these two phases are made to approach each other. Moreover, when the line current comparison signal is at the HL-level, the signal level of the switching command signal just before the leading edge of the state updating timing signal CLK10 is maintained as it is until the timing of the next leading edge of the state updating timing signal CLK10.

Further, when all the line current comparison signals change from the HL-level to the HH-level or the LL-level, all the three phases are made to have the signal level of the switching command signals just before the leading edge of the state updating timing signal CLK10, where the line current comparison signals are at the HL-level. By doing so, the detected line current and the line current command signal of each phase can be made coincident with each other, while the number of switching operations can be reduced.

As above is described the explanation of the line current control of the three-phase motor 1 with the current command type PWM inverter system of the first preferred embodiment according to the present invention.

In FIG. 8, in the base driving circuit 4 which controls the main circuit switching power devices Q1, Q2, Q3, Q4, Q5 and Q6 based on the output levels of the outputs PU, PV and PW of the current controller 6, it may be acceptable to provide a delay for a predetermined timing when each of the main circuit switching power devices Q1, Q2, Q3, Q4, Q5 and Q6 shifts from the off-state to the on-state to assure speedy shift from the on-state to the off-state. This arrangement means as follows. For example, when the state when the power device Q1 is in the on-state and the power device Q4 is in the off-state is shifted to the state when the power device Q1 is in the off-state and the power device Q4 is in the on-state, first of all, the power device Q1 is turned off, and after the power device Q1 is surely turned off, the power device Q4 is turned on. With this arrangement, the power devices Q1 and Q4 are momentarily turned on simultaneously in accordance with the timing at which the power devices Q1 and Q4 are switched, so that a great current can be prevented from flowing through the main circuit switching power devices Q1 to Q6.

Further, the output levels of the base drivers of the base driving circuit 4 may be made to the L-levels, respectively, so that all the power devices are turned off, for example, when it is desired to effect a current cutoff for protecting the current command type PWM inverter in the case of overload, a free-run operation of the motor or the like.

Furthermore, it is of course acceptable that the first, second and third comparators 17, 18 and 19 are implemented by digital comparators, where the first, second and third detected line currents iFU, iFV and iFW as well as the first, second and third line current command signals iTU, iTV and iTW are determined in a digital manner and further these digitally determined iFU, iFV and iFW and iTU, iTV and iTW are inputted to their corresponding comparators, by which the line current comparison signals may be determined.

According to the first preferred embodiment of the present invention, due to the structure without any current error amplifier, the problems concerning the gain control of the current error amplifiers can be substantially solved, thereby totally obviating the need of the gain control.

Furthermore, even when the characteristics and specifications of the three-phase motor 1, the motor current detec-
tor circuit 9, the current controller 6 and the main circuit power controller 8 change, the inverter system of the present preferred embodiment operates so that each line current error is consistently minimized. Furthermore, even when there are manufacturing-dependent variation of characteristics, temperature characteristics and the like, the inverter system of the present preferred embodiment operates so that each line current error is consistently minimized, thereby assuring a better current control responsibility and preventing the possible occurrence of an oscillation phenomenon.

Furthermore, the current controller 6 of the current command type PWM inverter system according to the present invention can be implemented by a simple digital circuit except for the first, second and third comparators, and therefore, the part constituted by the digital circuit does not cause any offset and drift and costs less.

Therefore, the present invention is made free from the gain adjustment work and the offset adjustment work of the current error amplifiers, so that a better current control responsibility can be assured to allow an inexpensive current command type PWM inverter system to be provided.

In the first preferred embodiment of the present invention, the transition operation to the states P00, Q00, S00, T00 and U00 is determined depending on the values of the switching command signals before the leading edge of the clock signal CLK10, however, the present invention is not limited to this. In this case, the switching command signals may be set to (H, H, H) or (L, L, L), independent of the value of the switching command signals before the leading edge of the clock signal CLK10, and this leads to the same effects.

SECOND PREFERRED EMBODIMENT

A second preferred embodiment according to the present invention will be described below with reference to the accompanying drawings.

According to the second preferred embodiment of the present invention, the internal structure of the logic circuit provided for the current controller of the current command type PWM inverter having the structure shown in FIG. 1 is made to be different from that of the first preferred embodiment.

The structure of the other parts except for the structure of the logic circuit 10 is quite the same as that of the first preferred embodiment. Therefore, no detailed explanation is provided for the structure of the current controller 9 shown in FIG. 1 provided with the logic circuit of the second preferred embodiment and the structure of the current command type PWM inverter system as shown in FIG. 8 provided with the current controller 9. The structure and operation of the logic circuit will be described below.

An explanation is given here on the structure of the logic circuit of the second preferred embodiment of the present invention with reference to FIG. 3. Referring to FIG. 3, the structural difference between the logic circuit 10 of the second preferred embodiment of the present invention and the logic circuit 10 of the first preferred embodiment is that the output signals of the logic circuit when the system state shifts to any of the state Nos. I00, J00, K00, L00, M00, N00 and O00 are different between them.

First of all, the truth table of the logic circuit in the second preferred embodiment is shown in Tables 4 and 5. Tables 4 and 5 constitute one continuing truth table.

TABLE 4

| State No. | Reset Signal RESET | Timing Signal CLK10 | Line Current Comparison Signal | | | Switching Command Signal | | | | | | |
|---|---|---|---|---|---|---|---|---|---|---|---|---|
| | | | HU | KV | HW | Before Leading Edge of CLK10 | | | After Leading Edge of CLK10 | | | |
| | | | | | | PU | PV | PW | PU | PV | PW | |
| A00 | L | ↑ | LL | HH | HH | * | * | * | H | L | L | |
| AX1 | L | ◆ | * | LL | HH | * | * | * | H | H | L | |
| AX2 | L | ◆ | * | LL | LL | * | * | * | H | H | H | |
| A00 | L | ↑ | LL | HH | HH | * | * | * | H | L | L | |
| AY1 | L | ◆ | * | HH | LL | * | * | * | H | L | H | |
| AY2 | L | ◆ | * | LL | LL | * | * | * | H | H | H | |
| B00 | L | ↑ | HH | LL | HH | * | * | * | L | H | L | |
| BX1 | L | ◆ | LL | * | HH | * | * | * | H | H | L | |
| BX2 | L | ◆ | LL | * | LL | * | * | * | H | H | H | |
| B00 | L | ↑ | HH | LL | HH | * | * | * | L | H | L | |
| BY1 | L | ◆ | HH | * | LL | * | * | * | L | H | H | |
| BY2 | L | ◆ | LL | * | LL | * | * | * | H | H | H | |
| C00 | L | ↑ | HH | HH | LL | * | * | * | L | L | H | |
| CX1 | L | ◆ | LL | HH | * | * | * | * | H | L | H | |
| CX2 | L | ◆ | LL | LL | * | * | * | * | H | H | H | |
| C00 | L | ↑ | HH | HH | LL | * | * | * | L | L | H | |
| CY1 | L | ◆ | HH | LL | * | * | * | * | L | H | H | |
| CY2 | L | ◆ | LL | LL | * | * | * | * | H | H | H | |
| D00 | L | ↑ | HH | LL | LL | * | * | * | L | H | H | |
| DX1 | L | ◆ | * | HH | LL | * | * | * | L | L | H | |
| DX2 | L | ◆ | * | HH | HH | * | * | * | L | L | L | |
| D00 | L | ↑ | HH | LL | LL | * | * | * | L | H | H | |
| DY1 | L | ◆ | * | LL | HH | * | * | * | L | H | L | |
| DY2 | L | ◆ | * | HH | HH | * | * | * | L | L | L | |
| E00 | L | ↑ | LL | HH | LL | * | * | * | H | L | H | |
| EX1 | L | ◆ | HH | * | LL | * | * | * | L | L | H | |
| EX2 | L | ◆ | HH | * | HH | * | * | * | L | L | L | |
| E00 | L | ↑ | LL | HH | LL | * | * | * | H | L | H | |
| EY1 | L | ◆ | LL | * | HH | * | * | * | H | L | L | |
| EY2 | L | ◆ | HH | * | HH | * | * | * | L | L | L | |
| F00 | L | ↑ | LL | LL | HH | * | * | * | H | H | L | |
| FX1 | L | ◆ | HH | LL | * | * | * | * | L | H | L | |
| FX2 | L | ◆ | HH | HH | * | * | * | * | L | L | L | |
| F00 | L | ↑ | LL | LL | HH | * | * | * | H | H | L | |
| FY1 | L | ◆ | LL | HH | * | * | * | * | H | L | L | |
| FY2 | L | ◆ | HH | HH | * | * | * | * | L | L | L | |
| G00 | L | ◆ | HH | HH | HH | * | * | * | L | L | L | |
| H00 | L | ◆ | LL | LL | LL | * | * | * | H | H | H | |
| I00-1 | L | ↑ | HL | HL | HL | * | * | * | H | H | H | Note 1 |
| | | | | | | | | | L | L | L | |
| I00-2 | L | ↑ | HL | HL | HL | H | H | H | H | H | H | |
| I00-3 | L | ↑ | HL | HL | HL | L | L | L | L | L | L | |
| J00-1 | L | ↑ | HL | HL | LL | * | * | * | L | L | L | Note 1 |
| | | | | | | | | | H | H | H | |

Note 1: (PU, PV, PW) is an amature-shortcircuited state; it may be either (H, H, H) or (L, L, L).

TABLE 5

| State No. | Reset Signal RESET | Timing Signal CLK10 | Line Current Comparison Signal | | | Switching Command Signal | | | | | | |
|---|---|---|---|---|---|---|---|---|---|---|---|---|
| | | | HU | KV | HW | Before Leading Edge of CLK10 | | | After Leading Edge of CLK10 | | | |
| | | | | | | PU | PV | PW | PU | PV | PW | |
| J00-2 | L | ↑ | HL | HL | LL | H | H | H | H | H | H | |
| J00-3 | L | ↑ | HL | HL | LL | L | L | L | L | L | L | |
| K00-1 | L | ↑ | LL | HL | HL | * | * | * | L | L | L | Note 1 |
| | | | | | | | | | H | H | H | |
| K00-2 | L | ↑ | LL | HL | HL | H | H | H | H | H | H | |
| K00-3 | L | ↑ | LL | HL | HL | L | L | L | L | L | L | |
| L00-1 | L | ↑ | HL | LL | HL | * | * | * | L | L | L | Note 1 |
| | | | | | | | | | H | H | H | |
| L00-2 | L | ↑ | HL | LL | HL | H | H | H | H | H | H | |
| L00-3 | L | ↑ | HL | LL | HL | L | L | L | L | L | L | |
| M00-1 | L | ↑ | HL | HL | HH | * | * | * | L | L | L | Note 1 |
| | | | | | | | | | H | H | H | |
| M00-2 | L | ↑ | HL | HL | HH | H | H | H | H | H | H | |
| M00-3 | L | ↑ | HL | HL | HH | L | L | L | L | L | L | |
| N00-1 | L | ↑ | HH | HL | HL | * | * | * | L | L | L | Note 1 |
| | | | | | | | | | H | H | H | |

TABLE 5-continued

| State No. | Reset Signal RESET | Timing Signal CLK10 | Line Current Comparison Signal | | | Switching Command Signal | | | | | | |
|---|---|---|---|---|---|---|---|---|---|---|---|---|
| | | | | | | Before Leading Edge of CLK10 | | | After Leading Edge of CLK10 | | | |
| | | | HU | KV | HW | PU | PV | PW | PU | PV | PW | |
| N00-2 | L | ↑ | HH | HL | HL | H | H | H | H | H | H | |
| N00-3 | L | ↑ | HH | HL | HL | L | L | L | L | L | L | |
| O00-1 | L | ↑ | HL | HH | HL | * | * | * | L | L | L | Note 1 |
| | | | | | | | | | H | H | H | |
| O00-2 | L | ↑ | HL | HH | HL | H | H | H | H | H | H | |
| O00-3 | L | ↑ | HL | HH | HL | L | L | L | L | L | L | |
| P00 | L | ↑ | HH | LL | HL | * | * | H | L | H | H | |
| PX1 | L | ♦ | * | * | LL | * | * | H | H | H | H | |
| P00 | L | ↑ | HH | LL | HL | * | * | L | L | H | L | |
| PY1 | L | ♦ | * | * | HH | * | * | L | L | L | L | |
| Q00 | L | ↑ | HL | HH | LL | H | * | * | H | L | H | |
| QX1 | L | ♦ | LL | * | * | H | * | * | H | H | H | |
| Q00 | L | ↑ | HL | HH | LL | L | * | * | L | L | H | |
| QY1 | L | ♦ | HH | * | * | L | * | * | L | L | L | |
| R00 | L | ↑ | LL | HL | HH | * | H | * | H | H | L | |
| RX1 | L | ♦ | * | LL | * | * | H | * | H | H | H | |
| R00 | L | ↑ | LL | HL | HH | * | L | * | H | L | L | |
| RY1 | L | ♦ | * | HH | * | * | L | * | L | L | L | |
| S00 | L | ↑ | LL | HH | HL | * | * | H | H | L | H | |
| SX1 | L | ♦ | * | * | LL | * | * | H | H | H | H | |
| S00 | L | ↑ | LL | HH | HL | * | * | L | H | L | L | |
| SY1 | L | ♦ | * | * | HH | * | * | L | L | L | L | |
| T00 | L | ↑ | HL | LL | HH | H | * | * | H | H | L | |
| TX1 | L | ♦ | LL | * | * | H | * | * | H | H | H | |
| T00 | L | ↑ | HL | LL | HH | L | * | * | L | H | L | |
| TY1 | L | ♦ | HH | * | * | L | * | * | L | L | L | |
| U00 | L | ↑ | HH | HL | LL | * | H | * | L | H | H | |
| UX1 | L | ♦ | * | LL | * | * | H | * | H | H | H | |
| U00 | L | ↑ | HH | HL | LL | * | L | * | L | L | H | |
| UY1 | L | ♦ | * | HH | * | * | L | * | L | L | L | |
| CLR | H | ♦ | * | * | * | * | * | * | L | L | L | |

Note 1:(PU, PV, PW) is an armature-shortcircuited state: it may be either (H, H, H) or (L, L, L).

How to read Tables 4 and 5 is quite the same as that of the truth table (Tables 1 and 2) of the logic circuit 10 of the first preferred embodiment except for the state Nos. I00, J00, K00, L00, M00, N00 and O00, and therefore, explanation is provided only for the state Nos. I00, J00, K00, L00, M00, N00 and O00.

In the case of a shift to any one of these state Nos., with attention paid to the levels of output signals from the seventh, eighth and ninth D-latches 150, 151, 152 at the timing of the leading edge of the state updating timing signal CLK10, the state is branched into I00-1, I00-2 and I00-3, for example, in the case of the shift to state No. I00. Until the next leading edge of the state updating timing signal CLK10 is inputted, this state is maintained and therefore the first, second and third switching command signals PU, PV and PW continue to output their levels.

Figure 16:
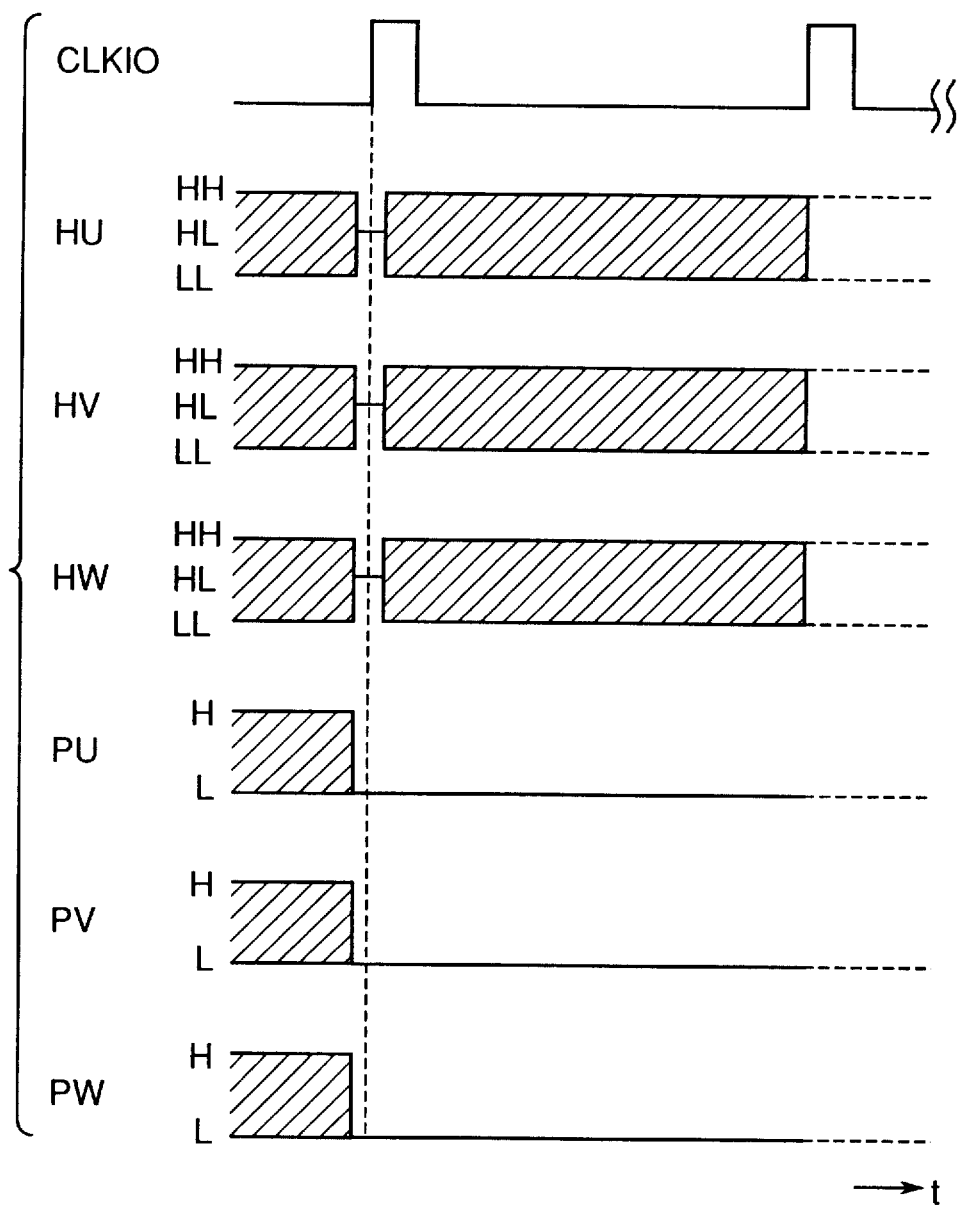
FIG. 16 is a timing chart showing an operation of respective signals before and after a state No. I00-2 in Tables 4 and 5.

FIG. 16 is a timing chart showing an operation of respective signals before and after a state No. I00-2 in Tables 4 and 5, and FIG. 17 is a timing chart showing an operation of respective signals before and after a state No. J00-2 in Tables 4 and 5.

As above is described the explanation of how to read Tables 1 and 2.

The operation of the logic circuit 10 is described below based on the truth table of Tables 4 and 5.

The truth table of the data decoder 22 is shown in Table 6.

TABLE 6

| Input Signal | | | | | | Mode Signal | | | | | | | |
|---|---|---|---|---|---|---|---|---|---|---|---|---|---|
| A | B | C | D | E | F | YM | H1 | S1 | S2 | S3 | SU | SV | SW |
| LL | HH | HH | * | * | * | L | L | L | L | L | L | L | L |
| HH | LL | HH | * | * | * | L | L | L | L | L | L | L | L |
| HH | HH | LL | * | * | * | L | L | L | L | L | L | L | L |
| HH | LL | LL | * | * | * | H | L | L | L | L | L | L | L |
| LL | HH | LL | * | * | * | H | L | L | L | L | L | L | L |
| LL | LL | HH | * | * | * | H | L | L | L | L | L | L | L |
| HH | HH | HH | * | * | * | H | L | L | L | L | L | L | L |
| LL | LL | LL | * | * | * | L | L | L | L | L | L | L | L |
| HL | HL | HL | * | * | * | L(H) | H | L | L | L | L | L | L |
| HL | HL | LL | * | * | * | L(H) | H | L | L | L | L | L | L |
| LL | HL | HL | * | * | * | L(H) | H | L | L | L | L | L | L |
| HL | LL | HL | * | * | * | L(H) | H | L | L | L | L | L | L |

TABLE 6-continued

| Input Signal | | | | | | Mode Signal | | | | | | | |
|---|---|---|---|---|---|---|---|---|---|---|---|---|---|
| A | B | C | D | E | F | YM | H1 | S1 | S2 | S3 | SU | SV | SW |
| HL | HL | LL | * | * | * | L(H) | H | L | L | L | L | L | L |
| HH | HL | HL | * | * | * | L(H) | H | L | L | L | L | L | L |
| HL | HH | HL | * | * | * | L(H) | H | L | L | L | L | L | L |
| HH | LL | HL | * | * | H | H | L | L | L | L | L | L | H |
| HH | LL | HL | * | * | L | L | H | L | L | L | L | L | H |
| HL | HH | LL | H | * | * | H | L | L | L | L | H | L | L |
| HL | HH | LL | L | * | * | L | H | L | L | L | H | L | L |
| LL | HL | HH | * | H | * | H | L | L | L | L | L | H | L |
| LL | HL | HH | * | L | * | L | H | L | L | L | L | H | L |
| LL | HH | HL | * | * | H | H | L | L | L | L | L | L | H |
| LL | HH | HL | * | * | L | L | H | L | L | L | L | L | H |
| HL | LL | HH | H | * | * | H | L | L | L | L | H | L | L |
| HL | LL | HH | L | * | * | L | H | L | L | L | H | L | L |
| HH | HL | LL | * | H | * | H | L | L | L | L | L | H | L |
| HH | HL | LL | * | L | * | L | H | L | L | L | L | H | L |

It is to be noted that the truth table of Table 6 can be easily implemented by AND gates, OR gates and inverter gates.

The operation of the logic circuit is quite the same as that of the truth table of the logic circuit 10 of the first preferred embodiment except for the state Nos. I00, J00, K00, L00, M00, N00 and O00. Therefore, explanation is provided here only for the state Nos. I00-2, I00-3, J00-2, J00-3, K00-2, K00-3, L00-2, L00-3, M00-2, M00-3, N00-2, N00-3, O00-2 and O00-3.

Reference is made here to a state in which the state updating timing signal CLK10 changes from the L-level to the H-level, i.e., just after its leading edge is inputted, namely, the Timing 1 shown in FIG. 4.

First of all, the switching command signals PU, PV, PW are inputted to and latched by the input terminals D of the seventh, eighth and ninth D-latches 150, 151, 152, respectively. Also, the input levels of the input terminals 1D, 2D and 3D are latched to be held by the first data latch circuit 34, and then, are outputted to the output terminals 1Q, 2Q and 3Q. This state of the first data latch circuit 34 does not change until the next leading edge of the state updating timing signal CLK10 is inputted. Then, the output signals outputted from the output terminals Q of the seventh, eighth and ninth D-latches 150, 151, 152 as well as the output signals outputted from the output terminals 1Q, 2Q, 3Q of the first data latch circuit 34 are inputted to the data decoder 22, so that the mode signals YM, H1, S1, S2 and S3 are made to have the H-level or the L-level, while the mode signals SU, SV and SW are made to have the H-level, according to the truth table shown in Tables 4 and 5.

At this timing, because the H-level has been inputted to the input terminals SEL of the tenth, eleventh and twelfth data selectors 147, 148 and 149, the output levels of the seventh, eighth and ninth D-latches 150, 151, 152 are outputted as the output signals PU, PV and PW. This state is maintained until the timing of the leading edge of the system clock CLK1 subsequent to the timing of the next leading edge of the state updating timing signal CLK10.

As above is described the concrete explanation of the operation of the logic circuit 10 in the current controller of the current command type PWM inverter system of the second preferred embodiment according to the present invention. In comparison between the first preferred embodiment with the second preferred embodiment, the present preferred embodiment differs only in the operation performed when the levels of the first, second and third switching command signals PU, PV and PW are all at the H-level or the L-level just before the leading edge of the state updating timing signal CLK10 in the case of a state shift to any of the state Nos. I00, J00, K00, L00, M00, N00 and O00.

In the case of the state shift to any one of the state Nos. I00, J00, K00, L00, M00, N00 and O00, when the first, second and third switching command signals PU, PV and PW just before the leading edge of the state updating timing signal CLK10 all have the H-level or the L-level, the levels of the first, second and third switching command signals PU, PV and PW obtained just before the leading edge of the state updating timing signal CLK10 are maintained until the next state updating timing signal CLK10. This means that the first, second, third, fourth, fifth and sixth main circuit switching power devices Q1, Q2, Q3, Q4, Q5 and Q6 do not effect switching operations at all from the timing of the leading edge of the state updating timing signal CLK10 until the timing of its next leading edge. Therefore, since no switching loss is involved in the switching operations, the total number of times of switching operations is reduced so that the switching loss can be reduced. Moreover, the second preferred embodiment can control the line currents of the three-phase motor 1 equivalently in a manner similar to that of the first preferred embodiment.

THIRD PREFERRED EMBODIMENT

A third preferred embodiment according to the present invention will be described below with reference to the accompanying drawings.

According to the third preferred embodiment of the present invention, the structure of the logic circuit in the current controller of the current command type PWM inverter system shown in FIG. 1 is made to be different from that of the first preferred embodiment.

The structure of the other parts except for the structure of the logic circuit 10 is quite the same as that of the first preferred embodiment. Therefore, no explanation is provided for the structure of the current controller 9 shown in FIG. 1 provided with the logic circuit of the third preferred embodiment and the structure of the current command type PWM inverter system as shown in FIG. 8 provided with the current controller 9. The structure and operation of the logic circuit will be described below.

An explanation is given here on the structure of the logic circuit of the third preferred embodiment of the present invention with reference to FIG. 3. Referring to FIG. 3, the structural difference between the logic circuit 10 of the third preferred embodiment of the present invention and the logic circuit 10 of the first preferred embodiment is that the output signals of the logic circuit when the system state shifts to any of the state Nos. J00, K00, L00, M00, N00 and O00 in the truth table of the logic circuit are different between them.

First of all, the truth table of the logic circuit in the third preferred embodiment is shown in Tables 7 and 8. Tables 7 and 8 constitute one continuing truth table.

TABLE 7

| State No. | Reset Signal RESET | Timing Signal CLK10 | Line Current Comparison Signal | | | Switching Command Signal | | | | | | |
|---|---|---|---|---|---|---|---|---|---|---|---|---|
| | | | | | | Before Leading Edge of CLK10 | | | After Leading Edge of CLK10 | | | |
| | | | HU | KV | HW | PU | PV | PW | PU | PV | PW | |
| A00 | L | ↑ | LL | HH | HH | * | * | * | H | L | L | |
| AX1 | L | ◆ | * | LL | HH | * | * | * | H | H | L | |
| AX2 | L | ◆ | * | LL | LL | * | * | * | H | H | H | |
| A00 | L | ↑ | LL | HH | HH | * | * | * | H | L | L | |
| AY1 | L | ◆ | * | HH | LL | * | * | * | H | L | H | |
| AY2 | L | ◆ | * | LL | LL | * | * | * | H | H | H | |
| B00 | L | ↑ | HH | LL | HH | * | * | * | L | H | L | |
| BX1 | L | ◆ | LL | * | HH | * | * | * | H | H | L | |
| BX2 | L | ◆ | LL | * | LL | * | * | * | H | H | H | |
| B00 | L | ↑ | HH | LL | HH | * | * | * | L | H | L | |
| BY1 | L | ◆ | HH | * | LL | * | * | * | L | H | H | |
| BY2 | L | ◆ | LL | * | LL | * | * | * | H | H | H | |
| C00 | L | ↑ | HH | HH | LL | * | * | * | L | L | H | |
| CX1 | L | ◆ | LL | HH | * | * | * | * | H | L | H | |
| CX2 | L | ◆ | LL | LL | * | * | * | * | H | H | H | |
| C00 | L | ↑ | HH | HH | LL | * | * | * | L | L | H | |
| CY1 | L | ◆ | HH | LL | * | * | * | * | L | H | H | |
| CY2 | L | ◆ | LL | LL | * | * | * | * | H | H | H | |
| D00 | L | ↑ | HH | LL | LL | * | * | * | L | H | H | |
| DX1 | L | ◆ | * | HH | LL | * | * | * | L | L | H | |
| DX2 | L | ◆ | * | HH | HH | * | * | * | L | L | L | |
| D00 | L | ↑ | HH | LL | LL | * | * | * | L | H | H | |
| DY1 | L | ◆ | * | LL | HH | * | * | * | L | H | L | |
| DY2 | L | ◆ | * | HH | HH | * | * | * | L | L | L | |
| E00 | L | ↑ | LL | HH | LL | * | * | * | H | L | H | |
| EX1 | L | ◆ | HH | * | LL | * | * | * | L | L | H | |
| EX2 | L | ◆ | HH | * | HH | * | * | * | L | L | L | |
| E00 | L | ↑ | LL | HH | LL | * | * | * | H | L | H | |
| EY1 | L | ◆ | LL | * | HH | * | * | * | H | L | L | |
| EY2 | L | ◆ | HH | * | HH | * | * | * | L | L | L | |
| F00 | L | ↑ | LL | LL | HH | * | * | * | H | H | L | |
| FX1 | L | ◆ | HH | LL | * | * | * | * | L | H | L | |
| FX2 | L | ◆ | HH | HH | * | * | * | * | L | L | L | |
| F00 | L | ↑ | LL | LL | HH | * | * | * | H | H | L | |
| FY1 | L | ◆ | LL | HH | * | * | * | * | H | L | L | |
| FY2 | L | ◆ | HH | HH | * | * | * | * | L | L | L | |
| G00 | L | ◆ | HH | HH | HH | * | * | * | L | L | L | |
| H00 | L | ◆ | LL | LL | LL | * | * | * | H | H | H | |
| I00 | L | ↑ | HL | HL | HL | * | * | * | L | L | L | Note 1 |
| | | | | | | | | | H | H | H | |
| J00 | L | ↑ | HL | HL | LL | * | * | * | L | L | H | |
| JX1 | | ◆ | * | * | HH | * | * | * | L | L | L | |

Note 1: (PU, PV, PW) is an armature-shortcircuited state; it may be either (H, H, H) or (L, L, L).

TABLE 8

| State No. | Reset Signal RESET | Timing Signal CLK10 | Line Current Comparison Signal | | | Switching Command Signal | | | | | |
|---|---|---|---|---|---|---|---|---|---|---|---|
| | | | | | | Before Leading Edge of CLK10 | | | After Leading Edge of CLK10 | | |
| | | | HU | KV | HW | PU | PV | PW | PU | PV | PW |
| K00 | L | ↑ | LL | HL | HL | * | * | * | H | L | L |
| KX1 | | ◆ | HH | * | * | * | * | * | L | L | L |
| L00 | L | ↑ | HL | LL | HL | * | * | * | L | H | L |
| LX1 | | ◆ | * | HH | * | * | * | * | L | L | L |
| M00 | L | ↑ | HL | HL | HH | * | * | * | H | H | L |
| MX1 | | ◆ | * | * | LL | * | * | * | H | H | H |
| N00 | L | ↑ | HH | HL | HL | * | * | * | L | H | H |
| NXI | | ◆ | LL | * | * | * | * | * | H | H | H |
| O00 | L | ↑ | HL | HH | HL | * | * | * | H | L | H |
| OX1 | | ◆ | * | LL | * | * | * | * | H | H | H |
| P00 | L | ↑ | HH | LL | HL | * | * | H | L | H | H |
| PX1 | L | ◆ | * | * | LL | * | * | H | H | H | H |
| P00 | L | ↑ | HH | LL | HL | * | * | L | L | H | L |

TABLE 8-continued

| State No. | Reset Signal RESET | Timing Signal CLK10 | Line Current Comparison Signal | | | Switching Command Signal | | | | | |
|---|---|---|---|---|---|---|---|---|---|---|---|
| | | | HU | KV | HW | Before Leading Edge of CLK10 | | | After Leading Edge of CLK10 | | |
| | | | | | | PU | PV | PW | PU | PV | PW |
| PY1 | L | ♦ | * | HH | * | * | L | L | L | L | |
| Q00 | L | ↑ | HL | HH | LL | H | * | * | H | L | H |
| QX1 | L | ♦ | LL | * | * | H | * | * | H | H | H |
| Q00 | L | ↑ | HL | HH | LL | L | * | * | L | L | H |
| QY1 | L | ♦ | HH | * | * | L | * | * | L | L | L |
| R00 | L | ↑ | LL | HL | HH | * | H | * | H | H | L |
| RX1 | L | ♦ | * | LL | * | * | H | * | H | H | H |
| R00 | L | ↑ | LL | HL | HH | * | L | * | H | L | L |
| RY1 | L | ♦ | * | HH | * | * | L | * | L | L | L |
| S00 | L | ↑ | LL | HH | HL | * | * | H | H | L | H |
| SX1 | L | ♦ | * | * | LL | * | * | H | H | H | H |
| S00 | L | ↑ | LL | HH | HL | * | * | L | H | L | L |
| SY1 | L | ♦ | * | * | HH | * | * | L | L | L | L |
| T00 | L | ↑ | HL | LL | HH | H | * | * | H | H | L |
| TX1 | L | ♦ | LL | * | * | H | * | * | H | H | H |
| T00 | L | ↑ | HL | LL | HH | L | * | * | L | H | L |
| TY1 | L | ♦ | HH | * | * | L | * | * | L | L | L |
| U00 | L | ↑ | HH | HL | LL | * | H | * | L | H | H |
| UX1 | L | ♦ | LL | * | * | H | * | * | H | H | H |
| U00 | L | ↑ | HH | HL | LL | * | L | * | L | L | H |
| UY1 | L | ♦ | * | HH | * | * | L | * | L | L | L |
| CLR | H | ♦ | * | * | * | * | * | * | L | L | L |

How to read Tables 7 and 8 is quite the same as that of the truth table (Table 1 and 2) of the logic circuit 10 of the first preferred embodiment except for the state Nos. J00, K00, L00, M00, N00 and O00, and therefore, explanation is provided only for the state Nos. J00, K00, L00, M00, N00 and O00.

In the case of a shift to any one of these state Nos., with attention paid to a line current comparison signal that is at the HH-level or the LL-level, out of the first, second and third line current comparison signals, HU, HV and HW at the timing of the leading edge of the state updating timing signals PU, PV and PW are determined.

Further, when the line current command signal that is at the HH-level or the LL-level out of the line current comparison signals HU, HV and HW changes from the HH-level to the LL-level or from the LL-level to the HH-level, the system state shifts to the state Nos. JX1, KX1, LX1, MX1, NX1 and OX1, respectively.

Subsequently, the state is maintained until the timing of the next leading edge of the state updating timing signal CLK10.

Figure 18:
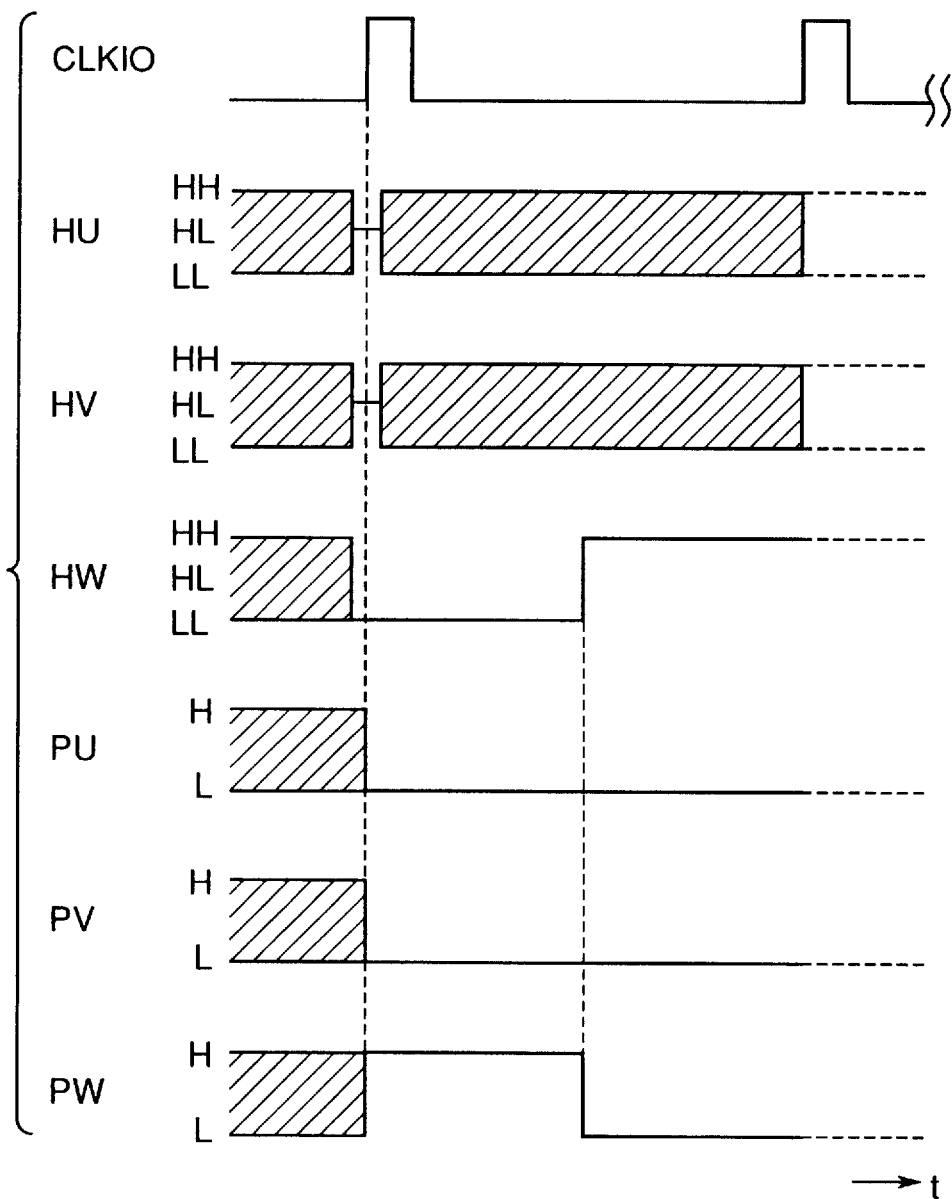
FIG. 18 is a timing chart showing an operation of respective signals at a transition from a state No. J00 to a state No. JX1 in Tables 7 and 8.

FIG. 18 is a timing chart showing an operation of respective signals at a transition from a state No. J00 to a state No. JX1 in Tables 7 and 8.

As above is described the explanation of how to read Tables 7 and 8.

The operation of the logic circuit 10 is described below based on the truth table of Table 7 and 8.

The operation of the logic circuit 10 is quite the same as that of the truth table (Table 1 and 2) of the logic circuit 10 of the first preferred embodiment except for the state Nos. J00, K00, L00, M00, N00 and O00. Therefore, explanation is provided here only for the state Nos. J00, K00, L00, M00, N00 and O00.

The truth table of the data decoder 22 is shown in Table 9.

TABLE 9

| Input Signal | | | | | | Mode Signal | | | | | | | |
|---|---|---|---|---|---|---|---|---|---|---|---|---|---|
| A | B | C | D | E | F | YM | H1 | S1 | S2 | S3 | SU | SV | SW |
| LL | HH | HH | * | * | * | L | L | L | L | L | L | L | L |
| HH | LL | HH | * | * | * | L | L | L | L | L | L | L | L |
| HH | HH | LL | * | * | * | L | L | L | L | L | L | L | L |
| HH | LL | LL | * | * | * | H | L | L | L | L | L | L | L |
| LL | HH | LL | * | * | * | H | L | L | L | L | L | L | L |
| LL | LL | HH | * | * | * | H | L | L | L | L | L | L | L |
| HH | HH | HH | * | * | * | H | L | L | L | L | L | L | L |
| LL | LL | LL | * | * | * | L | L | L | L | L | L | L | L |
| HL | HL | HL | * | * | * | H(H) | H | L | L | L | L | L | L |
| HL | HL | LL | * | * | * | H | H | L | L | H | L | L | L |
| LL | HL | HL | * | * | * | H | H | H | L | L | L | L | L |
| HL | LL | HL | * | * | * | H | H | L | H | L | L | L | L |
| HL | HL | LL | * | * | * | H | H | H | H | L | L | L | L |
| HH | HL | HL | * | * | * | H | H | L | H | H | L | L | L |
| HL | HH | HL | * | * | * | H | H | H | L | H | L | L | L |
| HH | LL | HL | * | * | H | H | L | L | L | L | L | L | H |
| HH | LL | HL | * | * | L | L | L | H | L | L | L | L | H |

TABLE 9-continued

| Input Signal | | | | | | Mode Signal | | | | | | | |
|---|---|---|---|---|---|---|---|---|---|---|---|---|---|
| A | B | C | D | E | F | YM | H1 | S1 | S2 | S3 | SU | SV | SW |
| HL | HH | LL | H | * | * | H | L | L | L | L | H | L | L |
| HL | HH | LL | L | * | * | L | H | L | L | L | H | L | L |
| LL | HL | HH | * | H | * | H | L | L | L | L | L | H | L |
| LL | HL | HH | * | L | * | L | H | L | L | L | L | H | L |
| LL | HH | HL | * | * | H | H | L | L | L | L | L | L | H |
| LL | HH | HL | * | * | L | L | H | L | L | L | L | L | H |
| HL | LL | HH | H | * | * | H | L | L | L | L | H | L | L |
| HL | LL | HH | L | * | * | L | H | L | L | L | H | L | L |
| HH | HL | LL | * | H | * | H | L | L | L | L | L | H | L |
| HH | HL | LL | * | L | * | L | H | L | L | L | L | H | L |

It is to be noted that the truth table of Table 9 can be easily implemented by AND gates, OR gates and inverter gates.

Reference is made here to a state in which the state updating timing signal CLK10 changes from the L-level to the H-level, i.e., just after its leading edge is inputted, namely, the Timing 1 shown in FIG. 4.

The explanation will be provided here taking the state No. J00 in Tables 7 and 8 as an example.

First of all, the switching command signals PU, PV, PW are inputted to and latched by the input terminals D of the seventh, eighth and ninth D-latches 150, 151, 152, respectively. Also, the input levels of the input terminals 1D, 2D and 3D are latched to be held by the first data latch circuit 34, and then, are outputted to the output terminals 1Q, 2Q and 3Q. This state of the first data latch circuit 34 does not change until the next leading edge of the state updating timing signal CLK10 is inputted. Then, the output signals outputted from the output terminals Q of the seventh, eighth and ninth D-latches 150, 151, 152 as well as the output signals outputted from the output terminals 1Q, 2Q, 3Q of the first data latch circuit 34 are inputted to the data decoder 22, so that the mode signals YM, H1 and S3 are made to have the H-level, while the mode signals S1, S2, SU, SV and SW are made to have the L-level, according to the truth table shown in Table 9.

At this timing, because the first selection output signals Y1U, Y1V have the H-level, the first, second RS flip-flops 26, 27 are in the reset state. Therefore, the H-level is outputted for the second selection output signals Y2U, Y2V, while the L-level is outputted for Y2W.

Therefore, the switching command signals PU, PV and PW become (PU, PV, PW)=(L, L, H)

at the timing of the next leading edge of the system clock CLK1. In accordance with the first, second and third switching command signals PU, PV and PW, the main circuit power controller 8 at the next stage operates.

Next, we consider an operation when the third line current comparison signal HW changes from the LL-level to the HH-level, i.e., an operation of the state shift from the state No. J00 to the state No. JX1 in Tables 7 and 8.

When the third line current comparison signal HW changes from the LL-level to the HH-level, the level of the first selection output signal Y1W changes from the L-level to the H-level, thereby resetting the third RS flip-flop 28. Therefore, the second selection output signal Y2W is changed from the L-level to the H-level.

Therefore, the switching command signals PU, PV and PW become (PU, PV, PW)=(L, L, L)

at the timing of the next leading edge of the system clock CLK1.

In accordance with the first, second and third switching command signals PU, PV and PW, the main circuit power controller 8 at the next stage operates.

This state, i.e., (PU, PV, PW)=(L, L, L)

is maintained until the timing of the leading edge of the system clock CLK1 subsequent to the timing of the next leading edge of the state updating timing signal CLK10.

As above is described the concrete explanation of the operation of the logic circuit in the current controller of the current command type PWM inverter system of the third preferred embodiment according to the present invention. In comparison between the first preferred embodiment with the third preferred embodiment, the present preferred embodiment differs only in the operation performed in the case of a state shift to any of the state Nos. J00, K00, L00, M00, N00 and O00.

In the case of the state shift to any one of the state Nos. J00, K00, L00, M00, N00 and O00, with attention paid to a line current comparison signal that is at the HH-level or the LL-level, out of the first, second and third line current comparison signals HU, HV and HW, the main circuit switching power devices are turned on or off so that the corresponding switching command signal and the line current are made to be coincident with each other. Subsequently, when the attentional line current command signal has changed from the HH-level to the LL-level or from the LL-level to the HH-level, all the first, second and third switching command signals are made to have the H-level or the L-level. This state is maintained until the timing of the next leading edge of the state updating timing signal CLK10. Consequently, in the case of the state shift to any one of the state Nos. J00, K00, L00, M00, N00 and O00, the line current corresponding to the HH-level or the LL-level out of the first, second and third line current comparison signals HU, HV and HW can be made to more approach the line current command signal. Moreover, the third preferred embodiment can also control the line currents of the three-phase motor 1 utterly equivalently in a manner similar to that of the first preferred embodiment.

It is noted that the present preferred embodiment has a modified input/output relationship of the data decoder 22 of the logic circuit 10 in the first preferred embodiment. Besides, it is needless to say that similar effects can be obtained also when the operations performed in the case of the system state shift to the state Nos. J00, K00, L00, M00, N00 and O00 are incorporated to the data decoder 22 of the logic circuit 10 of the second preferred embodiment.

FOURTH PREFERRED EMBODIMENT

A fourth preferred embodiment according to the present invention will be described below with reference to the accompanying drawings.

According to the fourth preferred embodiment of the present invention, the structure of the logic circuit in the current controller of the current command type PWM inverter system shown in FIG. 1 is made to be different from that of the first preferred embodiment.

The structure of the other parts except for the structure of the logic circuit 10 is quite the same as that of the first preferred embodiment. Therefore, no explanation is provided for the structure of the current controller 9 shown in FIG. 1 provided with the logic circuit of the fourth preferred embodiment and the structure of the current command type PWM inverter system as shown in FIG. 8 provided with the current controller 9. The structure and-operation of the logic circuit will be described below.

An explanation is given here on the structure of the logic circuit of the fourth preferred embodiment of the present invention with reference to FIG. 3. Referring to FIG. 3, the structural difference between the logic circuit 10 of the fourth preferred embodiment of the present invention and the logic circuit 10 of the first preferred embodiment is that the output signals of the logic circuit when the system state shifts to any of the state Nos. J00, K00, L00, M00, N00 and O00 in the truth table of the logic circuit are different between them.

First of all, the truth table of the logic circuit in the fourth preferred embodiment is shown in Tables 10 and 11. Tables 10 and 11 constitute one continuing truth table.

TABLE 10

| State No. | Reset Signal RESET | Timing Signal CLK10 | Line Current Comparison Signal | | | Switching Command Signal | | | | | | |
|---|---|---|---|---|---|---|---|---|---|---|---|---|
| | | | | | | Before Leading Edge of CLK10 | | | After Leading Edge of CLK10 | | | |
| | | | HU | KV | HW | PU | PV | PW | PU | PV | PW | |
| A00 | L | ↑ | LL | HH | HH | * | * | * | H | L | L | |
| AX1 | L | ◆ | * | LL | HH | * | * | * | H | H | L | |
| AX2 | L | ◆ | * | LL | LL | * | * | * | H | H | H | |
| A00 | L | ↑ | LL | HH | HH | * | * | * | H | L | L | |
| AY1 | L | ◆ | * | HH | LL | * | * | * | H | L | H | |
| AY2 | L | ◆ | * | LL | LL | * | * | * | H | H | H | |
| B00 | L | ↑ | HH | LL | HH | * | * | * | L | H | L | |
| BX1 | L | ◆ | LL | * | HH | * | * | * | H | H | L | |
| BX2 | L | ◆ | LL | * | LL | * | * | * | H | H | H | |
| B00 | L | ↑ | HH | LL | HH | * | * | * | L | H | L | |
| BY1 | L | ◆ | HH | * | LL | * | * | * | L | H | H | |
| BY2 | L | ◆ | LL | * | LL | * | * | * | H | H | H | |
| C00 | L | ↑ | HH | HH | LL | * | * | * | L | L | H | |
| CX1 | L | ◆ | LL | HH | * | * | * | * | H | L | H | |
| CX2 | L | ◆ | LL | LL | * | * | * | * | H | H | H | |
| C00 | L | ↑ | HH | HH | LL | * | * | * | L | L | H | |
| CY1 | L | ◆ | HH | LL | * | * | * | * | L | H | H | |
| CY2 | L | ◆ | LL | LL | * | * | * | * | H | H | H | |
| D00 | L | ↑ | HH | LL | LL | * | * | * | L | H | H | |
| DX1 | L | ◆ | * | HH | LL | * | * | * | L | L | H | |
| DX2 | L | ◆ | * | HH | HH | * | * | * | L | L | L | |
| D00 | L | ↑ | HH | LL | LL | * | * | * | L | H | H | |
| DY1 | L | ◆ | * | LL | HH | * | * | * | L | H | L | |
| DY2 | L | ◆ | * | HH | HH | * | * | * | L | L | L | |
| E00 | L | ↑ | LL | HH | LL | * | * | * | H | L | H | |
| EX1 | L | ◆ | HH | * | LL | * | * | * | L | L | H | |
| EX2 | L | ◆ | HH | * | HH | * | * | * | L | L | L | |
| E00 | L | ↑ | LL | HH | LL | * | * | * | H | L | H | |
| EY1 | L | ◆ | LL | * | HH | * | * | * | H | L | L | |
| EY2 | L | ◆ | HH | * | HH | * | * | * | L | L | L | |
| F00 | L | ↑ | LL | LL | HH | * | * | * | H | H | L | |
| FX1 | L | ◆ | HH | LL | * | * | * | * | L | H | L | |
| FX2 | L | ◆ | HH | HH | * | * | * | * | L | L | L | |
| F00 | L | ↑ | LL | LL | HH | * | * | * | H | H | L | |
| FY1 | L | ◆ | LL | HH | * | * | * | * | H | L | L | |
| FY2 | L | ◆ | HH | HH | * | * | * | * | L | L | L | |
| G00 | L | ◆ | HH | HH | HH | * | * | * | L | L | L | |
| H00 | L | ◆ | LL | LL | LL | * | * | * | H | H | H | |
| I00 | L | ↑ | HL | HL | HL | * | * | * | L | L | L | Note 1 |
| | | | | | | | | | H | H | H | |

Note 1: (PU, PV, PW) is an armature-shortcircuited state; it may be either (H, H, H) or (L, L, L).

TABLE 11

| State No. | Reset Signal RESET | Timing Signal CLK10 | Line Current Comparison Signal | | | Switching Command Signal | | | | | |
|---|---|---|---|---|---|---|---|---|---|---|---|
| | | | | | | Before Leading Edge of CLK10 | | | After Leading Edge of CLK10 | | |
| | | | HU | HV | HW | PU | PV | PW | PU | PV | PW |
| J00 | L | ↑ | HL | HL | LL | * | * | * | L | L | H |
| JX1 | | ◆ | * | * | HL | * | * | * | L | L | L |
| K00 | L | ↑ | LL | HL | HL | * | * | * | H | L | L |
| KX1 | | ◆ | HL | * | * | * | * | * | L | L | L |
| L00 | L | ↑ | HL | LL | HL | * | * | * | L | H | L |
| LX1 | | ◆ | * | HL | * | * | * | * | L | L | L |
| M00 | L | ↑ | HL | HL | HH | * | * | * | H | H | L |
| MX1 | | ◆ | * | * | HL | * | * | * | H | H | H |
| N00 | L | ↑ | HH | HL | HL | * | * | * | L | H | H |
| NX1 | | ◆ | HL | * | * | * | * | * | H | H | H |
| O00 | L | ↑ | HL | HH | HL | * | * | * | H | L | H |
| OX1 | | ◆ | * | LL | * | * | * | * | H | H | H |
| P00 | L | ↑ | HH | LL | HL | * | * | H | L | H | H |
| PX1 | L | ◆ | * | * | LL | * | * | H | H | H | H |
| P00 | L | ↑ | HH | LL | HL | * | * | L | L | H | L |
| PY1 | L | ◆ | * | * | HH | * | * | L | L | L | L |
| Q00 | L | ↑ | HL | HH | LL | H | * | * | H | L | H |
| QX1 | L | ◆ | LL | * | * | H | * | * | H | H | H |
| Q00 | L | ↑ | HL | HH | LL | L | * | * | L | L | H |
| QY1 | L | ◆ | HH | * | * | L | * | * | L | L | L |
| R00 | L | ↑ | LL | HL | HH | * | H | * | H | H | L |
| RX1 | L | ◆ | * | LL | * | * | H | * | H | H | H |
| R00 | L | ↑ | LL | HL | HH | * | L | * | H | L | L |
| RY1 | L | ◆ | * | HH | * | * | L | * | L | L | L |
| S00 | L | ↑ | LL | HH | HL | * | * | H | H | L | H |
| SX1 | L | ◆ | * | * | LL | * | * | H | H | H | H |
| S00 | L | ↑ | LL | HH | HL | * | * | L | H | L | L |
| SY1 | L | ◆ | * | * | HH | * | * | L | L | L | L |
| T00 | L | ↑ | HL | LL | HH | H | * | * | H | H | L |
| TX1 | L | ◆ | LL | * | * | H | * | * | H | H | H |
| T00 | L | ↑ | HL | LL | HH | L | * | * | L | H | L |
| TY1 | L | ◆ | HH | * | * | L | * | * | L | L | L |
| U00 | L | ↑ | HH | HL | LL | * | H | * | L | H | H |
| UX1 | L | ◆ | * | LL | * | * | H | * | H | H | H |
| U00 | L | ↑ | HH | HL | LL | * | L | * | L | L | H |
| UY1 | L | ◆ | * | HH | * | * | L | * | L | L | L |
| CLR | H | ◆ | * | * | * | * | * | * | L | L | L |

Note 1: (PU, PV, PW) is an armature-shortcircuited state; it may be either (H, H, H) or (L, L, L).

How to read Tables 10 and 11 is quite the same as that of the truth table (Tables 1 and 2) of the logic circuit 10 of the first preferred embodiment except for the state Nos. J00, K00, L00, M00, N00 and O00, and therefore, explanation is provided only for the state Nos. J00, K00, L00, M00, N00 and O00.

In the case of a shift to any one of these state Nos., with attention paid to a line current comparison signal that is at the HH-level or the LL-level, out of the first, second and third line current comparison signals HU, HV and HW at the timing of the leading edge of the state updating timing signal CLK10, the first, second and third switching command signals PU, PV and PW are determined.

Further, when the line current command signal that is at the HH-level or the LL-level out of the line current comparison signals HU, HV and HW changes to the HL-level, the system state shifts to the state Nos. JX1, KX1, LX1, MX1, NX1 and OX1, respectively.

Subsequently, the state is maintained until the timing of the next leading edge of the state updating timing signal CLK10.

FIG. 19 is a timing chart showing an operation of respective signals at a transition from a state No. J00 to a state No. JX1 in Tables 10 and 11.

As above is described the explanation of how to read Tables 10 and 11.

The operation of the logic circuit 10 is described below based on the truth table of Tables 10 and 11.

The operation of the logic circuit 10 is quite the same as that of the truth table (Tables 1 and 2) of the logic circuit 10 of the first preferred embodiment except for the state Nos. J00, K00, L00, M00, N00 and O00. Therefore, explanation is provided here only for the state Nos. J00, K00, L00, M00, N00 and O00.

The truth table of the data decoder 22 is shown in Table 12.

TABLE 12

| Input Signal | | | | | | Mode Signal | | | | | | | |
|---|---|---|---|---|---|---|---|---|---|---|---|---|---|
| A | B | C | D | E | F | YM | H1 | S1 | S2 | S3 | SU | SV | SW |
| LL | HH | HH | * | * | * | L | L | L | L | L | L | L | L |
| HH | LL | HH | * | * | * | L | L | L | L | L | L | L | L |
| HH | HH | LL | * | * | * | L | L | L | L | L | L | L | L |
| HH | LL | LL | * | * | * | H | L | L | L | L | L | L | L |
| LL | HH | LL | * | * | * | H | L | L | L | L | L | L | L |
| LL | LL | HH | * | * | * | H | L | L | L | L | L | L | L |
| HH | HH | HH | * | * | * | H | L | L | L | L | L | L | L |
| LL | LL | LL | * | * | * | L | L | L | L | L | L | L | L |
| HL | HL | HL | * | * | * | H(H) | H | L | L | L | L | L | L |
| HL | HL | LL | * | * | * | H | H | L | L | L | L | L | L |
| LL | HL | HL | * | * | * | H | H | L | L | L | L | L | L |
| HL | LL | HL | * | * | * | H | H | L | L | L | L | L | L |
| HL | HL | LL | * | * | * | H | H | H | H | H | L | L | L |
| HH | HL | HL | * | * | * | H | H | H | H | H | L | L | L |
| HL | HH | HL | * | * | * | H | H | H | H | H | L | L | L |
| HH | LL | HL | * | * | H | H | L | L | L | L | L | L | H |
| HH | LL | HL | * | * | L | L | H | L | L | L | L | L | H |
| HL | HH | LL | H | * | * | H | L | L | L | L | H | L | L |
| HL | HH | LL | L | * | * | L | H | L | L | L | H | L | L |
| LL | HL | HH | * | H | * | H | L | L | L | L | L | H | L |
| LL | HL | HH | * | L | * | L | H | L | L | L | L | H | L |
| LL | HH | HL | * | * | H | H | L | L | L | L | L | L | H |
| LL | HH | HL | * | * | L | L | H | L | L | L | L | L | H |
| HL | LL | HH | H | * | * | H | L | L | L | L | H | L | L |
| HL | LL | HH | L | * | * | L | H | L | L | L | H | L | L |
| HH | HL | LL | * | H | * | H | L | L | L | L | L | H | L |
| HH | HL | LL | * | L | * | L | H | L | L | L | L | H | L |

It is to be noted that the truth table of Table 12 can be easily implemented by AND gates, OR gates and inverter gates.

Reference is made here to a state in which the state updating timing signal CLK10 changes from the L-level to the H-level, i.e., just after its leading edge is inputted, namely, the Timing 1 shown in FIG. 4.

The explanation will be provided here taking the state No. J00 in Tables 10 and 11 as an example.

First of all, the switching command signals PU, PV, PW are inputted to and latched by the input terminals D of the seventh, eighth and ninth D-latches 150, 151, 152, respectively. Also, the input levels of the input terminals 1D, 2D and 3D are latched to be held by the first data latch circuit 34, and then, are outputted to the output terminals 1Q, 2Q and 3Q. This state of the first data latch circuit 34 does not change until the next leading edge of the state updating timing signal CLK10 is inputted. Then, the output signals outputted from the output terminals Q of the seventh, eighth and ninth D-latches 150, 151, 152 as well as the output signals outputted from the output terminals 1Q, 2Q, 3Q of the first data latch circuit 34 are inputted to the data decoder 22, so that the mode signals YM is made to have the H-level, while the mode signals H1, S1, S2, SU, SV and SW are made to have the L-level, according to the truth table shown in Table 12.

At this timing, because the first selection output signals Y1U, Y1V have the H-level, the first, second RS flip-flops 2G, 27 are in the reset state. Therefore, the H-level is outputted for the second selection output signals Y2U, Y2V, while the L-level is outputted for Y2W.

Therefore, the switching command signals PU, PV and PW become (PU, PV, PW)=(L, L, H)

at the timing of the next leading edge of the system clock CLK1. In accordance with the first, second and third switching command signals PU, PV and PW, the main circuit power controller 8 at the next stage operates.

Next, we consider an operation when the third line current comparison signal HW changes from the LL-level to the HL-level, i.e., an operation of the state shift from the state No. P00 to the state No. PX1 in Tables 10 and 11.

When the third line current comparison signal HW changes from the LL-level to the HL-level, the level of the first selection output signal Y1W changes from the L-level to the H-level, thereby resetting the third RS flip-flop 28. Therefore, the second selection output signal Y2W is changed from the L-level to the H-level.

Therefore, the switching command signals PU, PV and PW become (PU, PV, PW)=(L, L, L)

at the timing of the next leading edge of the system clock CLK1.

In accordance with the first, second and third switching command signals PU, PV and PW, the main circuit power controller 8 at the next stage operates.

This state, i.e., (PU, PV, PW)=(L, L, L)

is maintained until the timing of the leading edge of the system clock CLK1 subsequent to the timing of the next leading edge of the state updating timing signal CLK10.

As above is described the concrete explanation of the operation of the logic circuit in the current controller of the current command type PWM inverter system of the fourth preferred embodiment according to the present invention. In comparison between the first preferred embodiment with the fourth preferred embodiment, the present preferred embodiment differs only in the operation performed in the case of a state shift to any of the state Nos. J00, K00, L00, M00, N00 and O00.

In the case of the state shift to any one of the state Nos. J00, K00, L00, M00, N00 and O00, with attention paid to a line current comparison signal that is at the HH-level or the LL-level, out of the first, second and third line current comparison signals HU, HV and HW, the main circuit switching power devices are turned on or off so that the corresponding switching command signal and the line current are made to be coincident with each other. Subsequently, when the attentional line current command signal has changed to the HL-level, all the first, second and third switching command signals are made to have the H-level or the L-level. This state is maintained until the timing of the next leading edge of the state updating timing signal CLK10. Consequently, in the case of the state shift to any one of the state Nos. J00, K00, L00, M00, N00 and O00, the line current corresponding to the HH-level or the LL-level out of the first, second and third line current comparison signals HU, HV and HW can be made to more approach the line current command signal. Moreover, the fourth preferred embodiment can also control the line currents of the three-phase motor 1 utterly equivalently in a manner similar to that of the first preferred embodiment.

It is noted that the present preferred embodiment has a modified input/output relationship of the data decoder 22 of the logic circuit 10 in the first preferred embodiment. Besides, it is needless to say that similar effects can be obtained also when the operations performed in the case of the system state shift to the state Nos. J00, K00, L00, M00, N00 and O00 are incorporated to the data decoder 22 of the logic circuit 10 of the second preferred embodiment.

FIFTH PREFERRED EMBODIMENT

A fifth preferred embodiment according to the present invention will be described below with reference to the accompanying drawings.

Figure 6:
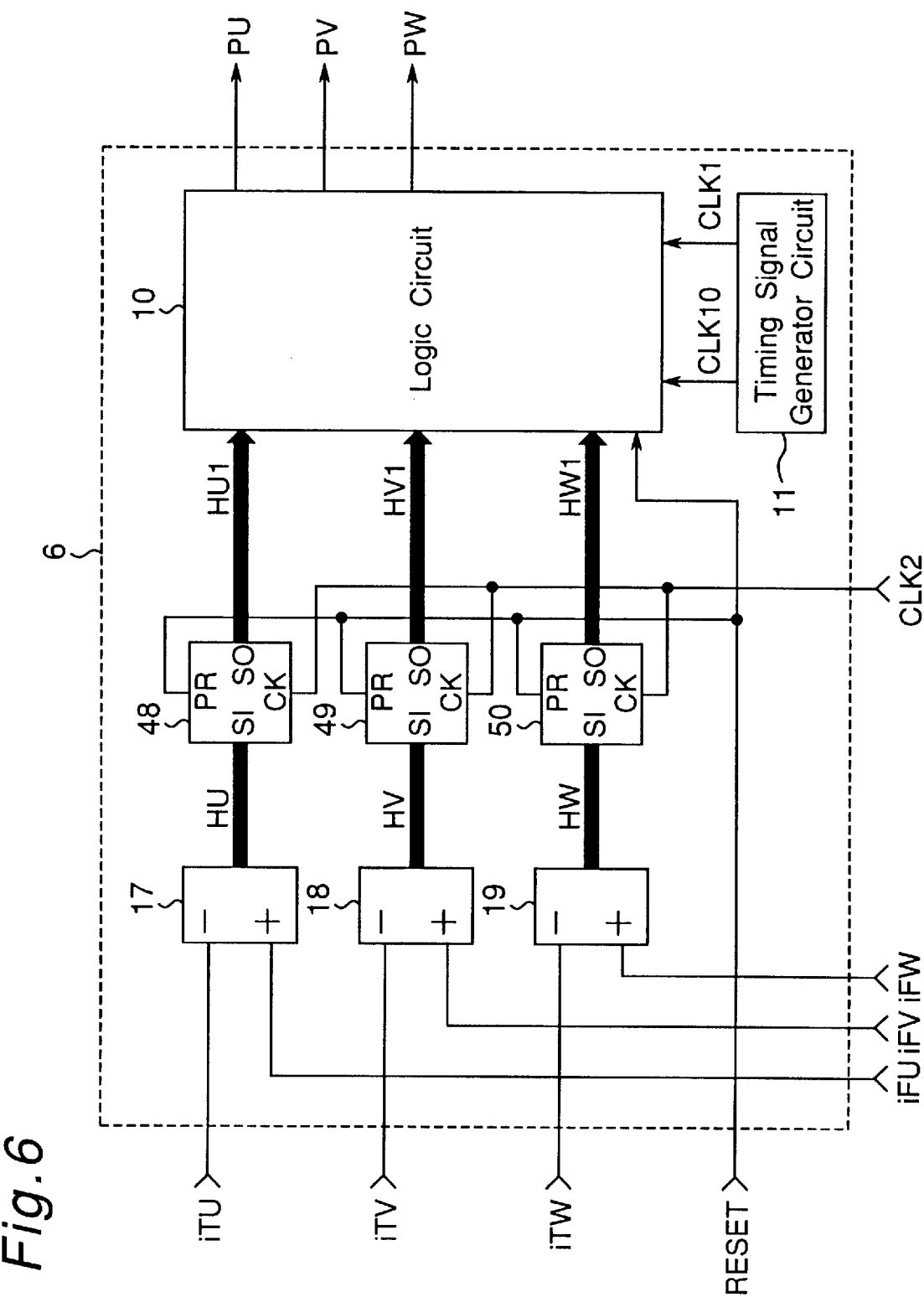
FIG. 6 is a block diagram of a current controller 6 of a fifth preferred embodiment according to the present invention.

According to the fifth preferred embodiment of the present invention, the internal structure of the current controller 6 of the current command type PWM inverter system shown in FIG. 8 is made to be different from that of the first, second, third or fourth preferred embodiment. FIG. 6 shows the internal structure of the current controller 6 of the fifth preferred embodiment according to the present invention.

The fifth preferred embodiment according to the present invention has quite the same structure as that of the first, second, third or fourth preferred embodiment except for first, second and third twice-read logic circuits 48, 49 and 50 provided as constituent components of the current controller 6 shown in FIG. 6.

Since the first, second and third twice-read logic circuits 48, 49 and 50 have quite the, same structures, the structure and operation of the first twice-read logic circuit 48 will be described below with reference to FIG. 7.

Figure 7:
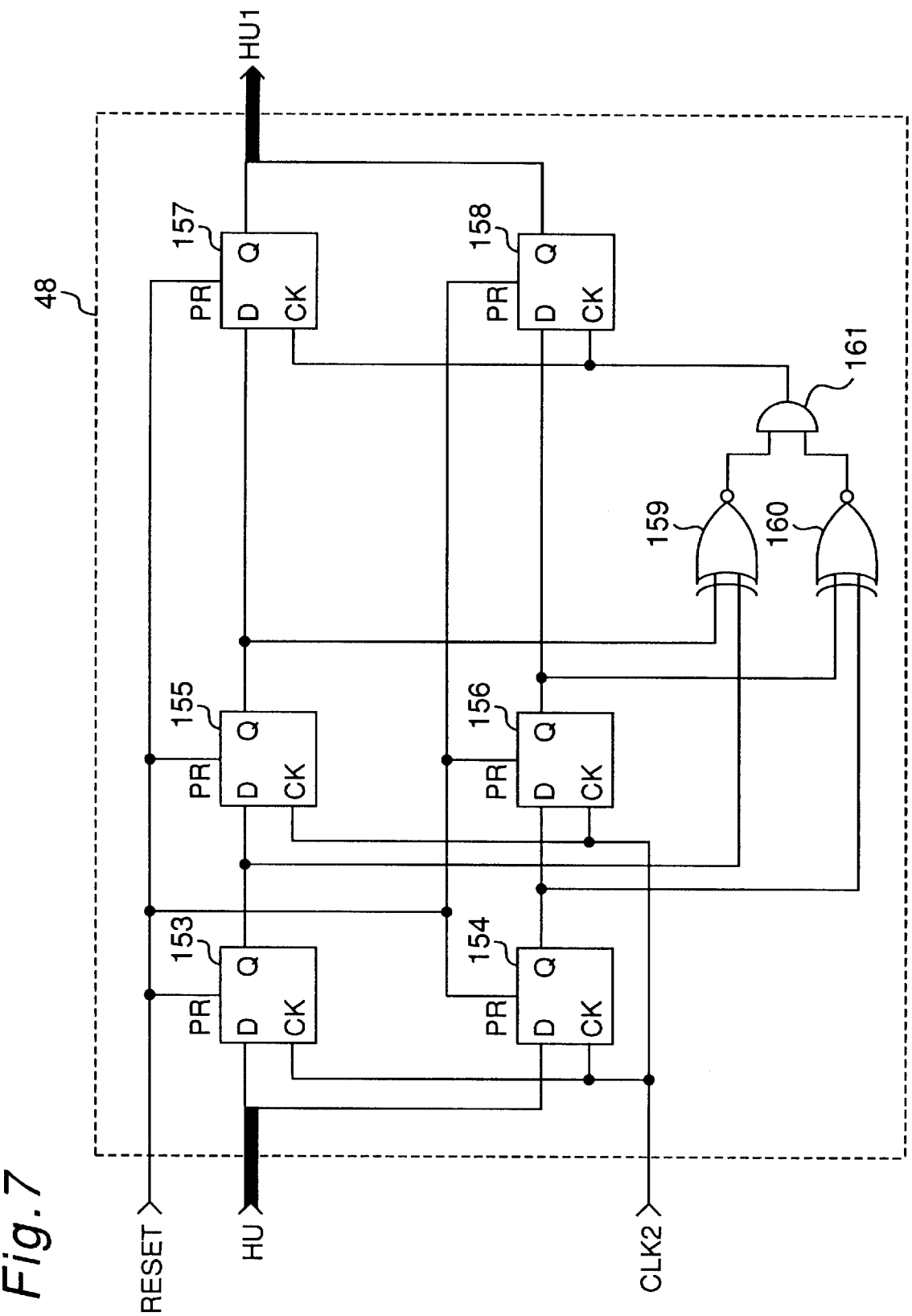
FIG. 7 is a block diagram of a twice-read logic circuit 48 of a preferred embodiment according to the present invention.

Referring to FIG. 7 for explaining the operation of each constituent component of the first twice-read logic circuit 48, first of all, tenth, eleventh, twelfth, thirteenth and fifteenth D-latches 153, 154, 155, 156, 157 and 158 latch the levels at their input terminals D at the timing of the leading edge of the signal inputted to their input terminals CK, and then, output the levels at the input terminals D to their output terminals Q. It is to be noted that their input terminals PR are terminals for receiving the input of a preset signal, and the D-latches 153, 154, 155, 156, 157 and 158 are preset with first priority when the H-level is inputted thereto, where the output terminals Q thereof become the H-level.

Further, the input terminals CK and the input terminals PR of the tenth, eleventh, twelfth, thirteenth and fifteenth D-latches 153, 154, 155, 156, 157 and 158 are commonly connected to one another.

The reference numerals 159 and 160 denote first, second EX-NOR circuits, each of which outputs the H-level output signal when signals of the same level are inputted to their 2-input terminals, and each of which outputs the L-level output signal otherwise.

The reference numeral 161 denotes a fourth AND-circuit, which outputs the H-level output signal when an H-level signal is inputted to all the input terminals, and which outputs the L-level output signal otherwise.

As above is described the explanation of the operation of the constituent components of the first twice-read logic circuit 48. An operation of the first twice-read logic circuit 48 will be described below with regard to the flow of signals.

First of all, at the timing of the leading edge of the system clock CLK2, the upper-bit level of the first line current comparison signal HU inputted to an input terminal SI of the first twice-read logic circuit 48 is latched and held in the tenth D-latch 153 and is outputted at its output terminal Q, while the lower-bit level is latched and held in the eleventh D-latch 154 and is outputted at its output terminal Q.

Then, at the timing of the next leading edge of the system clock CLK2, the level at the output terminal Q of the tenth D-latch 153 is latched and held in the twelfth D-latch 155 and is outputted at its output terminal Q, and the level at the output terminal Q of the eleventh D-latch 154 is latched and held in the thirteenth D-latch 156 and is outputted at its output terminal Q. The upper-bit level of the comparison signal HU at this timing is latched and held in the tenth D-latch 153 and is outputted at its output terminal Q, and the lower-bit level is latched and held in the eleventh D-latch 154 and is outputted at its output terminal Q.

Further, the output levels at the out put terminals Q of the tenth and eleventh D-latches 153 and 155 are transmitted to the first EX-NOR circuit 159, and its output level is inputted to the fourth AND circuit 161. The output levels at the output terminals Q of the twelfth and thirteenth D-latches 154 and 156 are transmitted to the second EX-NOR circuit 160, and its output level is inputted to the fourth AND circuit 161.

Then, when the output from the fourth AND circuit 161 becomes the H-level, the fourteenth and fifteenth D-latches 157 and 158 receive the output levels of the twelfth and thirteenth D-latches, respectively, and output is the levels at its output terminals Q. The output terminals Q of the fourteenth and fifteenth D-latches 157 and 158 output the HU1 as an output of the first twice-read logic circuit 48.

As is apparent from above, it is understood that the first twice-read logic circuit 48 checks or detects the input signal HU at the timing of every leading edge of the system clock CLK2, then operates to switch the output signal HU1 to the H-level when two consecutive H-levels are detected, and operates to switch the output signal HU1 to the L-level when two consecutive L-levels are detected.

As above is described the explanation of the internal operation of the first twice-read logic circuit 48, and the second and third twice-read logic circuits 49 and 50 operate in a manner similar to that of the first twice-read logic circuit 48.

Therefore, the first, second and third twice-read logic circuits 48, 49 and SO can generate the comparison signals HU1, HV1 and HW1 freed from the signals attributed to very short-term noise included in the comparison signals HU, HV and HW, i.e., freed from the following signal change:

the H-level→the L-level→the H-level or the L-level→the H-level→the L-level.

It is to be noted that the number of times for reading the timing of the leading edge of the system clock CLK2 can be set to be equal to or greater than three by providing three or more D-latches in FIG. 7.

According to the fifth preferred embodiment of the present invention as described above, by providing the first, second and third twice-read logic circuits 48, 49 and 50 and transmitting the output comparison signals HU, HV and HW of the first, second and third comparators 17, 18 and 19 of the current controller 6 to the logic circuit 10 via the first, second and third twice-read logic circuits 48, 49 and 50, the noise superimposed on the output signals from the first, second and third comparators 17, 18 and 19 can be removed. Even under the condition that noise tends to take place, the line currents of the three-phase motor 1 can be controlled so that the line currents thereof correctly coincide with the first, second and third line current command signals iTU, iTV and iTW.

Needless to say, the same effects can be obtained even when the first, second and third twice-read logic circuits 48, 49 and 50 of the present preferred embodiment are incorporated into any of the first, second, third or fourth preferred embodiment.

The current command type PWM inverter system according to the present inventions has a structure including no current error amplifier, and therefore, the problems of the gain adjustment of the current error amplifiers can be substantially solved, requiring no gain adjustment. Furthermore, even when the characteristics and specifications of the motor, the motor current detector circuit, the current controller and the main circuit power controller change, the inverter system operates so that each line current error is consistently minimized. Furthermore, even when there are manufacturing-dependent variation of characteristics, temperature characteristics and the like, the inverter system operates so that each line current error is consistently minimized, thereby assuring a better current control responsibility and preventing the possible occurrence of an oscillation phenomenon. Furthermore, the current controller of the current command type PWM inverter system according to the present invention can be entirely implemented by simple digital circuits except for the first, second and third comparators, so that the parts constituted by the digital circuits are free from offset and drift and inexpensive. Therefore, the present invention is free from the gain adjustment work and the offset adjustment work of the current error amplifiers while assuring a better current control responsibility and allowing an inexpensive current command type PWM inverter system to be provided.

The current command type PWM inverter system according to another present invention involves less switching loss or less number of switching operations so that the switching loss can be reduced.

The current command type PWM inverter system according to a further present invention can prevent any malfunction due to noise.

Although the present invention has been fully described in connection with the preferred embodiments thereof with reference to the accompanying drawings, it is to be noted that various changes and modifications are apparent to those skilled in the art. Such changes and modifications are to be understood as included within the scope according to the present invention as defined by the appended claims unless they depart therefrom.

What is claimed is:

1. A current command type PWM inverter apparatus comprising:

motor current detecting means for directly or indirectly detecting line currents flowing from respective lines of said PWM inverter apparatus into a three-phase motor and outputting a first detected line current, a second detected line current and a third detected line current;

current command generating means for generating and outputting a first line current command signal, a second line current command signal and a third line current command signal for commanding the line currents to be flowed from said respective lines into the three-phase motor;

first comparing means for comparing the first line current command signal with the first detected line current, outputting a first line current comparison signal having zero level when a difference between the first line current command signal and the first detected line current falls within an allowance range including zero, outputting the first line current command signal having a first level when the difference between the first line current command signal and the first detected line current falls outside the allowance range and when the first detected line current is equal to or greater than the first line current command signal, and outputting the first line current comparison signal having a second level when the difference between the first line current command signal and the first detected line current falls outside the allowance range and when the first detected line current is smaller than the first line current command signal;

second comparing means for comparing the second line current command signal with the second detected line current, outputting a second line current comparison signal having zero level when a difference between the second line current command signal and the second detected line current falls within an allowance range including zero, outputting the second line current comparison signal having a first level when the difference between the second line current command signal and the second detected line current falls outside the allowance range and when the second detected line current is equal to or greater than the second line current command signal, and outputting the second line current comparison signal having a second level when the difference between the second line current command signal and the second detected line current falls outside the allowance range and when the second detected line current is smaller than the second line current command signal;

third comparing means for comparing the third line current command signal with the third detected line current, outputting a third line current comparison signal having zero level when a difference between the third line current command signal and the third detected line current falls within an allowance range including zero, outputting the third line current comparison signal having a first level when the difference between the third line current command signal and the third detected line current falls outside the allowance range and when the third detected line current is equal to or greater than the third line current command signal, and outputting the third line current comparison signal having a second level when the difference between the third line current command signal and the third detected line current falls outside the allowance range and moreover the third detected line current is smaller than the third line current command signal;

a main circuit DC power source;

main circuit power device circuit having a three-phase bridge connection and comprising:

a first main circuit switching power device which is connected to a positive electrode of the main circuit DC power source and supplies a first line current to the three-phase motor;

a second main circuit switching power device which is connected to the positive electrode of the main circuit DC power source and supplies a second line current to the three-phase motor;

a third main circuit switching power device which is connected to the positive electrode of the main circuit DC power source and supplies a third line current to the three-phase motor;

a fourth main circuit switching power device which is connected to a negative electrode of the main circuit DC power source and supplies the first line current to the three-phase motor;

a fifth main circuit switching power device which is connected to the negative electrode of the main circuit DC power source and supplies the second line current to the three-phase motor;

a sixth main circuit switching power device which is connected to the negative electrode of the main circuit DC power source and supplies the third line current to the three-phase motor; and six reflux diodes respectively connected in parallel with said first, second, third, fourth, fifth and sixth main circuit switching power devices;

a logic circuit for receiving the first line current comparison signal, the second line current comparison signal and the third line current comparison signal, and generating first, second, third, fourth, fifth and sixth switching command signals for said first, second, third, fourth, fifth and sixth main circuit switching power devices; and timing generating means for giving a periodical state updating first timing to said logic circuit, wherein, when the first line current comparison signal has the second level, the second line current comparison signal has the first level and the third line current comparison signal has the first level at the state updating first timing, said logic circuit generates and outputs the second, third and fourth switching command signals for respectively turning off the second, third and fourth main circuit switching power devices, and further generates and outputs the first, fifth and sixth switching command signals for respectively turning on the first, fifth and sixth main circuit switching power devices, for a time interval from a second timing when the second line current comparison signal changes from the first level to the second level to the next state updating first timing, said logic circuit generates and outputs the fifth switching command signal for turning off the fifth main circuit switching power device and further generates and outputs the second switching command signal for turning on the second main circuit switching power device, and for a time interval from a second timing when the third line current comparison signal changes from the first level to the second level to the next state updating first timing, said logic circuit generates and outputs the sixth switching command signal for turning off the sixth main circuit switching power device and further generates and outputs the third switching command signal for turning on the third main circuit switching power device, wherein, when the first line current comparison signal has the first level, the second line current comparison signal has the second level and the third line current comparison signal has the first level at the state updating first timing, said logic circuit generates and outputs the first, third and fifth switching command signals for respectively turning off the first, third and fifth main circuit switching power devices, and further generates and outputs the second, fourth and sixth switching command signals for respectively turning on the second, fourth and sixth main circuit switching power devices, for a time interval from a second timing when the first line current comparison signal changes from the first level to the second level to the next state updating first timing, said logic circuit generates and outputs the fourth switching command signal for turning off the fourth main circuit switching power device and further generates and outputs the first switching command signal for turning on the first main circuit switching power device, and for a time interval from a second timing when the third line current comparison signal changes from the first level to the second level to the next state updating first timing, said logic circuit generates and outputs the sixth switching command signal for turning off the sixth main circuit switching power device and further generates and outputs the third switching command signal for turning on the third main circuit switching power device, wherein, when the first line current comparison signal has the first level, the second line current comparison signal has the first level and the third line current comparison signal has the second level at the state updating first timing, said logic circuit generates and outputs the first, second and sixth switching command signals for respectively turning off the first, second and sixth main circuit switching power devices, and further generates and outputs the third, fourth and fifth switching command signals for respectively turning on the third, fourth and fifth main circuit switching power devices, for a time interval from a second timing when the first line current comparison signal changes from the first level to the second level to the next state updating first timing, said logic circuit generates and outputs the fourth switching command signal for turning off the fourth main circuit switching power device and further generates and outputs the first switching command signal for turning on the first main circuit switching power device, and for a time interval from a second timing when the second line current comparison signal changes from the first level to the second level to the next state updating first timing, said logic circuit generates and outputs the fifth switching command signal for turning off the fifth main circuit switching power device and further generates and outputs the second switching command signal for turning on the second main circuit switching power device, wherein, when the first line current comparison signal has the first level, the second line current comparison signal has the second level and the third line current comparison signal has the second level at the state updating first timing, said logic circuit generates and outputs the first, fifth and sixth switching command signals for respectively turning off the first, fifth and sixth main circuit switching power devices, and further generates and outputs the second, third and fourth switching command signals for respectively turning on the second, third and fourth main circuit switching power devices, for a time interval from a second timing when the second line current comparison signal changes from the second level to the first level to the next state updating first timing, said logic circuit generates and outputs the second switching command signal for turning off the second main circuit switching power device and further generates and outputs the fifth switching command signal for turning on the fifth main circuit switching power device, and for a time interval from a second timing when the third line current comparison signal changes from the second level to the first level to the next state updating first timing, said logic circuit generates and outputs the third switching command signal for turning off the third main circuit switching power device and further generates and outputs the sixth switching command signal for turning on the sixth main circuit switching power device, wherein, when the first line current comparison signal has the second level, the second line current comparison signal has the first level and the third line current comparison signal has the second level at the state updating first timing, said logic circuit generates and outputs the second, fourth and sixth switching command signals for respectively turning off the second, fourth and sixth main circuit switching power devices, and further generates and outputs the first, third and fifth switching command signals for respectively turning on the first, third and fifth main circuit switching power devices, for a time interval from a second timing when the first line current comparison signal changes from the second level to the first level to the next state updating first timing, said logic circuit generates and outputs the first switching command signal for turning off the first main circuit switching power device and further generates and outputs the fourth switching command signal for turning on the fourth main circuit switching power device, and for a time interval from a second timing when the third line current comparison signal changes from the second level to the first level to the next state updating first timing, said logic circuit generates and outputs the third switching command signal for turning off the third main circuit switching power device and further generates and outputs the sixth switching command signal for turning on the sixth main circuit switching power device, and wherein, when the first line current comparison signal has the second level, the second line current comparison signal has the second level and the third line current comparison signal has the first level at the state updating first timing, said logic circuit generates and outputs the third, fourth and fifth switching command signals for respectively turning off the third, fourth and fifth main circuit switching power devices, and further generates and outputs the first, second and sixth switching command signals for respectively turning on the first, second and sixth main circuit switching power devices, and for a time interval from a second timing when the first line current comparison signal changes from the second level to the first level to the next state updating first timing, said logic circuit generates and outputs the first switching command signal for turning off the first main circuit switching power device and further generates and outputs the fourth switching command signal for turning on the fourth main circuit switching power device, and for a time inter-val from a second timing when the second line current comparison signal changes from the second level to the first level to the next state updating first timing, said logic circuit generates and outputs the second switching command signal for turning off the second main circuit switching power device and further generates and outputs the fifth switching command signal for turning on the fifth main circuit switching power device.

2. The current command type PWM inverter apparatus as claimed in claim 1, wherein, when two or more line current comparison signals among the first, second and third line current comparison signals have the zero level at the state updating first timing, until the next state updating first timing, said logic circuit generates and outputs either one group of the first, second and third switching command signals or the fourth, fifth and sixth switching command signals for respectively turning off the first, second and third main circuit switching power devices or the fourth, fifth and sixth main circuit switching power devices, and further generates and outputs the remaining group of the switching command signals for respectively turning on the remaining group of the main circuit switching power devices.

3. The current command type PWM inverter apparatus as claimed in claim 1, wherein, when two or more line current comparison signals among the first, second and third line current comparison signals have the zero level at the state updating first timing, said logic circuit maintains the on-state or off-state of the main circuit switching power devices obtained just before the state updating first timing, until the next state updating first timing.

4. The current command type PWM inverter apparatus as claimed in claim 1, wherein, when the first line current comparison signal has the first level, the second line current comparison signal has the second level and the third line current comparison signal has the second level at the state updating first timing, said logic circuit generates and outputs the second, third and fourth switching command signals for respectively turning off the second, third and fourth main circuit switching power devices, and further generates and outputs the first, fifth and sixth switching command signals for respectively turning on the first, fifth and sixth main circuit switching power devices, and for a time interval from a second timing when the first line current comparison signal changes from the first level to the second level to the next state updating first timing, said logic circuit generates and outputs the first switching command signal for turning off the first main circuit switching power device and further generates and outputs the fourth switching command signal for turning on the fourth main circuit switching power device, wherein, when the first line current comparison signal has the second level, the second line current comparison signal has the first level and the third line current comparison signal has the second level at the state updating first timing, said logic circuit generates and outputs the first, third and fifth switching command signals for respectively turning off the first, third and fifth main circuit switching power devices, and further generates and outputs the second, fourth and sixth switching command signals for respectively turning on the second, fourth and sixth main circuit switching power devices, and for a time interval from a second timing when the first line current comparison signal changes from the second level to the first level to the next state updating first timing, said logic circuit generates and outputs the second switching command signal for turning off the second main circuit switching power device and further generates and outputs the fifth switching command signal for turning on the fifth main circuit switching power device, wherein, when the first line current comparison signal has the second level, the second line current comparison signal has the second level and the third line current comparison signal has the first level at the state updating first timing, said logic circuit generates and outputs the first, second and sixth switching command signals for respectively turning off the first, second and sixth main circuit switching power devices, and further generates and outputs the third, fourth and fifth switching command signals for respectively turning on the third, fourth and fifth main circuit switching power devices, and for a time interval from a second timing when the third line current comparison signal changes from the second level to the first level to the next state updating first timing, said logic circuit generates and outputs the third switching command signal for turning off the third main circuit switching power device and further generates and outputs the sixth switching command signal for turning on the sixth main circuit switching power device, wherein, when the first line current comparison signal has the second level, the second line current comparison signal has the first level and the third line current comparison signal has the first level at the state updating first timing, said logic circuit generates and outputs the first, fifth and sixth switching command signals for respectively turning off the first, fifth and sixth main circuit switching power devices, and further generates and outputs the second, third and fourth switching command signals for respectively turning on the second, third and fourth main circuit switching power devices, and for a time interval from a second timing when the first line current comparison signal changes from the first level to the second level to the next state updating first timing, said logic circuit generates and outputs the fourth switching command signal for turning off the fourth main circuit switching power device and further generates and outputs the first switching command signal for turning on the first main circuit switching power device, wherein, when the first line current comparison signal has the first level, the second line current comparison signal has the second level and the third line current comparison signal has the first level at the state updating first timing, said logic circuit generates and outputs the second, fourth and sixth switching command signals for respectively turning off the second, fourth and sixth main circuit switching power devices, and further generates and outputs the first, third and fifth switching command signals for respectively turning on the first, third and fifth main circuit switching power devices, and for a time interval from a second timing when the second line current comparison signal changes from the first level to the second level to the next state updating first timing, said logic circuit generates and outputs the fifth switching command signal for turning off the fifth main circuit switching power device and further generates and outputs the second switching command signal for turning on the second main circuit switching power device, and wherein, when the first line current comparison signal has the first level, the second line current comparison signal has the first level and the third line current comparison signal has the second level at the state updating first timing, said logic circuit generates and outputs the third, fourth and fifth switching command signals for respectively turning off the third, fourth and fifth main circuit switching power devices, and further generates and outputs the first, second and sixth switching command signals for respectively turning on the first, second and sixth main circuit switching power devices, and for a time interval from a second timing when the third line current comparison signal changes from the first level to the second level to the next state updating first timing, said logic circuit generates and outputs the sixth switching command signal for turning off the sixth main circuit switching power device and further generates and outputs the third switching command signal for turning on the third main circuit switching power device.

5. The current command type PWM inverter apparatus as claimed in claim 1, wherein, when the first line current comparison signal has the second level, the second line current comparison signal has the zero level and the third line current comparison signal has the zero level at the state updating first timing, said logic circuit generates and outputs the second, third and fourth switching command signals for respectively turning off the second, third and fourth main circuit switching power devices, and further generates and outputs the first, fifth and sixth switching command signals for respectively turning on the first, fifth and sixth main circuit switching power devices, and for a time interval from a second timing when the first line current comparison signal changes to the zero level to the next state updating first timing, said logic circuit generates and outputs the first switching command signal for turning off the first main circuit switching power device and further generates and outputs the fourth switching command signal for turning on the fourth main circuit switching power device, wherein, when the first line current comparison signal has the zero level, the second line current comparison signal has the second level and the third line current comparison signal has the zero level at the state updating first timing, said logic circuit generates and outputs the first, third and fifth switching command signals for respectively turning off the first, third and fifth main circuit switching power devices, and further generates and outputs the second, fourth and sixth switching command signals for respectively turning on the second, fourth and sixth main circuit switching power devices, and for a time interval from a second timing when the second line current comparison signal changes to the zero level to the next state updating first timing, said logic circuit generates and outputs the second switching command signal for turning off the second main circuit switching power device and further generates and outputs the fifth switching command signal for turning on the fifth main circuit switching power device, wherein, when the first line current comparison signal has the zero level, the second line current comparison signal has the zero level and the third line current comparison signal has the second level at the state updating first timing, said logic circuit generates and outputs the first, second and sixth switching command signals for respectively turning off the first, second and sixth main circuit switching power devices, and further generates and outputs the third, fourth and fifth switching command signals for respectively turning on the third, fourth and fifth main circuit switching power devices, and for a time interval from a second timing when the third line current comparison signal changes to the zero level to the next state updating first timing, said logic circuit generates and outputs the third switching command signal for turning off the third main circuit switching power device and further generates and outputs the sixth switching command signal for turning on the sixth main circuit switching power device, wherein, when the first line current comparison signal has the first level, the second line current comparison signal has the zero level and the third line current comparison signal has the zero level at the state updating first timing, said logic circuit generates and outputs the first, fifth and sixth switching command signals for respectively turning off the first, fifth and sixth main circuit switching power devices, and further generates and outputs the second, third and fourth switching command signals for respectively turning on the second, third and fourth main circuit switching power devices, and for a time interval from a second timing when the first line current comparison signal changes to the zero level to the next state updating first timing, said logic circuit generates and outputs the fourth switching command signal for turning off the fourth main circuit switching power device and further generates and outputs the first switching command signal for turning on the first main circuit switching power device, wherein, when the first line current comparison signal has the zero level, the second line current comparison signal has the first level and the third line current comparison signal has the zero level at the state updating first timing, said logic circuit generates and outputs the second, fourth and sixth switching command signals for respectively turning off the second, fourth and sixth main circuit switching power devices, and further generates and outputs the first, third and fifth switching command signals for respectively turning on the first, third and fifth main circuit switching power devices, and for a time interval from a second timing when the second line current comparison signal changes to the zero level to the next state updating first timing, said logic circuit generates and outputs the fifth switching command signal for turning off the fifth main circuit switching power device and further generates and outputs the second switching command signal for turning on the second main circuit switching power device, and wherein, when the first line current comparison signal has the zero level, the second line current comparison signal has the zero level and the third line current comparison signal has the first level at the state updating first timing, said logic circuit generates and outputs the third, fourth and fifth switching command signals for respectively turning off the third, fourth and fifth main circuit switching power devices, and further generates and outputs the first, second and sixth switching command signals for respectively turning on the first, second and sixth main circuit switching power devices, and for a time interval from a second timing when the third line current comparison signal changes to the zero level to the next state updating first timing, said logic circuit generates and outputs the sixth switching command signal for turning off the sixth main circuit switching power device and further generates and outputs the third switching command signal for turning on the third main circuit switching power device.

6. The current command type PWM inverter apparatus as claimed in claim 1, wherein, when the first line current comparison signal has the first level, the second line current comparison signal has the second level and the third line current comparison signal has the zero level at the state updating first timing, said logic circuit generates and outputs the first and fifth switching command signals for respectively turning off the first and fifth main circuit switching power devices, generates and outputs the second and fourth switching command signals for respectively turning on the second and fourth main circuit switching power devices, generates and outputs either one of the third or sixth switching command signal for turning off the third or sixth main circuit switching power device, and generates and outputs the remaining one switching command signal for turning on the remaining one main circuit switching power device, when said logic circuit has generated and outputted the third switching command signal for turning off the third main circuit switching power device and the sixth switching command signal for turning on the sixth main circuit switching power device, said logic circuit generates and outputs the second switching command signal for turning off the second main circuit switching power device and the fifth switching command signal for turning on the fifth main circuit switching power device, for a time interval from a second timing when the second line current comparison signal changes to the first level to the next state updating first timing, and when said logic circuit has generated and outputted the sixth switching command signal for turning off the sixth main circuit switching power device and the third switching command signal for turning on the third main circuit switching power device, said logic circuit generates and outputs the fourth switching command signal for turning off the fourth main circuit switching power device and the first switching command signal for turning on the first main circuit switching power device, for a time interval from a second timing when the first line current comparison signal changes to the second level to the next state updating first timing, wherein, when the first line current comparison signal has the zero level, the second line current comparison signal has the first level and the third line current comparison signal has the second level at the state updating first timing, said logic circuit generates and outputs the second and sixth switching command signals for respectively turning off the second and sixth main circuit switching power devices, generates and outputs the third and fifth switching command signals for respectively turning on the third and fifth main circuit switching power devices, generates and outputs either one of the first or fourth switching command signal for turning off the first or fourth main circuit switching power device, and generates and outputs the remaining one switching command signal for turning on the remaining one main circuit switching power device, when said logic circuit has generated and outputted the first switching command signal for turning off the first main circuit switching power device and the fourth switching command signal for turning on the fourth main circuit switching power device, said logic circuit generates and outputs the fifth switching command signal for turning off the fifth main circuit switching power device and the second switching command signal for turning on the second main circuit switching power device, for a time interval from a second timing when the third line current comparison signal changes to the first level to the next state updating first timing, and when said logic circuit has generated and outputted the fourth switching command signal for turning off the fourth main circuit switching power device and the first switching command signal for turning on the first main circuit switching power device, said logic circuit generates and outputs the first switching command signal for turning off the first main circuit switching power device and the fourth switching command signal for turning on the fourth main circuit switching power device, for a time interval from a second timing when the second line current comparison signal changes to the second level to the next state updating first timing, wherein, when the first line current comparison signal has the second level, the second line current comparison signal has the zero level and the third line current comparison signal has the first level at the state updating first timing, said logic circuit generates and outputs the third and fourth switching command signals for respectively turning off the third and fourth main circuit switching power devices, generates and outputs the first and sixth switching command signals for respectively turning on the first and sixth main circuit switching power devices, generates and outputs either one of the second or fifth switching command signal for turning off the second or fifth main circuit switching power device, and generates and outputs the remaining one switching command signal for turning on the remaining one main circuit switching power device, when said logic circuit has generated and outputted the second switching command signal for turning off the second main circuit switching power device and the fifth switching command signal for turning on the fifth main circuit switching power device, said logic circuit generates and outputs the first switching command signal for turning off the first main circuit switching power device and the fourth switching command signal for turning on the fourth main circuit switching power device, for a time interval from a second timing when the first line current comparison signal changes to the first level to the next state updating first timing, and when said logic circuit has generated and outputted the fifth switching command signal for turning off the fifth main circuit switching power device and the second switching command signal for turning on the second main circuit switching power device, said logic circuit generates and outputs the sixth switching command signal for turning off the sixth main circuit switching power device and the third switching command signal for turning on the third main circuit switching power device, for a time interval from a second timing when the third line current comparison signal changes to the second level to the next state updating first timing, wherein, when the first line current comparison signal has the second level, the second line current comparison signal has the first level and the third line current comparison signal has the zero level at the state updating first timing, said logic circuit generates and outputs the second and fourth switching command signals for respectively turning off the second and fourth main circuit switching power devices, generates and outputs the first and fifth switching command signals for respectively turning on the first and fifth main circuit switching power devices, generates and outputs either one of the third or sixth switching command signal for turning off the third or sixth main circuit switching power device, and generates and outputs the remaining one switching command signal for turning on the remaining one main circuit switching power device, when said logic circuit has generated and outputted the third switching command signal for turning off the third main circuit switching power device and the sixth switching command signal for turning on the sixth main circuit switching power device, said logic circuit generates and outputs the first switching command signal for turning off the first main circuit switching power device and the fourth switching command signal for turning on the fourth main circuit switching power device, for a time interval from a second timing when the first line current comparison signal changes to the first level to the next state updating first timing, and when said logic circuit has generated and outputted the sixth switching command signal for turning off the sixth main circuit switching power device and the third switching command signal for turning on the third main circuit switching power device, said logic circuit generates and outputs the fifth switching command signal for turning off the fifth main circuit switching power device and the second switching command signal for turning on the second main circuit switching power device, for a time interval from a second timing when the second line current comparison signal changes to the second level to the next state updating first timing, wherein, when the first line current comparison signal has the zero level, the second line current comparison signal has the second level and the third line current comparison signal has the first level at the state updating first timing, said logic circuit generates and outputs the third and fifth switching command signals for respectively turning off the third and fifth main circuit switching power devices, generates and outputs the second and sixth switching command signals for respectively turning on the second and sixth main circuit switching power devices, generates and outputs either one of the first or fourth switching command signal for turning off the first or fourth main circuit switching power device, and generates and outputs the remaining one switching command signal for turning on the remaining one main circuit switching power device, when said logic circuit has generated and outputted the first switching command signal for turning off the first main circuit switching power device and the fourth switching command signal for turning on the fourth main circuit switching power device, said logic circuit generates and outputs the fifth switching command signal for turning off the fifth main circuit switching power device and the second switching command signal for turning on the second main circuit switching power device, for a time interval from a second timing when the second line current comparison signal changes to the first level to the next state updating first timing, and when said logic circuit has generated and outputted the fourth switching command signal for turning off the fourth main circuit switching power device and the first switching command signal for turning on the first main circuit switching power device, said logic circuit generates and outputs the third switching command signal for turning off the third main circuit switching power device and the sixth switching command signal for turning on the sixth main circuit switching power device, for a time interval from a second timing when the third line current comparison signal changes to the second level to the next state updating first timing, and wherein, when the first line current comparison signal has the first level, the second line current comparison signal has the zero level and the third line current comparison signal has the second level at the state updating first timing, said logic circuit generates and outputs the first and sixth switching command signals for respectively turning off the first and sixth main circuit switching power devices, generates and outputs the third and fourth switching command signals for respectively turning on the third and fourth main circuit switching power devices, generates and outputs either one of the second or fifth switching command signal for turning off the second or fifth main circuit switching power device, and generates and outputs the remaining one switching command signal for turning on the remaining one main circuit switching power device, when said logic circuit has generated and outputted the second switching command signal for turning off the second main circuit switching power device and the fifth switching command signal for turning on the fifth main circuit switching power device, said logic circuit generates and outputs the third switching command signal for turning off the third main circuit switching power device and the sixth switching command signal for turning on the sixth main circuit switching power device, for a time interval from a second timing when the third line current comparison signal changes to the first level to the next state updating first timing, and when said logic circuit has generated and outputted the fifth switching command signal for turning off the fifth main circuit switching power device and the second switching command signal for turning on the second main circuit switching power device, said logic circuit generates and outputs the fourth switching command signal for turning off the fourth main circuit switching power device and the first switching command signal for turning on the first main circuit switching power device, for a time interval from a second timing when the first line current comparison signal changes to the second level to the next state updating first timing.

7. The current command type PWM inverter apparatus as claimed in claim 1, wherein, when the first line current comparison signal has the first level, the second line current comparison signal has the second level and the third line current comparison signal has the zero level at the state updating first timing, said logic circuit generates and outputs the first and fifth switching command signals for respectively turning off the first and fifth main circuit switching power devices, and further generates and outputs the second and fourth switching command signals for respectively turning on the second and fourth main circuit switching power devices, when said logic circuit has generated and outputted the third switching command signal for turning off the third main circuit switching power device and the sixth switching command signal for turning on the sixth main circuit switching power device just before the state updating first timing, said logic circuit generates and outputs the third switching command signal for turning off the third main circuit switching power device and the sixth switching command signal for turning on the sixth main circuit switching power device, and further generates and outputs the second switching command signal for turning off the second main circuit switching power device and the fifth switching command signal for turning on the fifth main circuit switching power device for a time interval from a second timing when the second line current comparison signal changes to the first level to the next state updating first timing, and when said logic circuit has generated and outputted the sixth switching command signal for turning off the sixth main circuit switching power device and the third switching command signal for turning on the third main circuit switching power device just before the state updating first timing, said logic circuit generates and outputs the sixth switching command signal for turning off the sixth main circuit switching power device and the third switching command signal for turning on the third main circuit switching power device, and further generates and outputs the fourth switching command signal for turning off the fourth main circuit switching power device and the first switching command signal for turning on the first main circuit switching power device for a time interval from a second timing when the first line current comparison signal changes to the second level to the next state updating first timing, wherein, when the first line current comparison signal has the zero level, the second line current comparison signal has the first level and the third line current comparison signal has the second level at the state updating first timing, said logic circuit generates and outputs the second and sixth switching command signals for respectively turning off the second and sixth main circuit switching power devices, and further generates and outputs the third and fifth switching command signals for respectively turning on the third and fifth main circuit switching power devices, when said logic circuit has generated and outputted the first switching command signal for turning off the first main circuit switching power device and the fourth switching command signal for turning on the fourth main circuit switching power device just before the state updating first timing, said logic circuit generates and outputs the first switching command signal for turning off the first main circuit switching power device and the fourth switching command signal for turning on the fourth main circuit switching power device, and further generates and outputs the fifth switching command signal for turning off the fifth main circuit switching power device and the second switching command signal for turning on the second main circuit switching power device, for a time interval from a second timing when the third line current comparison signal changes to the first level to the next state updating first timing, and when said logic circuit has generated and outputted the fourth switching command signal for turning off the fourth main circuit switching power device and the first switching command signal for turning on the first main circuit switching power device just before the state updating first timing, said logic circuit generates and outputs the fourth switching command signal for turning off the fourth main circuit switching power device and the first switching command signal for turning on the first main circuit switching power device, and further generates and outputs the first switching command signal for turning off the first main circuit switching power device and the fourth switching command signal for turning on the fourth main circuit switching power device, for a time interval from a second timing when the second line current comparison signal changes to the second level to the next state updating first timing, wherein, when the first line current comparison signal has the second level, the second line current comparison signal has the zero level and the third line current comparison signal has the first level at the state updating first timing, said logic circuit generates and outputs the third and fourth switching command signals for respectively turning off the third and fourth main circuit switching power devices, and further generates and outputs the first and sixth switching command signals for respectively turning on the first and sixth main circuit switching power devices, when said logic circuit has generated and outputted the second switching command signal for turning off the second main circuit switching power device and the fifth switching command signal for turning on the fifth main circuit switching power device just before the state updating first timing, said logic circuit generates and outputs the second switching command signal for turning off the second main circuit switching power device and the fifth switching command signal for turning on the fifth main circuit switching power device, and further generates and outputs the first switching command signal for turning off the first main circuit switching power device and the fourth switching command signal for turning on the fourth main circuit switching power device, for a time interval from a second timing when the first line current comparison signal changes to the first level to the next state updating first timing, and when said logic circuit has generated and outputted the fifth switching command signal for turning off the fifth main circuit switching power device and the second switching command signal for turning on the second main circuit switching power device just before the state updating first timing, said logic circuit generates and outputs the fifth switching command signal for turning off the fifth main circuit switching power device and the second switching command signal for turning on the second main circuit switching power device, and further generates and outputs the sixth switching command signal for turning off the sixth main circuit switching power device and the third switching command signal for turning on the third main circuit switching power device, for a time interval from a second timing when the third line current comparison signal changes to the second level to the next state updating first timing, wherein, when the first line current comparison signal has the second level, the second line current comparison signal has the first level and the third line current comparison signal has the zero level at the state updating first timing, said logic circuit generates and outputs the second and fourth switching command signals for respectively turning off the second and fourth main circuit switching power devices, and further generates and outputs the first and fifth switching command signals for respectively turning on the first and fifth main circuit switching power devices, when said logic circuit has generated and outputted the third switching command signal for turning off the third main circuit switching power device and the sixth switching command signal for turning on the sixth main circuit switching power device just before the state updating first timing, said logic circuit generates and outputs the third switching command signal for turning off the third main circuit switching power device and the sixth switching command signal for turning on the sixth main circuit switching power device, and further generates and outputs the first switching command signal for turning off the first main circuit switching power device and the fourth switching command signal for turning on the fourth main circuit switching power device, for a time interval from a second timing when the first line current comparison signal changes to the first level to the next state updating first timing, and when said logic circuit has generated and outputted the sixth switching command signal for turning off the sixth main circuit switching power device and the third switching command signal for turning on the third main circuit switching power device just before the state updating first timing, said logic circuit generates and outputs the sixth switching command signal for turning off the sixth main circuit switching power device and the third switching command signal for turning on the third main circuit switching power device and further generates and outputs the fifth switching command signal for turning off the fifth main circuit switching power device and the second switching command signal for turning on the second main circuit switching power device, for a time interval from a second timing when the second line current comparison signal changes to the second level to the next state updating first timing, wherein, when the first line current comparison signal has the zero level, the second line current comparison signal has the second level and the third line current comparison signal has the first level at the state updating first timing, said logic circuit generates and outputs the third and fifth switching command signals for respectively turning off the third and fifth main circuit switching power devices, and further generates and outputs the second and sixth switching command signals for respectively turning on the second and sixth main circuit switching power devices, when said logic circuit has generated and outputted the first switching command signal for turning off the first main circuit switching power device and the fourth switching command signal for turning on the fourth main circuit switching power device just before the state updating first timing, said logic circuit generates and outputs the first switching command signal for turning off the first main circuit switching power device and the fourth switching command signal for turning on the fourth main circuit switching power device, and further generates and outputs the fifth switching command signal for turning off the fifth main circuit switching power device and the second switching command signal for turning on the second main circuit switching power device, for a time interval from a second timing when the second line current comparison signal changes to the first level to the next state updating first timing, and when said logic circuit has generated and outputted the fourth switching command signal for turning off the fourth main circuit switching power device and the first switching command signal for turning on the first main circuit switching power device just before the state updating first timing, said logic circuit generates and outputs the fourth switching command signal for turning off the fourth main circuit switching power device and the first switching command signal for turning on the first main circuit switching power device, and further generates and outputs the third switching command signal for turning off the third main circuit switching power device and the sixth switching command signal for turning on the sixth main circuit switching power device, for a time interval from a second timing when the third line current comparison signal changes to the second level to the next state updating first timing, and wherein, when the first line current comparison signal has the first level, the second line current comparison signal has the zero level and the third line current comparison signal has the second level at the state updating first timing, said logic circuit generates and outputs the first and sixth switching command signals for respectively turning off the first and sixth main circuit switching power devices, and further generates and outputs the third and fourth switching command signals for respectively turning on the third and fourth main circuit switching power devices, when said logic circuit has generated and outputted the second switching command signal for turning off the second main circuit switching power device and the fifth switching command signal for turning on the fifth main circuit switching power device just before the state updating first timing, said logic circuit generates and outputs the second switching command signal for turning off the second main circuit switching power device and the fifth switching command signal for turning on the fifth main circuit switching power device, and further generates and outputs the third switching command signal for turning off the third main circuit switching power device and the sixth switching command signal for turning on the sixth main circuit switching power device, for a time interval from a second timing when the third line current comparison signal changes to the first level to the next state updating first timing, and when said logic circuit has generated and outputted the fifth switching command signal for turning off the fifth main circuit switching power device and the second switching command signal for turning on the second main circuit switching power device just before the state updating first timing, said logic circuit generates and outputs the fifth switching command signal for turning off the fifth main circuit switching power device and the second switching command signal for turning on the second main circuit switching power device, and further generates and outputs the fourth switching command signal for turning off the fourth main circuit switching power device and the first switching command signal for turning on the first main circuit switching power device, for a time interval from a second timing when the first line current comparison signal changes to the second level to the next state updating first timing.

* * * * *